United States Patent
Maeyama

(10) Patent No.: US 9,288,403 B2
(45) Date of Patent: Mar. 15, 2016

(54) IMAGE PROCESSING CIRCUIT, IMAGE PROCESSING METHOD, AND DISPLAY DEVICE

(71) Applicant: Sony Corporation, Tokyo (JP)

(72) Inventor: Koichi Maeyama, Kanagawa (JP)

(*) Notice: Subject to any disclaimer, the term of this patent is extended or adjusted under 35 U.S.C. 154(b) by 0 days.

(21) Appl. No.: 14/489,720

(22) Filed: Sep. 18, 2014

(65) Prior Publication Data

US 2015/0124124 A1    May 7, 2015

(30) Foreign Application Priority Data

Nov. 7, 2013  (JP) .................................. 2013-230842
Mar. 26, 2014  (JP) .................................. 2014-064130

(51) Int. Cl.
*H04N 5/353*   (2011.01)
*H04N 5/235*   (2006.01)
*H04N 5/343*   (2011.01)

(52) U.S. Cl.
CPC ........... *H04N 5/2355* (2013.01); *H04N 5/2356* (2013.01); *H04N 5/343* (2013.01)

(58) Field of Classification Search
CPC . H04N 5/2355; H04N 5/2256; H04N 5/2354; H04N 5/35536; H04N 5/353
See application file for complete search history.

(56) References Cited

U.S. PATENT DOCUMENTS

| | | | | |
|---|---|---|---|---|
| 5,585,848 A | * | 12/1996 | Hieda | H04N 5/372 348/297 |
| 2014/0092275 A1 | * | 4/2014 | Morihisa | G02B 7/365 348/222.1 |

FOREIGN PATENT DOCUMENTS

| | | |
|---|---|---|
| JP | 07-131796 | 5/1995 |
| JP | 07-135599 | 5/1995 |
| JP | 2010-276968 | 12/2010 |

* cited by examiner

*Primary Examiner* — Tuan Ho
(74) *Attorney, Agent, or Firm* — Michael Best & Friedrich LLP

(57) ABSTRACT

There is provided an image processing circuit including a sub frame signal generation unit configured to receive n pieces of image information of n images which are obtained by photographing the same scene under n (n is a natural number equal to or greater than 2) exposure conditions and the n exposure conditions at the time of the photographing as input. When a display video of one scene is constituted by a maximum of n sub frames, the sub frame signal generation unit generates video signals of the maximum of n sub frames by controlling a light emission time of light emission elements for each sub frame according to the n exposure conditions.

26 Claims, 31 Drawing Sheets

LIGHT EMISSION LUMINANCE ∝ LIGHT EMISSION CURRENT $I_{ds}$ × LIGHT EMISSION TIME DR
∝ DRIVING VOLTAGE $V_{sig}$ × LIGHT EMISSION TIME DR (1) LIGHT EMISSION TIME DR1 > LIGHT EMISSION TIME DR2
(2) LIGHT EMISSION TIME DR1 = LIGHT EMISSION TIME DR2
(3) LIGHT EMISSION TIME DR1 < LIGHT EMISSION TIME DR2

FIG. 31
FIG. 31A
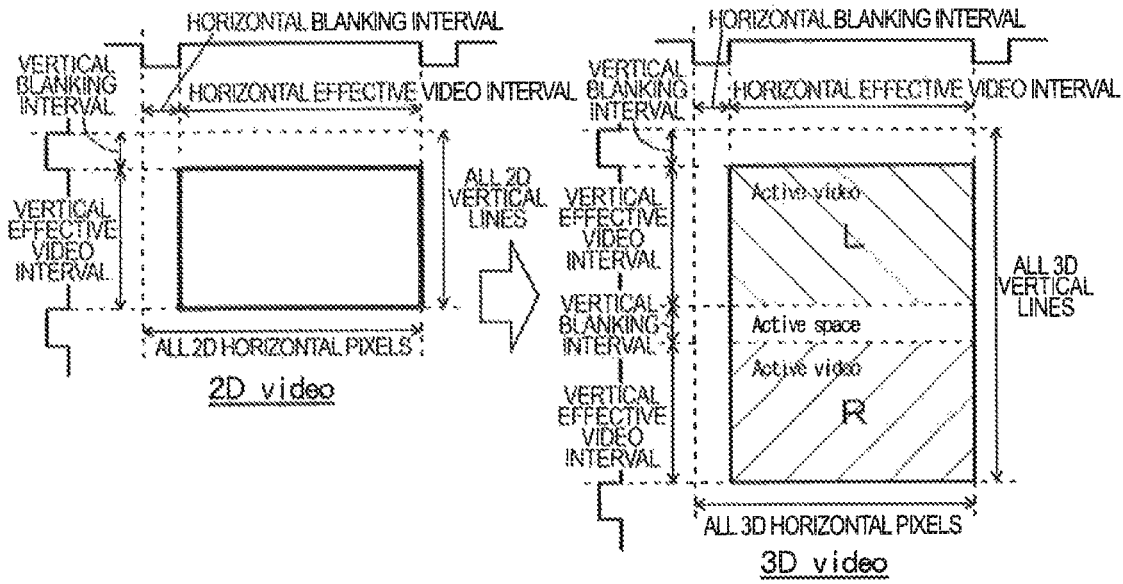
FIG. 31B
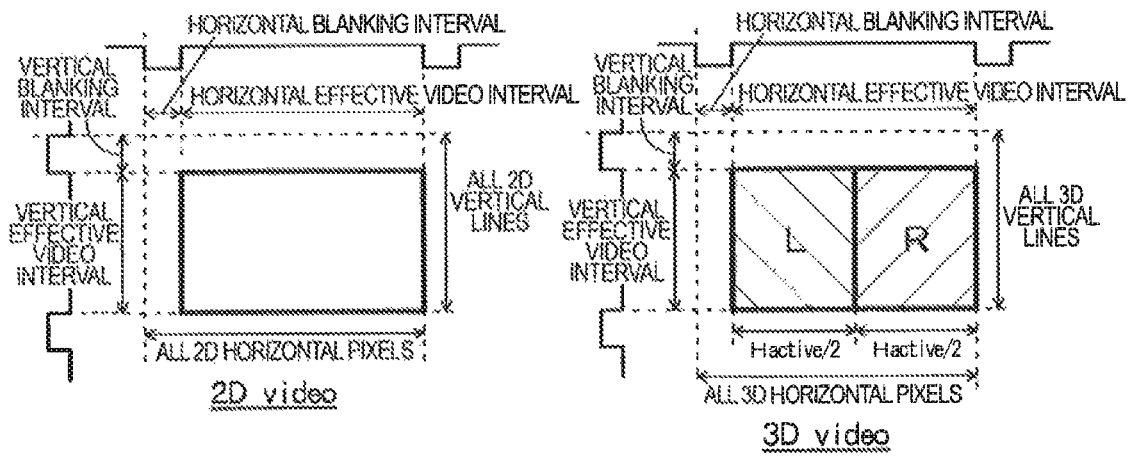
FIG. 31C
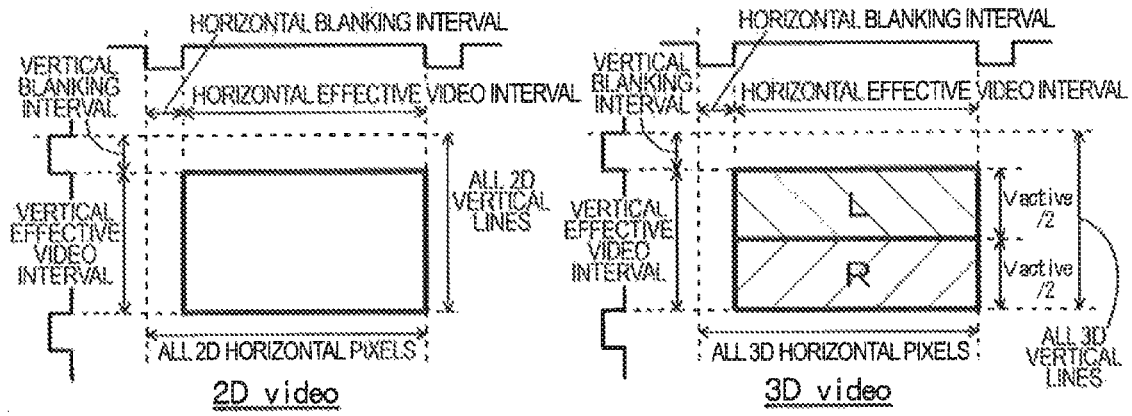

IMAGE PROCESSING CIRCUIT, IMAGE PROCESSING METHOD, AND DISPLAY DEVICE

CROSS REFERENCE TO RELATED APPLICATIONS

This application claims the benefit of Japanese Priority Patent Application JP 2013-230842 filed Nov. 7, 2013, and Japanese Priority Patent Application JP 2014-064130 filed Mar. 26, 2014, the entire contents of each of which are incorporated herein by reference.

BACKGROUND

The present disclosure relates to an image processing circuit, an image processing method, and a display device.

As a high dynamic range (HDR) technology, there is a technique in which a plurality of images which are photographed under different exposure conditions (a bright image, a normal image, a dark image, and the like) are processed to be combined, compressed to an amount of information which can be expressed in a general monitor, and then displayed (for example, refer to JP H7-131796A and JP H7-135599A). In addition, in order to realize HDR display, there is also a proposed technique in which a plurality of images of which a grayscale expression range is divided are displayed as sub frames as a technique of reproducing grayscales which exceed the performance of monitor expression (for example, JP 2010-276968A).

SUMMARY

In the techniques disclosed in JP H7-131796A and JP H7-135599A, however, due to restrictions on a video format, a signal transmission interface, and monitor expression performance in addition to complexity of the combining process, the dynamic range extended at the time of the combination is reduced. For this reason, it is not possible to sufficiently express the property of grayscales in the entire expression range, and thus the HDR is not thoroughly expressed.

On the other hand, the technique disclosed in JP 2010-276968A has the advantage that the number of display grayscales can increase according to the number of sub frames with a simple configuration, but when a plurality of images which are photographed by changing exposure are simply displayed as sub frames, information of a subject is displayed in an overlapping manner. In addition, since an exposure condition of a subject is not reflected on a display condition, luminance of a screen display at the time of expressing sub frames fails to correctly express a subject reflectance of the photographed images.

Therefore, the present disclosure aims to provide an image processing circuit, an image processing method, and a display device which can effectively reproduce grayscale information at the time of photographing, and cause luminance of a screen display at the time of expressing sub frames to correctly express a subject reflectance of photographed images.

There is provided an image processing circuit including a sub frame signal generation unit configured to receive n pieces of image information of n images which are obtained by photographing the same scene under n (n is a natural number equal to or greater than 2) exposure conditions and the n exposure conditions at the time of the photographing as input. When a display video of one scene is constituted by a maximum of n sub frames, the sub frame signal generation unit generates video signals of the maximum of n sub frames by controlling a light emission time of light emission elements for each sub frame according to the n exposure conditions.

In addition, in an image processing method of the present disclosure for achieving the above objectives in processing of an image based on n pieces of image information of n images which are obtained by photographing the same scene under n (n is a natural number equal to or greater than 2) exposure conditions and the n exposure conditions at the time of the photographing, when a display video of one scene is constituted by a maximum of n sub frames, a light emission time of the light emission elements is controlled for each sub frame according to the n exposure conditions, and thereby video signals of the maximum of n sub frames are generated.

There is provided a display device including a sub frame signal generation unit configured to receive n pieces of image information of n images which are obtained by photographing the same scene under n (n is a natural number equal to or greater than 2) exposure conditions and the n exposure conditions at the time of the photographing as input. When a display video of one scene is constituted by a maximum of n sub frames, the sub frame signal generation unit generates video signals of the maximum of n sub frames by controlling a light emission time of light emission elements for each sub frame according to the n exposure conditions.

The image processing circuit of the present disclosure, the image processing method of the present disclosure, or the display device of the present disclosure configured as described above can effectively realize grayscale information during photographing by using a sub frame display technique of alternately displaying a plurality of pieces of image information as they are without performing a process of combining the image information. Furthermore, by controlling the light emission time of the light emission elements for each sub frame according to the exposure conditions, the exposure conditions of a subject are reflected in a display condition. Accordingly, luminance of screen display at the time of sub frame expression can correctly express a subject reflectance of a photographed image.

According to the present disclosure, it is possible to effectively reproduce grayscale information at the time of photographing, and to cause luminance of screen display at the time of sub frame expression to correctly express a subject reflectance of a photographed image.

Note that the present disclosure is not limited to exhibiting the effect described herein at all and may exhibit any effect described in the present specification. In addition, the effects described in the present specification are not limiting but are merely examples, and there may be additional effects.

BRIEF DESCRIPTION OF THE DRAWINGS

FIG. 4 is a diagram for describing an overview of data generation example 1 of a sub frame signal, in which

FIG. 5 is a diagram for describing an overview of data generation example 2 of a sub frame signal, in which

FIG. 6 is a diagram for describing the principle of control of light emission luminance of a display panel based on sub frame data i and a sub frame light emission time SDR, in which

FIG. 9 is a diagram for describing an overview of generation of a pseudo exposure image, in which

FIG. 12 is a diagram showing the specific relationship of write data when 240 Hz driving is performed by thinning out vertical resolution by ½, in which

FIG. 15 is a diagram for describing an overview of a sub frame generation process when image processing according to Example 4 is performed, in which

FIG. 31 is a diagram showing examples of 3D video-applicable formats, in which FIG. 31A shows a frame packing format, FIG. 31B shows a side-by-side half format, and FIG. 31C shows a top-and-bottom format.

DETAILED DESCRIPTION OF THE EMBODIMENT(S)

Figure 1:
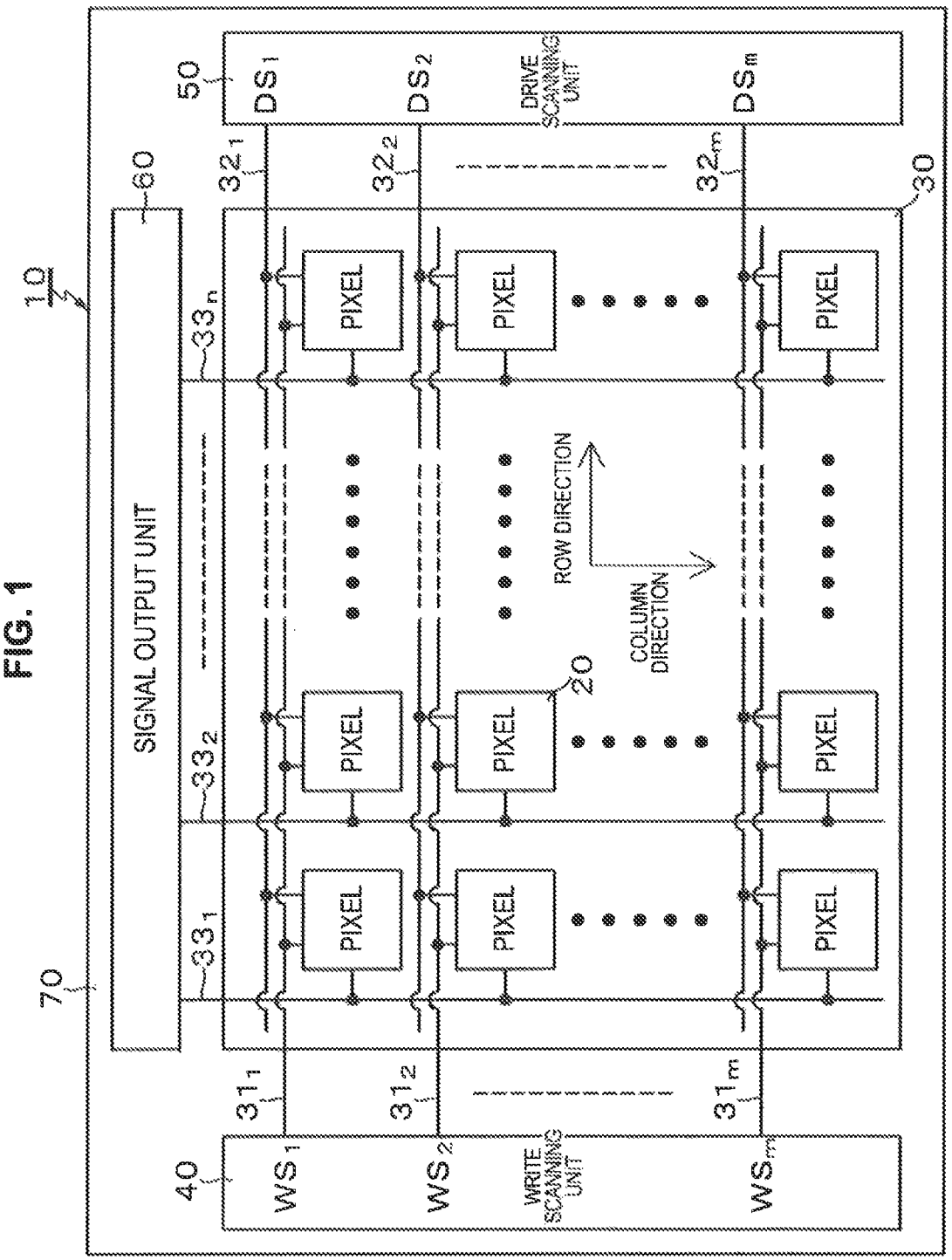
FIG. 1 is a system configuration diagram showing a schematic basic configuration of an active-matrix display device to which the technology of the present disclosure is applied.

Hereinafter, preferred embodiments for implementing the technology of the present disclosure (which will be described hereinafter as "embodiments") will be described in detail with reference to the appended drawings. The technology of the present disclosure is not limited to the embodiments, and the various numeric values shown in the embodiments are examples. In description provided below, structural elements that have substantially the same function and structure are denoted with the same reference numerals, and repeated explanation of these structural elements is omitted.

Note that description will be provided in the following order.

1. Overall description of an image processing circuit, an image processing method, and a display device of the present disclosure
2. Display device of the present disclosure (display device to which the technology of the present disclosure is applied)
2-1. System configuration
2-2. Pixel circuit
3. Description of embodiments
3-1. Example 1 (Example in which an exposure image separation unit performs a process of computing an exposure ratio)
3-2. Example 2 (Example in which an exposure ratio computation unit that computes an exposure ratio is provided)
3-3. Example 3 (Example in which one video photographed using a high-sensitivity sensor is set as input information)
3-4. Example 4 (Example of variable sub frame frequency driving)
3-5. Example 5 (Example in which an image quality enhancement adjustment parameter is reflected in sub frame data and a setting of a sub frame light emission time)
3-6. Example 6 (Example of driving of three sub frames)
3-7. Example 7 (Example of driving of four sub frames)
3-8. Regarding one-frame video information <Overall Description of an Image Processing Circuit, an Image Processing Method, and a Display Device of the Present Disclosure>

The image processing circuit and the image processing method of the present disclosure is suitable for a display device constituted by current-driven light emission elements in which light emission of a light emission unit of a pixel is controlled according to intensity (magnitude) of a current. As such a current-driven light emission element, for example, an organic electro-luminescence element (which will be described hereinafter as an "organic EL element") that uses a phenomenon in which light is emitted when an electric field is applied to an organic thin film can be used. As the current-driven light emission element, an inorganic EL element, an LED element, a semiconductor laser element, and the like can be exemplified in addition to an organic EL element.

An organic EL display device that uses organic EL elements as light emission units of pixels has the following features. Because the organic EL elements can be driven with an applied voltage of 10 V or lower, the organic EL display device consumes low electric power. Since the organic EL elements are self-luminous elements, the organic EL display device has higher visibility of images than a liquid crystal display device, which is another display device of the same plane type, and even can be made lighter and thinner because no lighting member such as a backlight or the like is necessary for the organic EL display device. Furthermore, since a response speed of an organic EL element is about several μsec, which is a very high speed, the organic EL display device does not cause afterimages during display of dynamic images.

In the image processing circuit, the image processing method, and the display device of the present disclosure which have the preferable configuration as described above, a sub frame signal generation unit can be configured such that light emission luminance of light emitting elements per unit time is controlled for each sub frame according to n pieces of image information. At this time, it is preferable to control the light emission luminance per unit time according to calculated image information that is computed through a predetermined calculation based on the n pieces of image information. In addition, it can be configured such that images with at least two different exposure conditions are compared, and the calculated image information is generated as image data displayed in each sub frame based on information of the images of the respective exposure conditions and the respective exposure conditions or pixel value ratios.

In addition, the image processing circuit, the image processing method, and the display device of the present disclosure which have the preferable configuration as described above can be configured such that one of n images which are photographed under n exposure conditions is set as a reference exposure image and then an exposure condition is computed from a relative exposure ratio obtained by comparing the pixel values of the same pixel group of the reference exposure image and images with other exposure conditions. Alternatively, an exposure condition can be configured to be computed from a ratio pixel value at the same pixel position between images with respective exposure conditions.

In addition, in the image processing circuit, the image processing method, and the display device of the present disclosure which have the preferable configuration as described above, the sub frame signal generation unit can be configured such that duty of the light emitting elements is controlled for each sub frame according to exposure conditions. Alternatively, the sub frame signal generation unit can be configured such that duty of the light emitting elements is controlled using the value that is multiplied by the reciprocal of an exposure time ratio of the images with the respective exposure conditions.

Alternatively, in the image processing circuit, the image processing method, and the display device of the present disclosure which have the preferable configuration as described above, driving of a sub frame can be configured to be performed at the speed of a maximum of n times the frequency of one frame. In addition, a driving frequency of sub frames can be configured such that a combination of two or more different frequencies is set for each sub frame. In this case, a total period of n sub frames for which a combination of two or more different frequencies is set can be configured to be equal to a frame period.

In addition, the image processing circuit, the image processing method, and the display device of the present disclosure which have the preferable configuration as described above are configured such that a driving frequency of at least one sub frame is a standard frequency and a driving frequency of the other sub frames is a multiple of the standard frequency. In addition, they can be configured such that, when a driving frequency of the sub frames is x times (x is a natural number equal to or greater than 2) the standard frequency, write scanning of a video signal can be simultaneously performed in x lines. In addition, data of an image displayed at the driving frequency of the integral multiple of the standard frequency can be set to the average value of odd lines and even lines, or data of which a video spatial frequency band of a vertical direction has undergone a band limiting process.

Alternatively, the image processing circuit, the image processing method, and the display device of the present disclosure which have the preferable configuration as described above can be configured such that individual images with the n exposure conditions are analyzed and a driving frequency of a sub frame to be assigned to each image is decided. At this time, a standard driving frequency that does not lower vertical resolution can be configured to be assigned to an image that has a large number of high frequency components of a video vertical spatial frequency. In addition, a driving frequency at which vertical resolution is an integral fraction is assigned to images other than the image that has a largest number of high frequency components of the video vertical spatial frequency.

The display device of the present disclosure which includes the preferable configuration described above can be configured to have a control unit that can control a write scanning speed at which a light emission signal is written into a pixel and a light emission scanning speed at which the light emitting elements emit light in units of sub frames. The control unit can be configured to control such that the sub frames having different frequencies are set to have different write scanning speeds. In addition, the control unit can be configured to control such that the sub frames having different frequencies are set to have the same light emission scanning speed.

In addition, in the display device of the present disclosure which includes the preferable configuration described above, the control unit can be configured to control the reference voltage of the light emission signal in accordance with the control of the write scanning speed and the light emission scanning speed in units of sub frames. In addition, when a correction table for linearizing a gamma characteristic of light emission is provided, the control unit can be configured to replace the correction table when the reference voltage of the light emission signal is controlled.

<Display Device of the Present Disclosure>

Before the image processing circuit (or the image processing method) of the present disclosure is described, the display device to which the technology of the present disclosure is applied, i.e., the display device of the present disclosure, will be described.

[System Configuration]

FIG. 1 is a system configuration diagram showing a schematic basic configuration of the display device to which the technology of the present disclosure is applied, for example, an active-matrix display device.

The active-matrix display device is a display device which controls a current flowing in an electro-optical element (light emitting element) using an active element provided in the same pixel as the electro-optical element which is, for example, an insulated-gate field-effect transistor. As the insulated-gate field-effect transistor, a thin film transistor (TFT) can be typically used.

Herein, as an example, description will be provided exemplifying an active-matrix organic EL display device that uses organic EL elements as light emitting elements of pixels (pixel circuits). An organic EL element is an example of a current-driven electro-optical element of which light emission luminance changes according to a value of a current flowing a device. Hereinafter, there are cases in which a "pixel circuit" is simply described as a "pixel."

As shown in FIG. 1, the organic EL display device 10 to which the technology of the present disclosure is applied is configured to have a pixel array unit 30 in which a plurality of pixels 20 each including organic EL elements are two-dimensionally arrayed in a matrix shape and a drive circuit unit (driving unit) arranged in the periphery of the pixel array unit 30. The drive circuit unit includes, for example, a write scanning unit 40, a drive scanning unit 50, a signal output unit 60, and the like which are mounted on the same display panel 70 as the pixel array unit 30, and drives each of the pixels 20 of the pixel array unit 30. Note that it is also possible to employ a configuration in which some or all of the write scanning unit 40, the drive scanning unit 50, and the signal output unit 60 are provided outside the display panel 70.

Here, when the organic EL display device 10 displays in color, one pixel (unit pixel) serving as a unit forming a color image is constituted by a plurality of sub pixels. In this case, each of the sub pixels corresponds to a pixel 20 of FIG. 1. To be more specific, in the display device that displays in color, one pixel is constituted by, for example, three sub pixels including a sub pixel emitting red (R) light, a sub pixel emitting green (G) light, and a sub pixel emitting blue (B) light.

One pixel, however, is not limited to a combination of sub pixels having three primary colors including RGB, and it is also possible to add sub pixels having one or more colors to the sub pixels having the three primary colors to form one pixel. To be more specific, it is possible to form one pixel by adding a sub pixel that emits white (W) light to increase luminance, or to form one pixel by adding at least one sub pixel which emits a complementary color of light to expand a color reproduction range.

In the pixel array unit 30, scanning lines 31 ($31_1$ to $31_m$) and power supply lines 32 ($32_1$ to $32_m$) are wired for each pixel row in the row direction (pixel array direction of pixel rows or horizontal direction) in the array of the pixels 20 in m rows and n columns. Furthermore, signal lines 33 ($33_1$ to $33_n$) are wired for each pixel column in the column direction (pixel array direction of pixel columns or vertical direction) in the array of the pixels 20 in m rows and n columns.

The scanning lines $31_1$ to $31_m$ are connected to respective output terminals of the rows corresponding to the write scanning unit 40. The power supply lines $32_1$ to $32_m$ are connected to respective output terminals of the rows corresponding to the drive scanning unit 50. The signal lines $33_1$ to $33_n$ are connected to output terminals of the columns corresponding to the signal output unit 60.

The write scanning unit 40 is constituted by a shift register circuit, and the like. At the time of writing a signal voltage of a video signal onto each pixel 20 of the pixel array unit 30, the write scanning unit 40 performs so-called line sequential scanning in which each of the pixels 20 of the pixel array unit 30 is sequentially scanned in units of rows by sequentially supplying write scanning signals WS ($WS_1$ to $WS_m$) to the scanning lines 31 ($31_1$ to $31_m$).

The drive scanning unit 50 is constituted by a shift register circuit and the like, like the write scanning unit 40. The drive scanning unit 50 supplies power supply voltages DS ($DS_1$ to $DS_m$) that can switch to a first power supply voltage $V_{cc\_H}$ and a second power supply voltage $V_{cc\_L}$ that is lower than the first power supply voltage $V_{cc\_H}$ to the power supply lines 32 ($32_1$ to $32_m$) in synchronization with the line sequential scanning performed by the write scanning unit 40. As will be described later, light emission and non-light-emission (light-off) of the pixels 20 are controlled as the drive scanning unit 50 switches a voltage between the power supply voltages DS $V_{cc\_H}$ and $V_{cc\_L}$.

The signal output unit 60 selectively outputs a signal voltage of a video signal (which may be described hereinafter simply as a "signal voltage") $V_{sig}$ that is based on luminance information supplied from a signal supply source (not illustrated) and a reference voltage $V_{ofs}$. Herein, the reference voltage $V_{ofs}$ is a voltage serving as a reference of the signal voltage of the video signal $V_{sig}$ (for example, a voltage equivalent to a black level of the video signal), and is used in a threshold value correction process to be described later.

The signal voltage $V_{sig}$ and the reference voltage $V_{ofs}$ output from the signal output unit 60 are written into each of the pixels 20 of the pixel array unit 30 via the signal lines 33 ($33_1$ to $33_n$) in units of pixel rows selected through scanning performed by the write scanning unit 40. In other words, the signal output unit 60 employs a driving form of line sequential writing in which the signal voltage $V_{sig}$ is written in units of rows (lines).

(Pixel Circuit)

Figure 2:
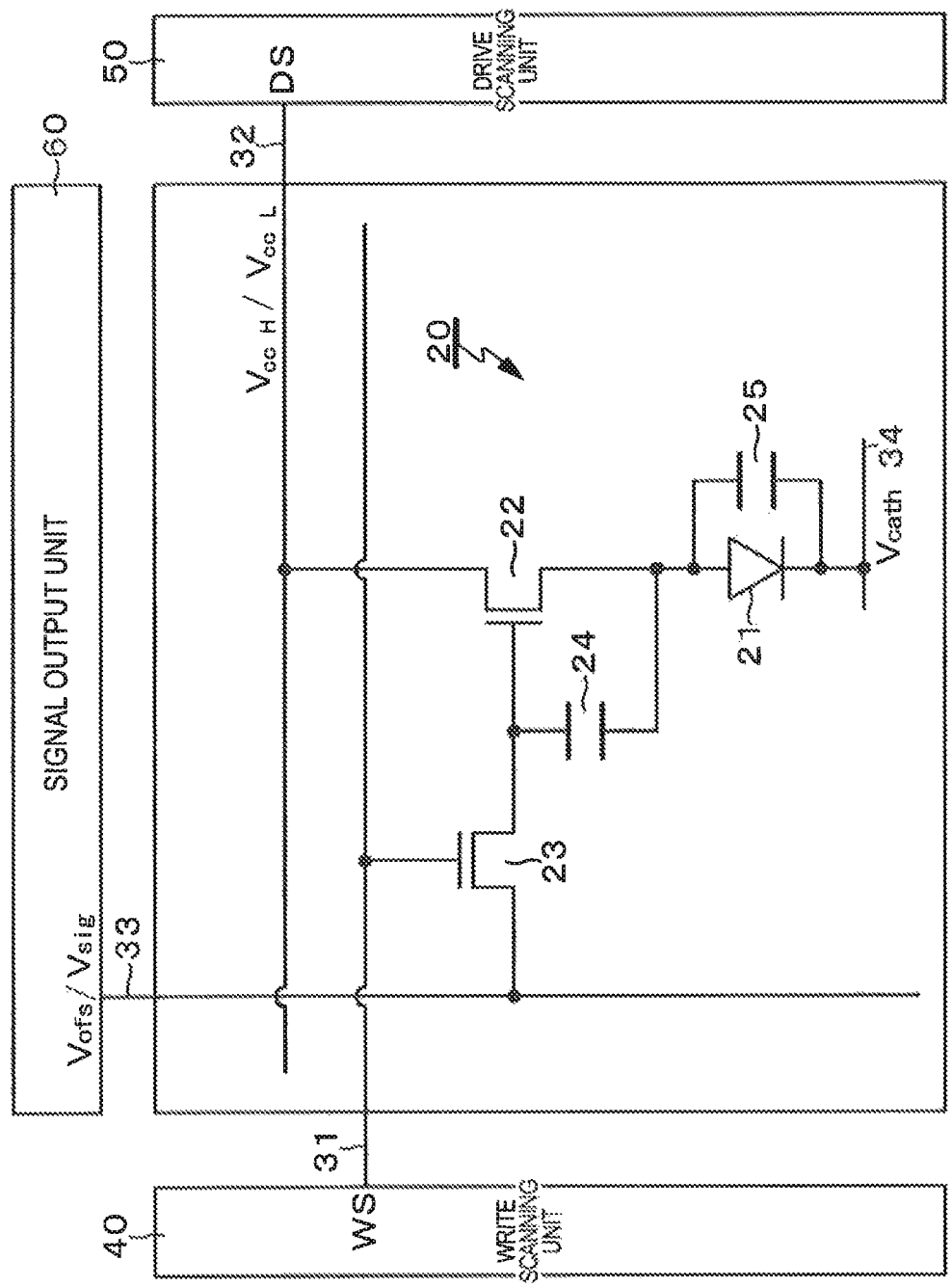
FIG. 2 is a circuit diagram showing an example of a detailed circuit configuration of a pixel (pixel circuit)

FIG. 2 is a circuit diagram showing an example of a detailed circuit configuration of a pixel (pixel circuit) 20. The light emission unit of the pixel 20 is constituted by an organic EL element 21 that is a current-driven electro-optical element of which light emission luminance changes according to a value of a current flowing through the device.

As shown in FIG. 2, the pixel 20 includes the organic EL element 21 and a drive circuit that drives the organic EL element 21 by applying a current to the organic EL element 21. The cathode electrode of the organic EL element 21 is connected to a common power supply line 34 that is commonly wired for all of the pixels 20.

The drive circuit that drives the organic EL element 21 is configured to have a drive transistor 22, a sampling transistor 23, a retention capacitor 24, and an auxiliary capacitor 25. As the drive transistor 22 and the sampling transistor 23, for example, N-channel TFTs can be used. The combination of the conductivity type of the drive transistor 22 and the sampling transistor 23 shown herein, however, is merely an example, and the present disclosure is not limited to this combination. In other words, a P-channel TFT can be used for one or both of the drive transistor 22 and the sampling transistor 23.

One electrode (the source or the drain electrode) of the drive transistor 22 is connected to the anode electrode of the organic EL element 21, and the other electrode (the source or the drain electrode) thereof is connected to each of the power supply lines 32 ($32_1$ to $32_m$).

One electrode (the source or the drain electrode) of the sampling transistor 23 is connected to each of the signal lines 33 ($33_1$ to $33_n$) and the other electrode (the source or the drain electrode) thereof is connected to the gate electrode of the drive transistor 22. In addition, the gate electrode of the sampling transistor 23 is connected to the scanning lines 31 ($31_1$ to $31_m$).

With regard to the drive transistor 22 and the sampling transistor 23, one electrode refers to a metal wire electrically connected to one source or drain region, and the other electrode refers to a metal wire electrically connected to the other source or drain region. In addition, one electrode may be a source electrode or a drain electrode, and the other electrode may be a drain electrode or a source electrode according to the electric potential relation between the one electrode and the other electrode.

One electrode of the retention capacitor 24 is connected to the gate electrode of the drive transistor 22, and the other electrode thereof is connected to the other electrode of the drive transistor 22 and to the anode electrode of the organic EL element 21.

One electrode of the auxiliary capacitor 25 is connected to the anode electrode of the organic EL element 21, and the other electrode thereof is connected to a node of a fixed electric potential (in the present example, the common power supply line 34 or the cathode electrode of the organic EL element 21). The auxiliary capacitor 25 is provided in order to, for example, complement a shortage of capacitance of the organic EL element 21, and to increase a write gain of a video signal with respect to the retention capacitor 24. The auxiliary capacitor, however, is not an indispensable constituent element. In other words, the auxiliary capacitor 25 is not necessary when it is not necessary to compensate for the shortage of capacitance of the organic EL element 21.

In the pixel 20 having the configuration described above, the sampling transistor 23 enters a conductive state in which a state of a high voltage applied to the gate electrode thereof through the scanning line 31 from the write scanning unit 40 becomes an active state in response to the write scanning signal WS. Accordingly, the sampling transistor 23 performs sampling on the signal voltage of the video signal $V_{sig}$ or the reference voltage $V_{ofs}$ according to luminance information supplied from the signal output unit 60 through the signal line 33 at different time points and writes the voltages into the pixel 20. The signal voltage $V_{sig}$ or the reference voltage $V_{ofs}$ written by the sampling transistor 23 are retained by the retention capacitor 24.

When the power supply voltage DS of the power supply lines 32 ($32_1$ to $32_m$) becomes the first power supply voltage $V_{cc\_H}$, the drive transistor 22 operates in a saturation region as one electrode thereof serves as the drain electrode and the other electrode serves as the source electrode. Accordingly, the drive transistor 22 receives supply of a current from the power supply line 32 and then drives the organic EL element 21 to emit light through current driving. To be more specific, the drive transistor 22 supplies the driving current of a current value according to the voltage value of the signal voltage $V_{sig}$ retained in the retention capacitor 24 to the organic EL element 21 to drive the organic EL element 21 to emit light using the current.

When the power supply voltage DS is switched from the first power supply voltage $V_{cc\_H}$ to the second power supply voltage $V_{cc\_L}$, the drive transistor 22 further operates as a switching transistor as one electrode thereof serves as the source electrode and the other electrode thereof serves as the drain electrode. Accordingly, the drive transistor 22 stops the supply of the driving current to the organic EL element 21 thereby setting the organic EL element 21 to be in a non-light-emission state. In other words, the drive transistor 22 also has the function as a transistor which controls light emission and non-light-emission of the organic EL element 21 through switching of the power supply voltage DS ($V_{cc\_H}$ or $V_{cc\_L}$).

Through the switching operation of the drive transistor 22, it is possible to set a period in which the organic EL element 21 is in a non-light-emission state (non-light-emission period) and to control a ratio of a light emission period and a non-light-emission period (duty) of the organic EL element 21. With the control of duty, it is possible to reduce after image and blur caused by light emission of the pixel 20 over one display frame period and particularly to make a level of quality of a dynamic image more excellent.

Among the first and second power supply voltages $V_{cc\_H}$ and $V_{cc\_L}$ which are selectively supplied from the drive scanning unit 50 through the power supply line 32, the first power supply voltage $V_{cc\_H}$ is a power supply voltage for supplying a drive current that drives the organic EL element 21 to emit light to the drive transistor 22. In addition, the second power supply voltage $V_{cc\_L}$ is a power supply voltage for applying an inverse bias to the organic EL element 21. The second power supply voltage $V_{cc\_L}$ is set to a voltage lower than the reference voltage $V_{ofs}$, for example, when the threshold voltage of the drive transistor 22 is set to $V_{th}$, the second power supply voltage is set to a voltage lower than $V_{ofs}-V_{th}$, and preferably to a voltage sufficiently lower than $V_{ofs}-V_{th}$.

In the organic EL display device 10 described above, each pixel 20 of the pixel array unit 30 has the function of correcting variation of a drive current resulting from variation of characteristics of the drive transistor 22. Here, as the characteristics of the drive transistor 22, for example, the threshold voltage $V_{th}$ of the drive transistor 22, and a mobility u of a semiconductor thin film constituting a channel of the drive transistor 22 (which will be described hereinafter simply as "mobility u of the drive transistor 22") are exemplified.

Correction of the variation of a drive current resulting from variation of the threshold voltage $V_{th}$ of the drive transistor 22 (which will be described hereinafter as "threshold value correction") is performed by initializing a gate voltage $V_g$ of the drive transistor 22 to the reference voltage $V_{ofs}$. To be specific, a process of having the initialized voltage (the reference voltage $V_{ofs}$) of the gate voltage $V_g$ of the drive transistor 22 as a reference, and then changing a source voltage $V_s$ of the drive transistor 22 toward a voltage obtained by subtracting the threshold voltage $V_{th}$ of the drive transistor 22 from the initialized voltage is a threshold value correction process.

On the other hand, correction of a drive current resulting from variation of the mobility u of the drive transistor 22 (which will be described hereinafter as "mobility correction") is performed by causing a current to flow into the retention capacitor 24 via the drive transistor 22 in a conductive state of the sampling transistor 23 and a state in which the signal voltage $V_{sig}$ of a video signal is written. In other words, a process of applying negative feedback to the retention capacitor 24 in a feedback amount (correction amount) according to a current $I_{ds}$ flowing in the drive transistor 22 is a mobility correction process. Through the threshold value correction process, dependency of a drain-source current $I_{ds}$ on the threshold voltage $V_{th}$ is already negated when the signal voltage $V_{sig}$ of the video signal is written, and the drain-source current $I_{ds}$ becomes dependent on the mobility u of the drive transistor 22.

Thus, by executing the mobility correction process for applying negative feedback to a drain-source voltage $V_{ds}$ of the drive transistor 22 in a feedback amount according to the drain-source current $I_{ds}$ flowing in the drive transistor 22, it is possible to suppress dependency of the drain-source current $I_{ds}$ flowing in the drive transistor 22 on the mobility u. In other words, by executing a correction process such as threshold value correction or mobility correction, it is possible to uniformly maintain light emission luminance of the organic EL element 21 without it being affected by a temporal change of a transistor characteristic (the threshold voltage $V_{th}$ or the mobility u) of the drive transistor 22 or the like. As a result, a display image of satisfactory quality can be obtained.

The organic EL display device 10 to which the technology of the present disclosure is applied (display device of the present disclosure) described above has an image processing circuit of the present disclosure (or uses an image processing method of the present disclosure) that will be described below. In addition, a video signal processed by the image processing circuit (in the image processing method) of the present disclosure is supplied to the signal output unit 60 provided on the display panel 70 described previously, and used to drive each of the pixels 20 of the pixel array unit 30. Hereinbelow, embodiments of the image processing circuit (and the image processing method) of the present disclosure will be described.

Description of Embodiments

In the present embodiment, an image information group of which images are obtained by photographing the same scene under at least two exposure (light-exposure) conditions is packed as one scene and the packed video information is treated as one-frame video information. The video information group is constituted by, for example, a set of image information of which images are photographed by varying a shutter speed rate in a plurality of stages (for example, two stages of ½ times and one times a shutter speed) using a consecutive photographing function of a camera. Generally, by changing an exposure condition, it is possible to effectively utilize a high dynamic range (HDR) of an imaging device so as to control a range of a reflectance of a subject that can be photographed.

Normally, in a digital camera defined with a high dynamic range (HDR), a process of combining image information for expanding a dynamic range (to a high dynamic range) under control of a processor mounted therein is performed after such an image information group is acquired. Then, a process of converting the information into one piece of HDR image information which has undergone a compression process in a predetermined grayscale reproduction range is performed. Meanwhile, the image information used in the present embodiment is an image information group before combination of HDR signals.

An image processing circuit (or the image processing method) according to the present embodiment receives input of n pieces of image information of n images which are obtained by photographing the same scene under n (n is a natural number equal to or greater than 2) exposure conditions and the n exposure conditions at the time of photographing. Then, when a display video of one scene is constituted by a maximum of n sub frames, video signals of the maximum of n sub frames are generated by controlling light emission times of the light emission elements for the sub frames according to the n exposure conditions. At that time, light emission luminance per unit time of the light emission elements is preferably controlled for each sub frame according to the n pieces of image information.

Here, the light emission luminance of the light emission elements per unit time is set to be controlled for each sub frame according to the image information, however, it is also possible to control the light emission luminance of the light emission elements per unit time for each sub frame according to calculated image information computed through a predetermined calculation based on the image information. In this case, images of at least two different exposure conditions are compared and the calculated image information can thereby be generated as image data displayed in each sub frame from information of each exposure image and each exposure condition or a pixel value ratio.

The image processing circuit (or the image processing method) according to the present embodiment employs a technique of displaying a plurality of images in units of sub frames as they are without performing the process of combining image information, for example, alternately displaying the images in units of sub frames in states of dark images and bright images, which is referred to as sub frame display. In addition, in sub frame display, grayscale information at the time of photographing can be effectively reproduced in order to optically add a plurality of pieces of input image information. Furthermore, by controlling a light emission condition, i.e., a light emission time of the light emission elements for each sub frame according to an exposure condition, the exposure condition of a subject is reflected in a display condition, and thus screen display luminance at the time of sub frame expression can correctly express a reflectance of the subject in a photographed image.

The screen display luminance in a frame period is expressed as the sum of products of video signal levels of a maximum of n sub frames and light emission times. In other words, it is expressed as follows:

Screen display luminance=light emission time 1 of sub frame 1×light emission luminance 1 per unit time+light emission time 2 of sub frame 2×light emission luminance 2 per unit time+ . . . +light emission time n of sub frame n×light emission luminance n per unit time.

Note that, for a plurality of exposure images, continuously photographed images synchronized with a sub frame period can also be used as input images without change.

Hereinafter, specific examples in which light emission luminance of the light emission elements per unit time is controlled for each sub frame according to n pieces of image information and a light emission time of the light emission elements is controlled for each sub frame according to n exposure conditions will be described.

Example 1

Figure 3:
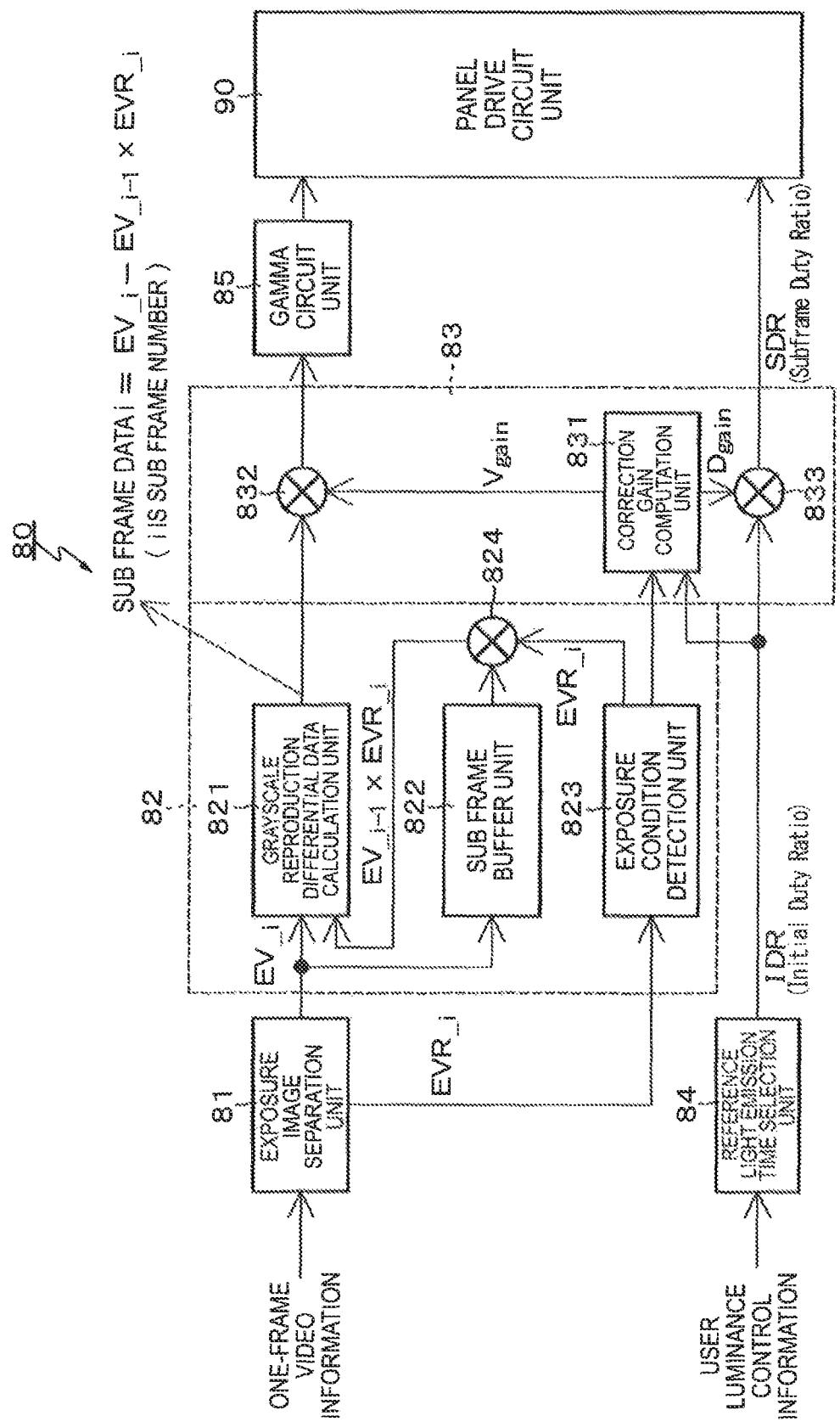
FIG. 3 is a block diagram showing a configuration of an image processing circuit according to Example 1.

FIG. 3 is a block diagram showing a configuration of an image processing circuit according to Example 1. As shown in FIG. 3, the image processing circuit 80 according to Example 1 is configured to have an exposure image separation unit 81, a sub frame signal generation unit 82, a sub frame correction unit 83, a reference light emission time selection unit 84, and a gamma circuit unit 85. The image processing circuit 80 receives inputs of one-frame video information and user luminance control information.

The one-frame video information is, as previously described, video information obtained by packing an image information group which is obtained by photographing the same scene under at least two exposure conditions as one scene, and is input to the exposure image separation unit 81. The user luminance control information is control information for arbitrarily setting screen display luminance, and is input to the reference light emission time selection unit 84. The reference light emission time selection unit 84 receives the user luminance control information, and selects and sets an initial light emission time IDR (initial duty ratio) as a reference light emission time of the light emission elements.

In the image processing circuit 80 of the above-described configuration, the exposure image separation unit 81 separates the one-frame video information, i.e., the packed image information group, into images photographed under individual exposure conditions (which will be described hereinafter as "exposure images") and computes an exposure ratio EVR from the image information group. Here, the exposure ratio EVR is a ratio of exposure times (shutter speeds) of exposure images. An exposure time is an example of an exposure condition (exposure information or exposure-relevant information) recorded in a tag of image data or the like. An exposure condition is not limited to an exposure time, and for example, gain information of an individual sensor can also be used as an exposure condition. "Sensor" mentioned herein refers to a light receiving element (photosensor) of an imaging device, and "gain" refers to a gain of an amplifier unit that amplifies output of a light receiving element. The exposure-relevant information recorded in the tag of the image data or the like can be used directly, or a result obtained by interpreting the exposure-relevant information in any form of a conversion table or the like based on tag information can also be used.

Herein, as an example, one-frame video information is assumed to include two exposure images EV1 and EV2 photographed under two exposure conditions. When the one-frame video information includes the two exposure images EV1 and EV2, the two exposure images EV1 and EV2 can be configured to include, for example, combinations of a reference exposure image and a short-time exposure image or a long-time exposure image. The exposure image separation unit 81 outputs the separated exposure images EV (EV1 and EV2) in association with the exposure ratios EVR (EVR 1 and EVR 2) in a time series manner.

The exposure ratios EVR can be obtained by setting one of n images photographed under n exposure conditions as a reference exposure image, comparing pixel values of the same pixel group in the reference exposure image and the other images of the exposure conditions, and computing a relative exposure ratio. Specifically, when pixel values of the separated exposure images EV1 and EV2 are set to $PV(x, y)\_{EV1}$ and $PV(x, y)\_{EV2}$ respectively and a total number of pixels of the exposure images EV1 and EV2 is set to S, the value of the exposure ratio EVR2 of the exposure image EV2 when the exposure image EV1 serves as a reference can be computed based on the following formula.

$$EVR2 = 1/S\{\Sigma\{PV(x,y)\_{EV2}/PV(x,y)\_{EV1}\}\}$$

Herein, the exposure ratio EVR is set to be obtained by comparing the pixel values of the same pixel group and computing a relative exposure ratio, however, the example is not limited thereto. For example, the exposure ratio EVR can also be obtained by computing a pixel value (signal level) ratio in the same pixel position (x, y) among separated different exposure images. Note that, when the pixel value ratio is computed, it is preferable to set each pixel value not to be saturated.

Herein, the display panel that is a drive target of the present image processing circuit 80 is assumed to be a panel (for example, the display panel 70 of FIG. 1) in which one pixel that is a unit for forming a color image (unit pixel or pixel) is constituted by, for example, RGB sub pixels. In this case, a value of the exposure ratio EVR2 computed using the above-described formula can also be individually used for each of RGB. In the present example, however, the average value of the RGB sub pixels is computed and the average value is set to be used as the common value of the exposure ratios EVR.

In addition to having the functions of separating the exposure image EV and computing the exposure ratios EVR, the exposure image separation unit 81 also controls an output order of the exposure images EV. To be specific, the exposure image separation unit 81 controls such that the output order of the exposure images EV is automatically changed to a size order of the exposure ratios EVR or to an output order that is arbitrarily designated by a user. The present example is set to employ a control form with respect to an output order in which higher exposure ratios EVR are sequentially output.

In addition, the exposure image separation unit 81 also has a user adjustment function of, when the number of images n of an image information group for which exposure conditions are changed is greater than the number of displayed sub frames m (n>m), selecting a desired piece of image information from n pieces of image information and then displaying a number of pieces of the image information corresponding to the number of displayed sub frames m. The number of displayed sub frames m is basically decided according to driving performance of the display panel.

With regard to a driving frequency (processing frequency) of circuit units including the exposure image separation unit 81 and succeeding units, i.e., a sub frame driving frequency, the units are set to be operated at least at a frequency obtained by multiplying a frame frequency by the number of displayed sub frames (m) or higher. For example, when the number of displayed sub frames m is set to 2 and one-frame frequency is set to 60 Hz, the sub frame driving frequency is 120 Hz.

The exposure images EV separated by the exposure image separation unit 81 and the exposure ratios EVR computed by the exposure image separation unit 81 are supplied to the sub frame signal generation unit 82. The sub frame signal generation unit 82 generates a video signal of sub frames for realizing an optimum dynamic range (which may be described hereinafter as a "sub frame signal") based on the exposure images EV and the exposure ratios EVR.

Figure 4A:
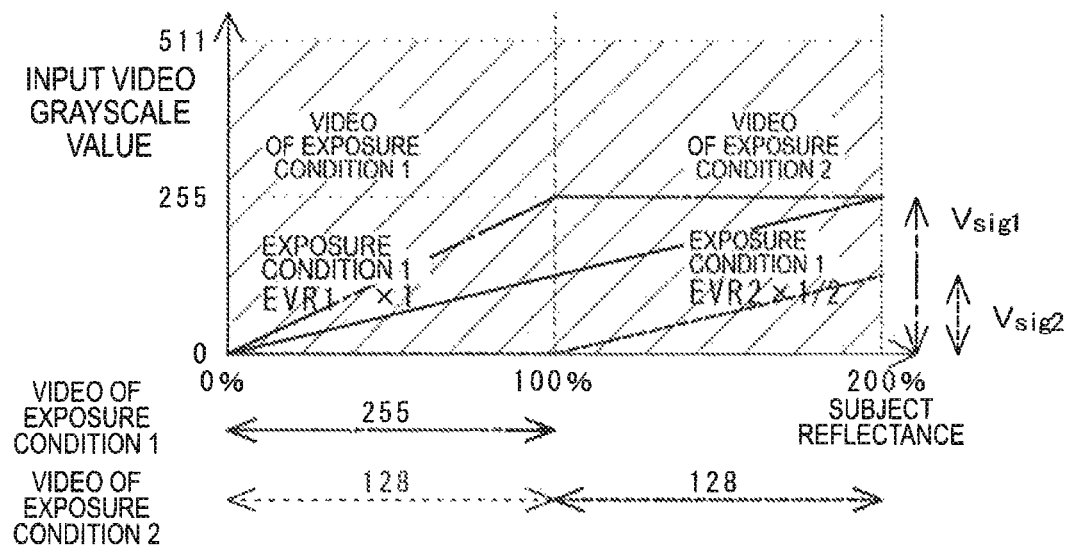
FIG. 4A shows a characteristic of a subject reflectance-input video grayscale value and FIG. 4B shows a characteristic of a subject reflectance-output video grayscale value.
Figure 4B:
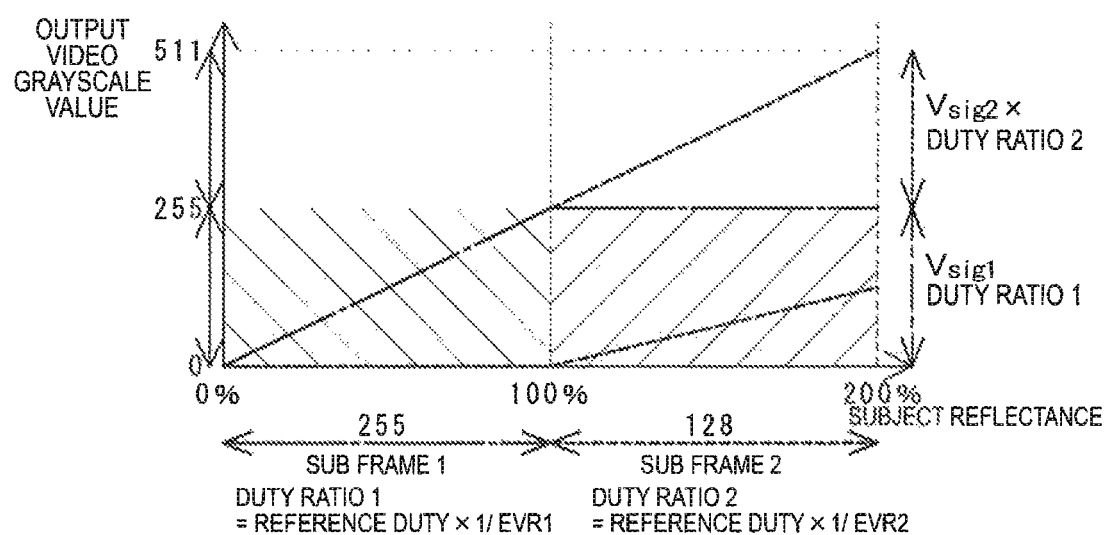

Here, an overview of data generation example 1 of the sub frame signal when the sub frame signal generation unit 82 receives inputs of the two kinds of exposure images EV1 and EV2 and the exposure ratios EVR1 and EVR2 computed based on the exposure image EV1 will be described based on FIG. 4. Data generation example 1 is the case in which the exposure ratio EVR is doubled (multiplied by two). FIG. 4A shows a characteristic of subject reflectance-input video grayscale values and FIG. 4B shows a characteristic of subject reflectance-output video grayscale values.

The exposure image EV1 is an image having a signal value which is saturated with a subject reflectance of 100% or higher and with which subject luminance can be fully reproduced in a subject reflectance lower than 100%, that is, a relatively bright image. Thus, in the sub frame 1 expressing information of the subject reflectance of 100% or lower, a process of assigning the exposure image EV1 without change is performed. The exposure image EV2 is an image having a signal value which can reproduce luminance without being saturated to a subject reflectance of 200%, that is, a relatively dark image. Thus, in order to display with a subject reflectance of 100% or higher and lower than 200% in the sub frame 2, control is performed such that the exposure image EV2 is selected and assigned.

However, since the exposure image EV2 also includes information of a subject reflectance lower than 100%, when the image is used as it is as display data, the information of the subject reflectance lower than 100% is added uselessly. Therefore, in order to assign the image as data of a sub frame signal (which may be described hereinafter as "sub frame data"), a process of subtracting the information of the subject reflectance lower than 100% therefrom and extracting only information of the subject reflectance equal to or higher than 100% is performed. Specifically, sub frame data can be obtained through calculation of the following definition formula.

Sub frame data 1=$EV1$

Sub frame data 2=$EV2-EVR2 \times EV1$

Here, if the exposure ratios EVR are processed in an order of higher values during computation of sub frame data, there is a merit that a waiting time for computing data (calculation delay time) can be shortened. The relation between an exposure ratio EVR and sub frame data is as follows.

Data of which an Exposure Ratio EVR is High and High Luminance Components are Saturated (LDR)

Data of which an exposure ratio EVR is high and high luminance components are not saturated (LDR+HDR); note that LDR refers to a low dynamic range and HDR refers to a high dynamic range.

As is obvious from the above description, when the exposure image EV2 (LDR+HDR) is input first, it is necessary to input the exposure image EV1 (LDR) to compute the sub frame data 2. Thus, when data is input in a time series manner, it is necessary to wait for calculation until two pieces of data are prepared, and thus a calculation delay time is generated. On the other hand, when input is performed from the exposure image EV1, in other words, the exposure image EV1 is input first, it is possible to use data of the exposure image EV1 as sub frame data, it is therefore not necessary to wait for the calculation, and thus the calculation delay time can be shortened.

The sub frame signal generation unit 82 is configured to have, for example, a grayscale reproduction differential data calculation unit 821, a sub frame buffer unit 822, an exposure condition detection unit 823, and a multiplier 824 as shown in FIG. 3. The grayscale reproduction differential data calculation unit 821 and the sub frame buffer unit 822 receive the exposure images EV separated by the exposure image separation unit 81 as inputs. The exposure condition detection unit 823 receives the exposure ratios EVR computed by the exposure image separation unit 81 as inputs and outputs a gain decided based on the exposure ratios EVR.

Here, when the exposure image EV of an $i^{th}$ sub frame is set to $EV_{-i}$, the sub frame buffer unit 822 outputs the exposure image $EV_{-i-1}$ of the sub frame that is one sub frame before the aforementioned sub frame. Then, the multiplier 824 multiplies the exposure image $EV_{-i-1}$ by a gain $EVR\_i$ of the exposure image $EV_{-i}$ of the $i^{th}$ sub frame output from the exposure condition detection unit 823. The multiplication result (=$EV_{-i-1} \times EVR_{-i}$) of the multiplier 824 is supplied to the grayscale reproduction differential data calculation unit 821.

The grayscale reproduction differential data calculation unit 821 performs a process of subtracting the information of the subject reflectance lower than 100% and extracting only the information of the subject reflectance equal to or greater than 100%, in other words, a process of computing sub frame grayscale reproduction differential data. To be specific, the grayscale reproduction differential data calculation unit 821 performs a process of subtracting the multiplication result (=$EV_{-i-1} \times EVR_{-i}$) of the multiplier 824 from the exposure image $EV_{-i}$. By performing the subtraction process, the grayscale reproduction differential data calculation unit 821 outputs $EV_{-i}-EV_{-i-1} \times EVR_{-i}$ as data of a sub frame i (i is a sub frame number) (which will be described hereinafter as "sub frame data i").

As such, the process of obtaining the sub frame data i in the calculation of the definition formula can be performed in a time series manner by using the grayscale reproduction differential data calculation unit 821 which has the subtraction function and the sub frame buffer unit 822 which has the function of delaying a time for one sub frame. On the premise that the sub frame buffer unit 822 should be reset to 0 at the time of the generation process of the first sub frame data 1, the definition formula can be expressed as follows.

Sub frame data 1=$EV1-EVR1 \times ALL0$

Sub frame data 2=$EV2-EVR2 \times EV1$

In the image processing circuit 80, a process of computing a correction value (correction gain) of a sub frame light emission time is performed by the sub frame correction unit 83 in parallel with generation of the sub frame data i by the sub frame signal generation unit 82.

As seen in FIG. 4, in order to maintain the linear relation between an input subject reflectance and panel display luminance, it is necessary to set luminance of the sub frame 1 handling display of a subject reflectance lower than 100% and luminance of the sub frame 2 handling display of a subject reflectance equal to higher than 100% and lower than 200% to have substantially the same value. When light emission times are set to be the same as each other with the value of the generated sub frame signal, the relation of the luminance of the sub frame 2÷half of the luminance of sub frame 1 is made, and thus it is ascertained that linearity of an input subject reflectance and panel display luminance at the time of a frame display operation is not satisfied.

Therefore, in the present example, in order to maintain linearity of reproduction of luminance in a sub frame display operation, correction of a light emission time for each sub frame SDR (sub frame duty ratio) (which may be described hereinafter as a "sub frame light emission time") is performed by the sub frame correction unit 83 based on the values of the exposure ratios EVR. The sub frame correction unit 83 is configured to have a correction gain computation unit 831, and multipliers 832 and 833.

The correction gain computation unit 831 of the sub frame correction unit 83 receives inputs of the exposure ratios EVR and computes a correction gain (correction coefficient) $C_{gain}$ for each sub frame based on the exposure ratios EVR. To be specific, the correction gain computation unit 831 computes the correction gain $C_{gain}$ using the reciprocal of the exposure ratio EVR ($C_{gain}=1/EVR$) and then performs a process of assigning the value to a correction gain $D_{gain}$ of the sub frame light emission time SDR.

In the data generation example 1, correction is not performed in the sub frame 1 because $C_{gain}=1$. In the sub frame 2, a correction process in which the sub frame light emission time SDR is multiplied by $C_{gain}$ is performed in order to satisfy $C_{gain}=1/EVR2$.

Here, when the luminance of the sub frame 1 is set to L1, the luminance of the sub frame 2 to L2, the duty of the sub frame 1 to Duty1, and the duty of the sub frame 2 to Duty2, the following is satisfied.

$L1 \propto$ sub frame data $1 \times$ Duty1

$L2 \propto$ sub frame data $2 \times$ Duty1 $\times C_{gain}$ $\propto$ half of sub frame data $1 \times$ Duty1 $\times C_{gain} = L1$ With regard to the correction of the sub frame light emission time SDR, a range of a controllable light emission time is finite, and thus a the correction limitation is generated depending on a value of the initial light emission time IDR set by the reference light emission time selection unit 84.

Figure 5A:
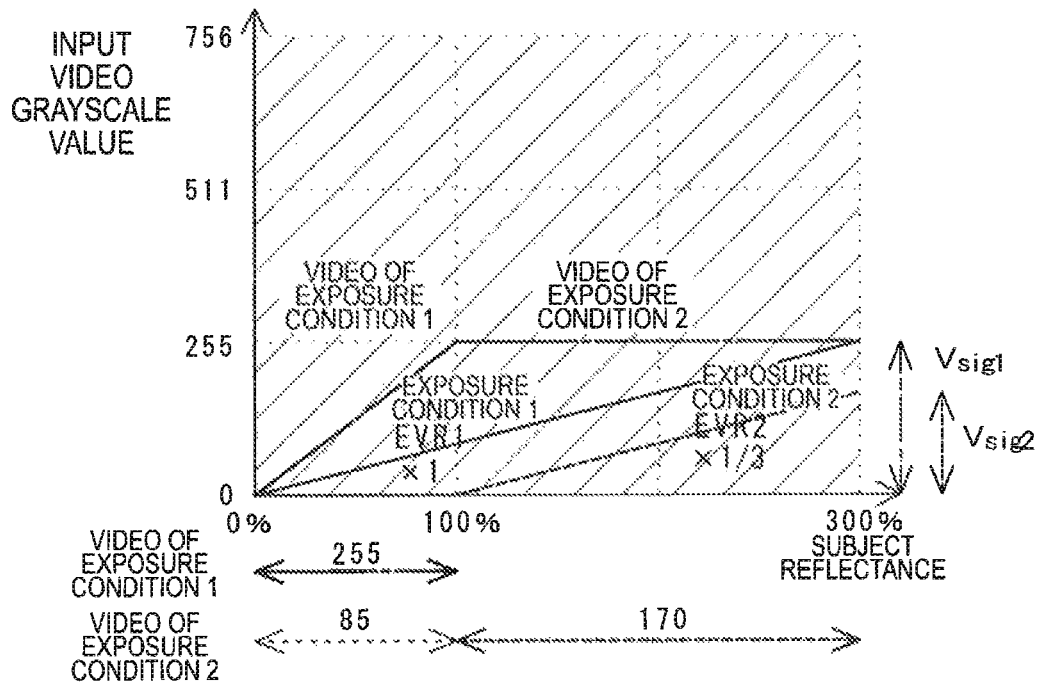
FIG. 5A shows a characteristic of a subject reflectance-input video grayscale value and FIG. 5B shows a characteristic of a subject reflectance-output video grayscale value.
Figure 5B:
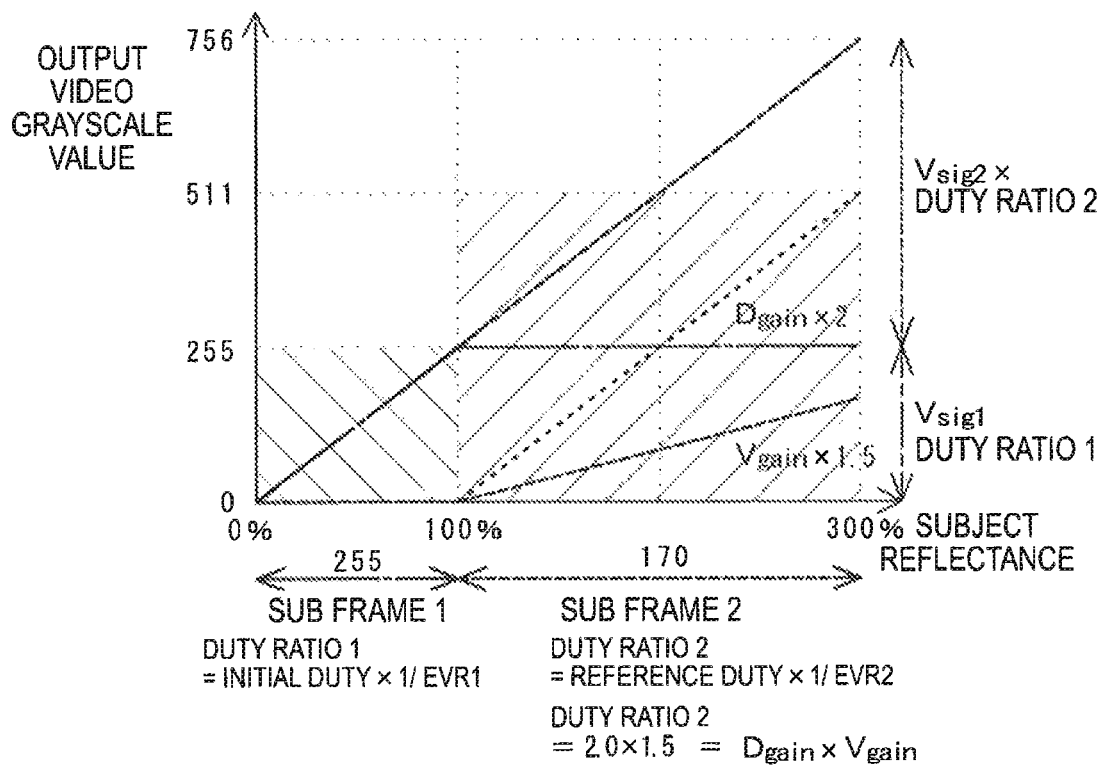

FIG. 5 is a diagram for describing an overview of data generation example 2 of a sub frame signal, in which FIG. 5A shows a characteristic of a subject reflectance-input video grayscale value and FIG. 5B shows a characteristic of a subject reflectance-output video grayscale value. The data generation example 2 is a case in which the exposure ratio EVR is tripled (multiplied by three). In the data generation example 2, the correction gain $C_{gain}=3$, however, when an initial duty ratio is 0.5, for example, the correction limitation of the sub frame light emission time SDR, is doubled because the restriction of the initial duty ratio $\times D_{gain} \leq 1$ is made, and thus a correction amount of 1.5 times is lacking.

Therefore, in the present example, correction is performed using a correction gain $V_{gain}$ on sub frame data for the lacking amount of gain correction. To be specific, with regard to the correction gain $D_{gain}$ of the sub frame light emission time SDR and the correction gain $V_{gain}$ of the sub frame data i, the correction gain computation unit 831 sets each of the correction gains $D_{gain}$ and $V_{gain}$ so as to satisfy the relation of $C_{gain} = D_{gain} \times V_{gain}$.

Here, if $V_{gain} = 1.5$ and $D_{gain} = 2.0$ are set, $L1 \propto$ sub frame data $1 \times$ Duty1

$L2 \propto$ sub frame data $2 \times$ Duty1 $\times C_{gain}$ $\propto$ half of sub frame data $1 \times V_{gain} \times$ Duty1 $\times D_{gain}$ $\propto$ two thirds of sub frame data $1 \times 3 \times$ Duty1 $= 2 \times L1$ Thus, the sub frame correction unit 83 controls light emission of the display panel based on the sub frame data i and the sub frame light emission time SDR considering the correction gains $V_{gain}$ and $D_{gain}$ computed by the correction gain computation unit 831. To be specific, the sub frame data i is corrected by the multiplier 832 multiplying the sub frame data i by the correction gain $V_{gain}$. Then, the corrected sub frame data i is supplied to a panel drive circuit unit 90 via the gamma circuit unit 85. The panel drive circuit unit 90 drives the light emission elements of the pixels to emit light with light emission luminance (light emission luminance per unit time) according to the sub frame data i.

In addition, when the multiplier 833 multiplies the initial light emission time IDR set by the reference light emission time selection unit 84 by the correction gain $D_{gain}$, correction for maintaining the linearity of reproduction of luminance of a sub frame display operation, i.e., correction of the sub frame light emission time SDR, is performed. Then, the corrected sub frame light emission time SDR is supplied to the panel drive circuit unit 90. The panel drive circuit unit 90 decides a light emission time for each sub frame based on the sub frame light emission time SDR, and then controls duty of the light emission element. In other words, the ratio of a light emission time of the light emission elements to a non-light-emission time, i.e., duty, is controlled for each sub frame according to an exposure condition. The organic EL display device 10 described above can control duty of the organic EL element 21 at switch timings of the power supply voltages DS of $V_{cc\_H}$ and $V_{cc\_L}$.

Here, with regard to a light emission characteristic of the display panel, it is generally known that light emission luminance (display luminance) indicates a non-linear characteristic with respect to an input signal. For this reason, a process of correcting the characteristic of the light emission luminance with respect to an input signal (in other words, the light emission characteristic of the display panel) to be linear is indispensable. This correction process is executed by the gamma circuit unit 85.

The gamma circuit unit 85 has a correction table (correction coefficient group) for making the characteristic of the light emission luminance (a gamma characteristic of light emission) with respect to an input signal linear. In addition, as the gamma circuit unit 85 performs gamma correction based on the correction table, linearity of the light emission luminance with respect to an input signal is maintained even when sub frame display is performed.

Figure 6A:
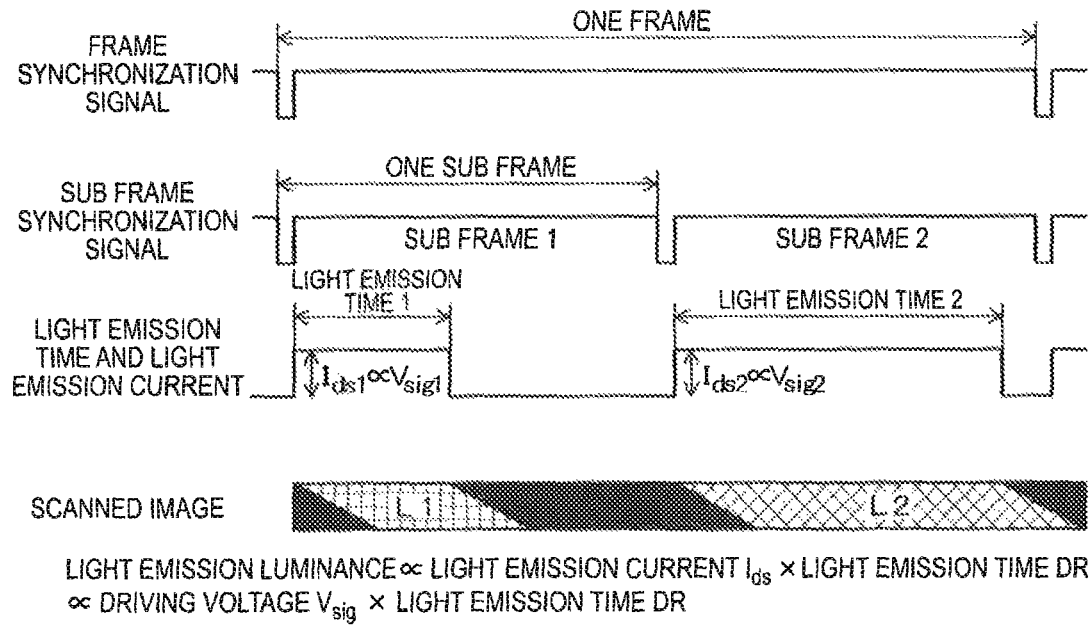
FIG. 6A is an illustrative diagram with respect to the principle of control of light emission luminance of a display panel and FIG. 6B is a grayscale-luminance characteristic diagram when (1) a light emission time DR1>a light emission time DR2, (2) the light emission time DR1=the light emission time DR2, and (3) the light emission time DR1<the light emission time DR2.
Figure 6B:
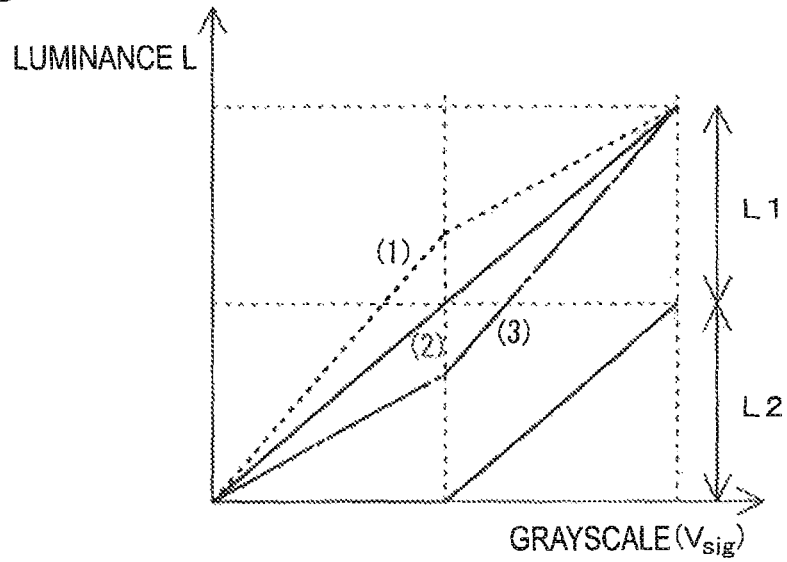

Here, the principle of control of light emission luminance of the display panel using the sub frame data i and the sub frame light emission time SDR will be described using FIG. 6. FIG. 6A is an illustrative diagram with respect to the principle of control of light emission luminance of the display panel. In addition, FIG. 6B is a grayscale-luminance characteristic diagram when (1) a light emission time DR1>a light emission time DR2, (2) the light emission time DR1=the light emission time DR2, and (3) the light emission time DR1<the light emission time DR2.

Luminance in an operation of sub frame display is defined as shown in the following formula, and the sum of luminance Li (i is a sub frame number) of sub frames is frame luminance L. Here, when i=2, if the light emission time of the sub frame 1 is set to DR1, the light emission time of the sub frame 2 to DR2, the signal level of the sub frame 1 to $V_{sig1}$, and the signal level of the sub frame 2 to $V_{sig2}$, L is defined as follows.

$$L = L1 + L2$$
$$= DR1 \times V_{sig1} + DR2 \times V_{sig2}$$

Sub frame luminance Li can be expressed as the product of light emission luminance and a light emission time per unit time as illustrated in FIG. 6A. In addition, the light emission luminance per unit time is controlled in proportion to a signal voltage (drive voltage) $V_{sig}$ or a signal current (light emission current) $I_{ds}$ applied to the light emission elements of the display panel, and the sum of luminance L1 and L2 of individual sub frames is recognized as sub frame luminance L.

As described above, the image processing circuit (or image processing method) according to Example 1 employs the technique of displaying a plurality of images of which a grayscale expression range is divided in units of sub frames as they are without performing a process of combining image information, for example, performing sub frame display in which states of dark images and bright images are alternately displayed. In addition, in the sub frame display, since a plurality of pieces of input image information are optically added, it is possible to effectively reproduce grayscale information at the time of photographing.

In addition, without using an expensive multi-bit driver or the like, it is possible to express linearity up to a subject reflectance of 200% while maintaining expression performance with respect to low grayscales. Accordingly, a low-bit driver can be used, and thus system costs can be reduced. In addition, since an exposure condition of a subject is reflected in a display condition and the relation between a subject reflectance and display luminance can be linear, screen display luminance during sub frame expression can correctly express a subject reflectance of a photographed image and thus image reproduction that is close to actual viewing can be achieved.

Figure 7:
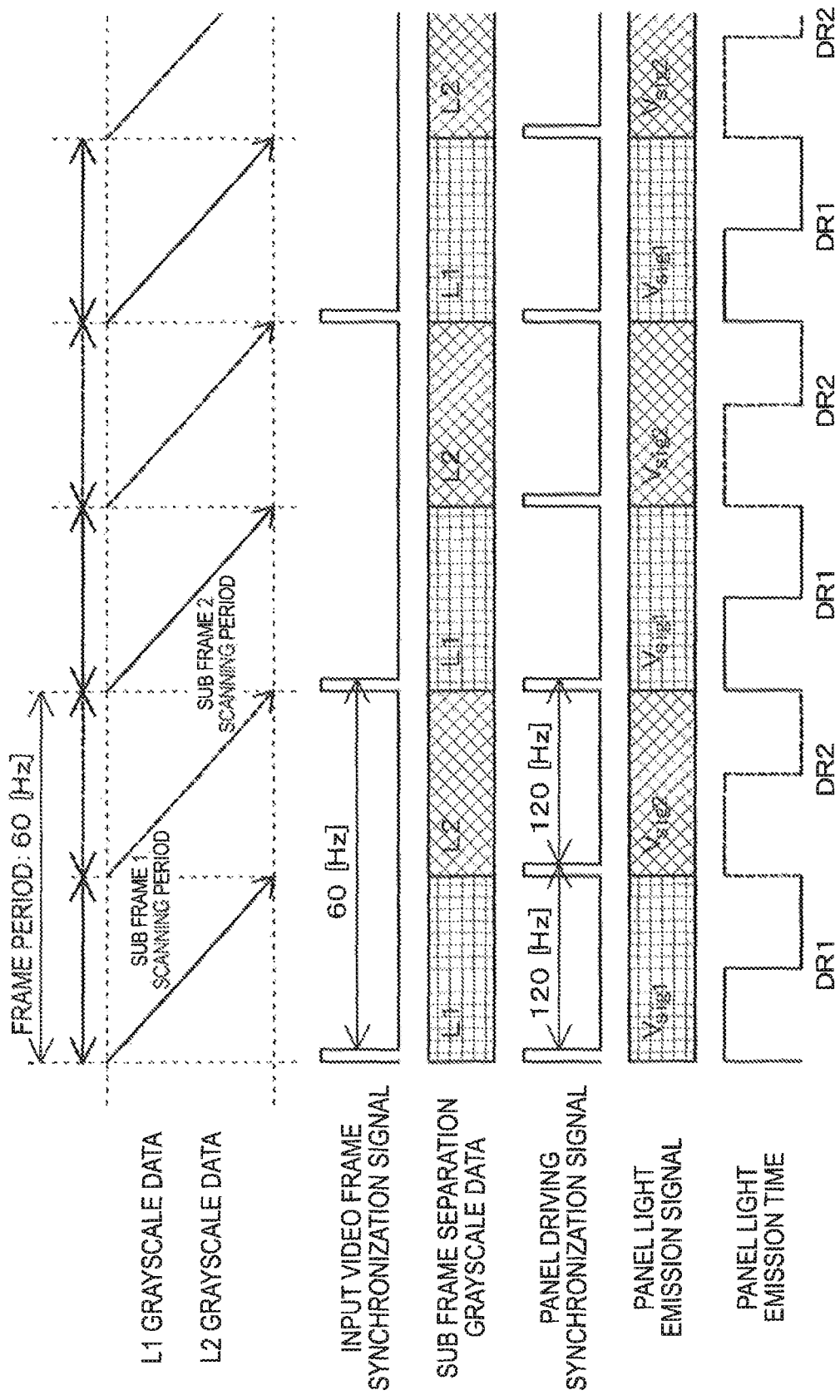
FIG. 7 is a diagram showing drive timings of a display panel when an operation of sub frame display is performed.

With respect to drive timings of the display panel when the sub frame display is operated, it is desirable to cause the driving to be performed as shown in the timing example shown in FIG. 7. Specifically, when the number of sub frames n (=i) is set to 2 and a frequency of one frame to 60 Hz as previously described, a sub frame driving frequency is 120 Hz, and L1 grayscale data in the sub frame 1 and L2 grayscale data in the sub frame 2 are alternately displayed. In other words, in order to combine n images in one frame period, driving of sub frames is performed at the speed of n times the frequency of one frame at maximum. Then, a light emission signal of the display panel (signal level of a video signal) $V_{sig}$ and a light emission time DR are controlled for each sub frame in synchronization with a panel drive synchronization signal.

Example 2

The image processing circuit 80 according to Example 1 employs the configuration in which the process of computing an exposure ratio EVR is performed by the exposure image separation unit 81 which separates one-frame video information into exposure images photographed under individual exposure conditions. On the other hand, the image processing circuit 80 according to Example 2 employs a configuration in which an exposure ratio computation unit 86 is provided separately from the exposure image separation unit 81 as shown in FIG. 8 and the exposure ratio computation unit 86 computes exposure ratios EVR.

Figure 8:
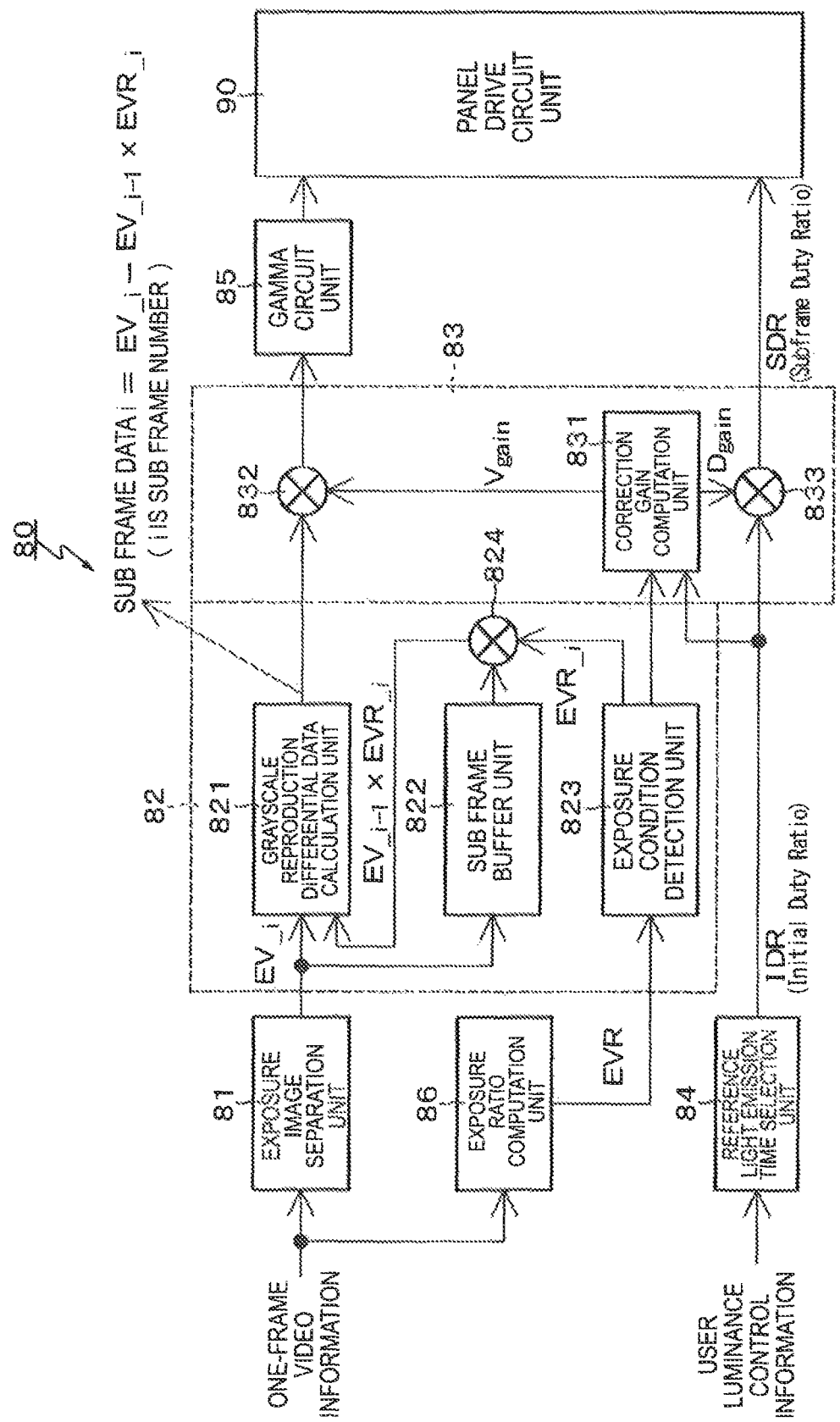
FIG. 8 is a block diagram showing a configuration of an image processing circuit according to Example 2.

FIG. 8 is a block diagram showing the configuration of the image processing circuit according to Example 2. In FIG. 8, when the configuration of Example 2 is employed, the exposure image separation unit 81 and the exposure ratio computation unit 86 are set to receive input of one-frame video information obtained by packing an image information group of which images are obtained by photographing the same scene at least under two exposure conditions and values of the exposure conditions at the time of photographing (which will be described hereinafter as "EV values") for one scene.

As in Example 1, the exposure image separation unit 81 separates the one-frame video information, i.e., the packed image information group into the exposure images photographed under individual exposure conditions. The exposure ratio computation unit 86 extracts EV values included in the packed image information group and then computes exposure ratios EVR based on the extracted EV values. The exposure image separation unit 81 outputs the separated exposure images and the exposure ratios EVR computed by the exposure ratio computation unit 86 in synchronization with each other in a time series manner. Note that processes executed in the sub frame signal generation unit 82 and the succeeding units are the same as in Example 1 and thus overlapping details thereof will be omitted.

Here, if the image information group is set to include, for example, two exposure images EV1 and EV2 photographed under two exposure conditions and the EV values corresponding to the exposure images EV1 and EV2 are set to an EV value1 and an EV value2, the exposure ratio EVR of the exposure image EV2 when the exposure image EV1 serves as a reference is computed using the following formula.

$EVR1 = 1$ $EVR2 = EV\text{value2}/EV\text{value1}$

The calculation process for computing the exposure ratio EVR performed by the image processing circuit 80 according to Example 2 described above is much simpler than that of the image processing circuit 80 according to Example 1 as is obvious from the above formula. Thus, the image processing circuit 80 according to Example 2 has an advantage that a circuit configuration thereof can be simplified to the extent of the simplicity of the calculation process in comparison with the image processing circuit 80 according to Example 1.

Example 3

Examples 1 and 2 employ the configuration in which the one-frame video information obtained by packing the image information group obtained by photographing the same scene at least under two exposure conditions for one scene is received as an input. On the other hand, Example 3 employs a configuration in which one video photographed using a high-sensitivity sensor having a high S/N ratio and a wide dynamic range of imaging is received as input information. Then, one video is separated (divided) into quasi-images comparable to an image information group of which images are similarly photographed under two or more exposure conditions (which will be described hereinafter as "quasi-exposure images"). In addition, a condition at the time of the separation of the quasi exposure images is used as a quasi-EV value.

Figure 9A:
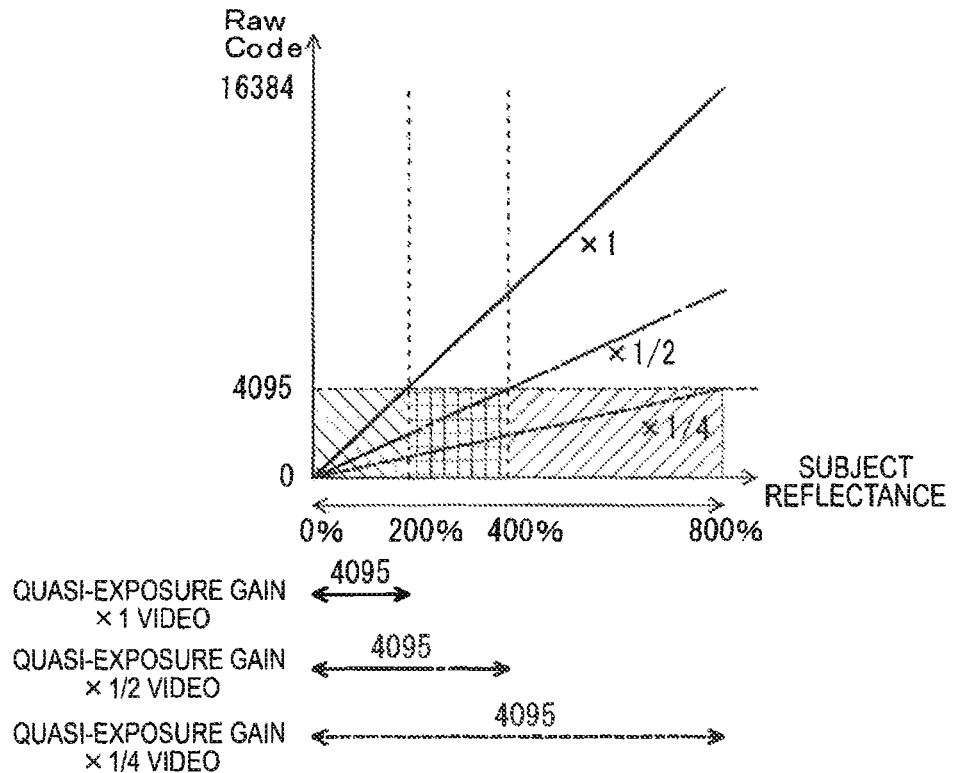
FIG. 9A shows a characteristic of subject reflectance-raw code and FIG. 9B shows a characteristic of a subject reflectance-input video grayscale value.
Figure 9B:
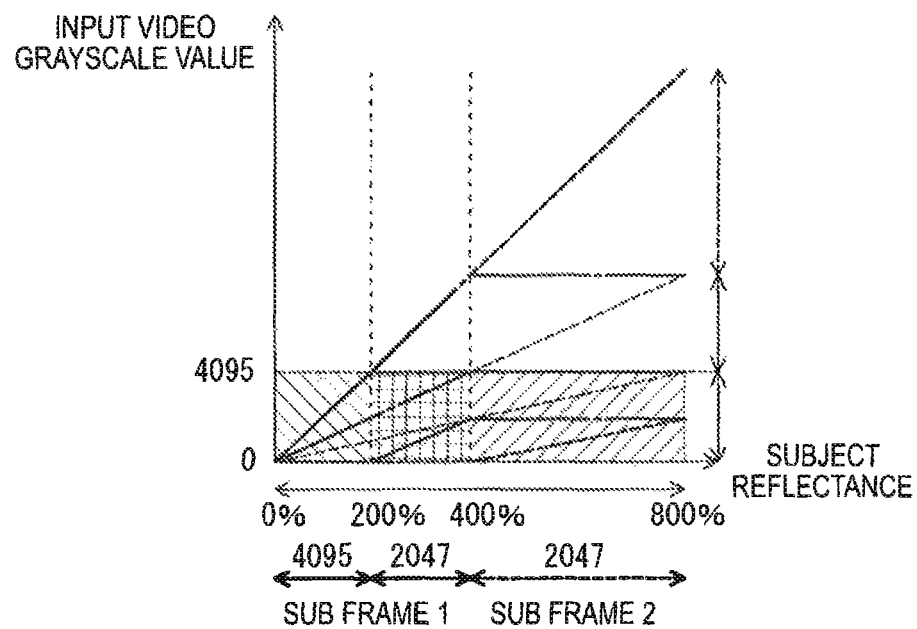

Herein, an overview of generation of a quasi-exposure image will be described based on FIG. 9. FIG. 9A shows a characteristic of subject reflectance-raw code in generation of a quasi-exposure image, and FIG. 9B shows a characteristic of subject reflectance-input video grayscale value in generation of a quasi-exposure image. This is an example when one piece of video data $EV_{HDR}$ of which imaging information of a subject reflectance of 800% is quantized to be 14 bits is displayed on a display panel having a reproduction capability of 12 bits. Here, in order to realize three divisions, quasi-EV values 1 to 3 are set with conditions of one, one half, and one quarter.

Based on the quasi-EV values 1 to 3, quasi-exposure images EV1 to EV3 of each of the exposure ratios EVR1 to EVR3 are computed according to the following definitions.

Figure 10:
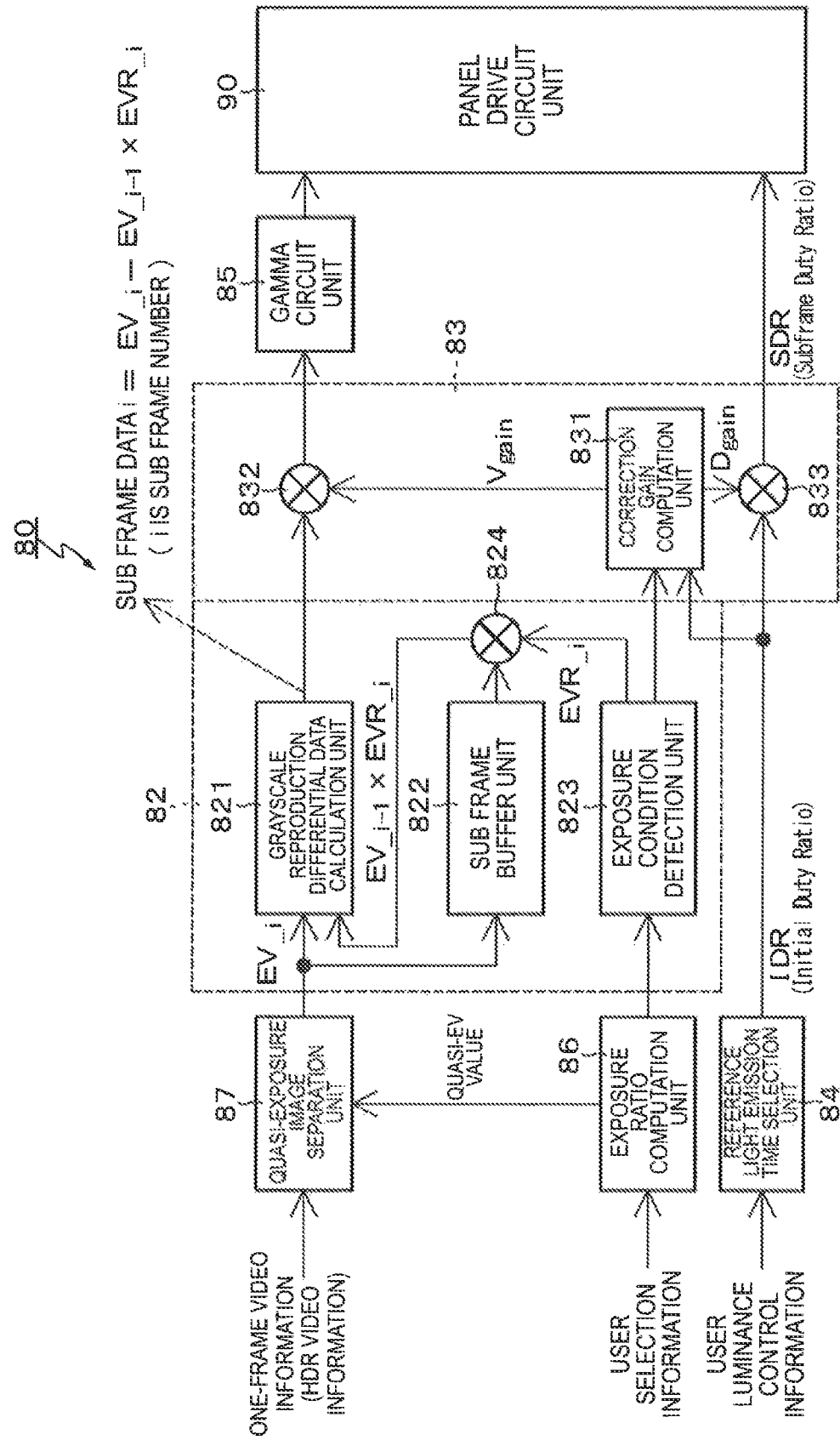
FIG. 10 is a block diagram showing a configuration of an image processing circuit according to Example 3.

$EV1 = \text{if }(EV_{HDR} > 4095)\ 4095\ \text{else}\ EV_{HDR}$ $EV2 = \text{if }(EV\text{value2} \times EV_{HDR} > 4095)\ 4095\ \text{else}\ EV\text{value2} \times EV_{HDR}$ $EV3 = \text{if }(EV\text{value3} \times EV_{HDR} > 4095)\ 4095\ \text{else}\ EV\text{value3} \times EV_{HDR}$ FIG. 10 is a block diagram showing a configuration of the image processing circuit according to Example 3. In FIG. 10, a quasi-exposure image separation unit 87 performs a process of separating the quasi-exposure images EV1 to EV3 of each of the exposure ratios EVR1 to EVR3, i.e., a process of computing the quasi-exposure images EV1 to EV3 according to the above definitions. The quasi-exposure image separation unit 87 receives inputs of HDR video information of which images are photographed using a high-sensitivity sensor having a high S/N ratio and a wide dynamic range of imaging as one-frame video information.

The quasi-exposure image separation unit 87 separates (divides) one video into the quasi-exposure images EV1 to EV3 comparable to an image information group of which images are similarly photographed under three exposure conditions based on the quasi-EV values 1 to 3 given from the exposure ratio computation unit 86. The quasi-EV values 1 to 3 used as quasi-separation conditions by the quasi-exposure image separation unit 87 are computed by the exposure ratio computation unit 86 based on user selection information. In other words, the quasi-EV values 1 to 3 can be arbitrarily set by a user based on the user selection information.

Note that processes performed by the sub frame signal generation unit 82 and the succeeding units are performed as substantially the same basic operation as those in Example 1. However, while the processes for two sub frames were performed in Example 1, it is necessary to realize the processes for three sub frames in Example 3. For this reason, in performing display at a frame frequency of 60 Hz, it is necessary to drive sub frames at 180 Hz. In other words, the image processing circuit 80 according to Example 3 performs an operation at a high speed also including driving of the display panel in comparison with the image processing circuit 80 according to Example 1.

Herein, sub frame control of the quasi-exposure image separation unit 87 and the succeeding units and the flow a sub frame correction process will be briefly described.

The sub frame signal generation unit 82 generates sub frame data 1 to 3 according to the following formulas using the exposure images EV1 to EV3 and the exposure ratios EVR1 to EVR3 in the same process as in Example 1.

Sub frame data 1=$EV1$

Sub frame data 2=$EV2-EVR2 \times EV1$

Sub frame data 3=$EV3-EVR3 \times EV2$

In parallel with sub frame control, in other words, in parallel with generation of the sub frame data 1 to 3 by the sub frame signal generation unit 82, the sub frame correction unit 83 executes a sub frame correction process. To be specific, the sub frame correction unit 83 computes the correction gain $D_{gain}$ of the sub frame light emission time SDR and the correction gain $V_{gain}$ of sub frame data i based on the initial light emission time IDR set by the reference light emission time selection unit 84 and the exposure ratios EVR1 to EVR3.

SDR=IDR/$EVR$ if (SDR>DL)

SDR=DL $V_{gain}$=SDR/Duty limit

Else SDR=SDR$V_{gain}$=1

$D_{gain}$=SDR/IDR

Here, the duty limit (DL) is a limit value of a settable sub frame light emission time SDR.

As described above, the sub frame data i generated by the sub frame signal generation unit 82 is corrected by the sub frame correction unit 83 by being multiplied by the correction gain $V_{gain}$, undergoes gamma correction by the gamma circuit unit 85, and then is supplied to the panel drive circuit unit 90. In addition, the initial light emission time IDR set by the reference light emission time selection unit 84 is corrected by the sub frame correction unit 83 by being multiplied by the correction gain $D_{gain}$, and then is supplied to the panel drive circuit unit 90 as the sub frame light emission time SDR. The panel drive circuit unit 90 drives the light emission elements of the pixels of the display panel to emit light with light emission luminance according to the sub frame data i, decides a light emission time for each sub frame based on the sub frame light emission time SDR, and controls the light emission time of the light emission elements.

According to the image processing circuit (or image processing method) according to Example 3 described above, by executing the above-described sub frame control and sub frame correction process, it is possible to realize display luminance (light emission luminance) that is linear with respect to an input subject reflectance. Thus, screen display luminance at the time of expressing sub frames can correctly express a subject reflectance of a photographed image, and accordingly, image reproduction that is close to actual viewing can be achieved.

Example 4

When it is attempted to realize display of three sub frames as in Example 3, a frequency of a sub frame increases to 180 Hz, in other words, a frame rate process is performed at a high speed. Then, due to the speed-up of the frame rate process, cases in which it is not possible to secure a data writing time that is important for driving the display panel and a correction time of the display panel (for example, a correction time of threshold correction described above) arise. With regard to correction of a display panel, it is necessary for an active-matrix-driven display panel that uses TFTs like the pixel circuit shown in FIG. 2, for example, to perform a correction operation such as threshold value correction and an operation of writing a video signal within a horizontal sync frequency $f_h$. For this reason, it is not possible to raise the frequency to be higher than necessary to realize improvement of correction performance and satisfactory signal write.

Hence, in the present example, driving of the circuit in which a sub frame frequency is set to be variable while the horizontal sync frequency $f_h$ which affects the correction operation of threshold value correction or the like and the operation of writing a video signal is fixed to a basic condition is performed. Hereinafter, there are cases in which the driving is referred to as variable sub frame frequency driving. In the variable sub frame frequency driving, specifically, vertical resolution Httl is controlled for each sub frame to set the sub frame frequency $f_{sub}$ to be variable so that the sub frame frequency $f_{sub}$, the vertical resolution Httl, and the horizontal sync frequency $f_h$ satisfy the following relation, and thereby high-speed scan driving is realized.

$1/f_{sub}=1/f_h \times Httl$

Figure 11:
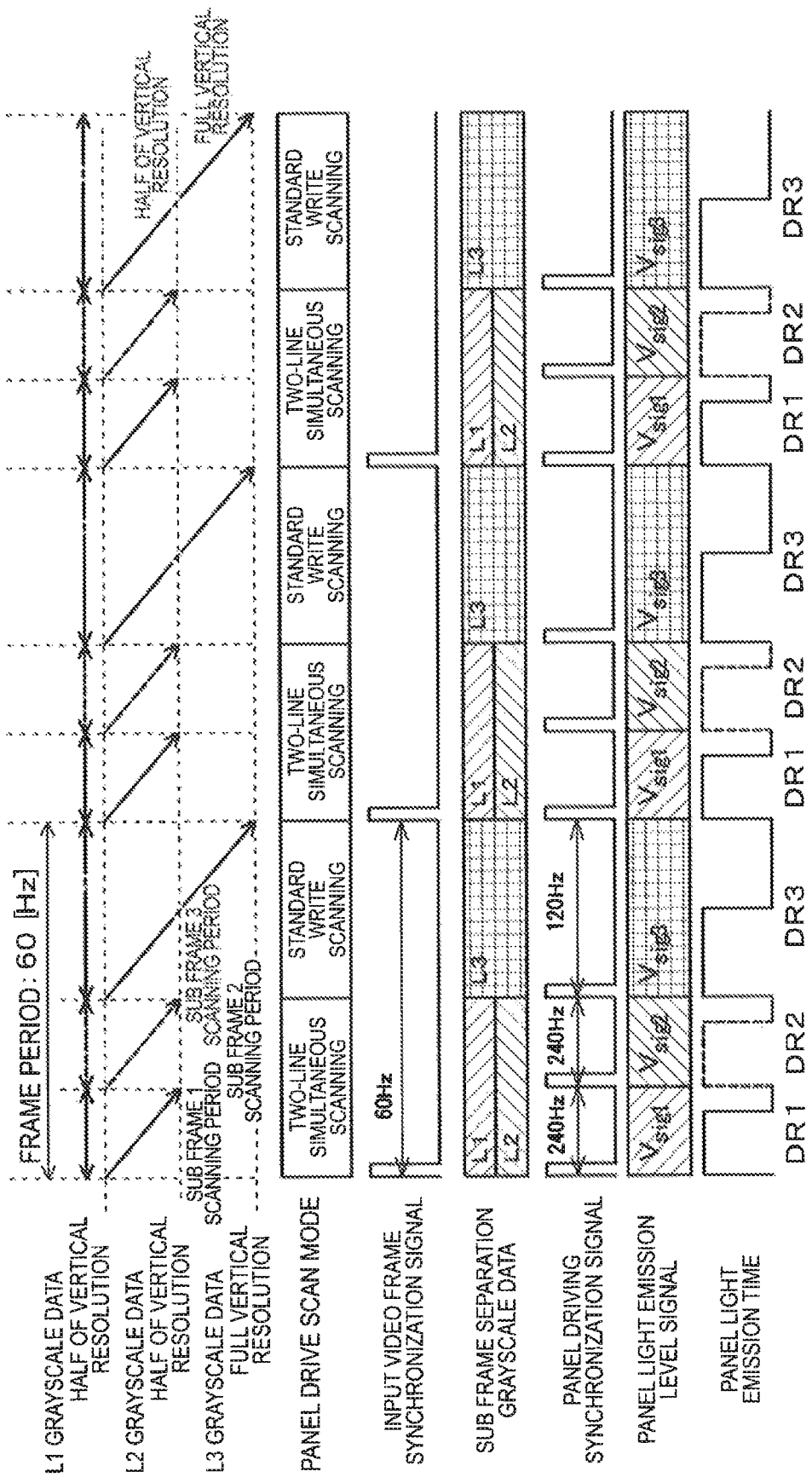
FIG. 11 is a diagram for describing an overview of an operation of driving three sub frames.

FIG. 11 shows an overview of an operation when scan driving of three sub frames is performed by fixing the horizontal sync frequency $f_h$ to 120 Hz. The sub frame 1 and the sub frame 2 are driven by thinning out the vertical resolution by ½ so as to be driven at 240 Hz and only the sub frame 3 is driven with the vertical resolution of 120 Hz.

Figure 12A:
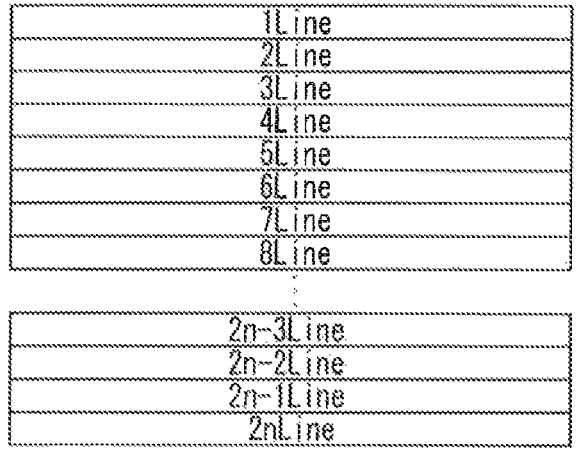
FIG. 12A shows standard write scanning times.
Figure 12B:
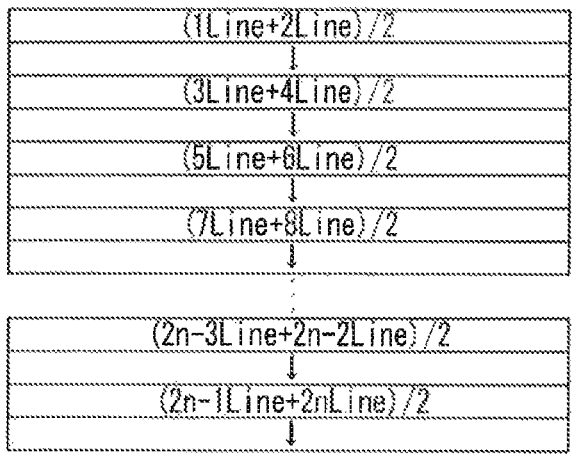
FIG. 12B shows two-line simultaneous scanning time.
Figure 12C:
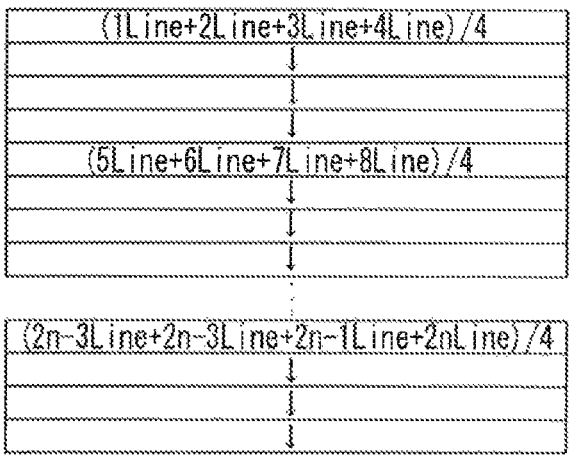
FIG. 12C shows four-line simultaneous scanning times.

The specific relation of writing data when the vertical resolution is thinned out by ½ and driving at 240 Hz is performed will be described using FIG. 12. FIG. 12A shows standard write scanning times, FIG. 12B shows two-line simultaneous scanning time, and FIG. 12C shows four-line simultaneous scanning times.

By writing data simultaneously in two horizontal lines, driving is performed while reducing the number of scan lines per sub frame period. For data of exposure images displayed at a driving frequency of an integral multiple of a standard frequency, the average value of odd lines and even lines may be used as shown in the example of FIG. 12B. In addition, for simple thinned-out data, for example, it is also possible to sample and use data of only one of the odd lines and the even lines. As another method, data that is obtained by performing a band limiting process on a video spatial frequency band in the vertical direction using a low-pass filter or the like may be sampled and then used.

Driving of the display panel is configured such that a drive scan mode is automatically switched in synchronization with sub frames. A drive scan mode to be applied to individual sub frame images can be arbitrarily set by a user. As another method, generated individual sub frame images (individual images with n exposure conditions) are analyzed, and an exposure image that has a specific level of luminance or higher and has the largest number of high frequency components of the video vertical spatial frequency is assigned to driving in a general scan mode of the standard driving frequency that does not lower the vertical resolution. In addition, other exposure images are assigned to be in a synchronized scan mode of a driving frequency at which the vertical resolution is an integral fraction (in the present example, ½). By performing the process, it is possible to minimize deterioration of a display video resulting from reduction of the vertical resolution according to a scan mode.

Figure 13:
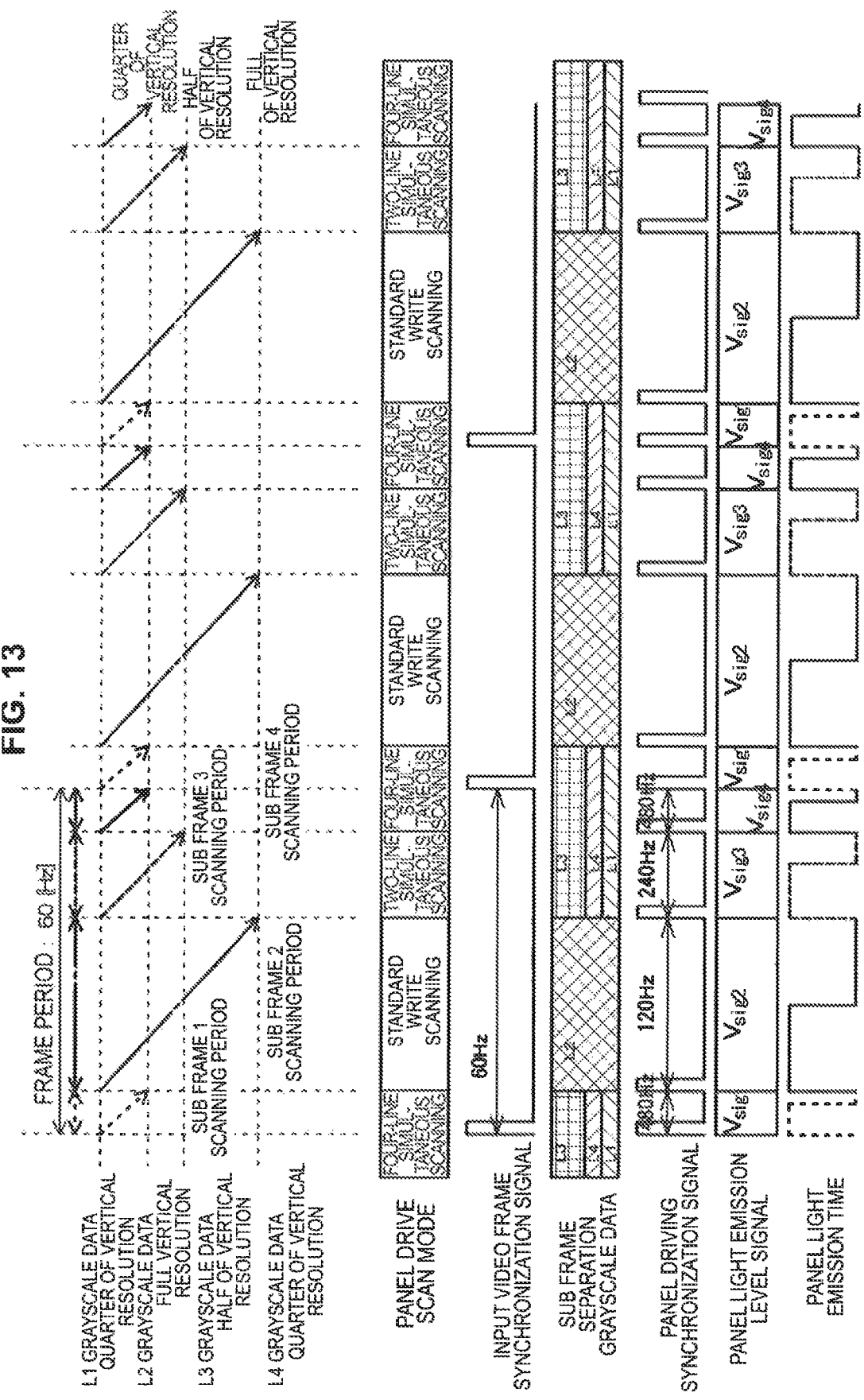
FIG. 13 is a diagram for describing an overview of an operation performed when scan driving of four sub frames is performed by fixing the horizontal sync frequency $f_h$ to 120 Hz.

FIG. 13 shows an overview of an operation performed when scan driving of four sub frames is performed by fixing the horizontal sync frequency $f_h$ to 120 Hz. The driving of this case can be realized with a combination of scan modes as follows. In other words, for the sub frame 2, standard scanning in which driving is performed with the general vertical resolution at the standard (reference) frequency of 120 Hz is set. For the sub frame 3, two-line simultaneous scanning in which the vertical resolution is thinned out by ½ and driving is performed at 240 Hz that is two times the standard frequency is set. For the sub frame 1 and the sub frame 4, four-line simultaneous scanning in which the vertical resolution is thinned out by ¼ and driving is performed at 480 Hz that is four times the standard frequency is set. Accordingly, the driving frequency of the sub frames is set with a combination of two or more different frequencies for each of the sub frames. In addition, a total period of n sub frames set at the combination of two or more different frequencies is equal to a frame period.

By performing such driving using the combination of scan modes as described above, four sub frames can be displayed at a frame rate of 60 Hz. Write data in each scan mode can be realized with combinations of the example of FIG. 12.

Figure 14:
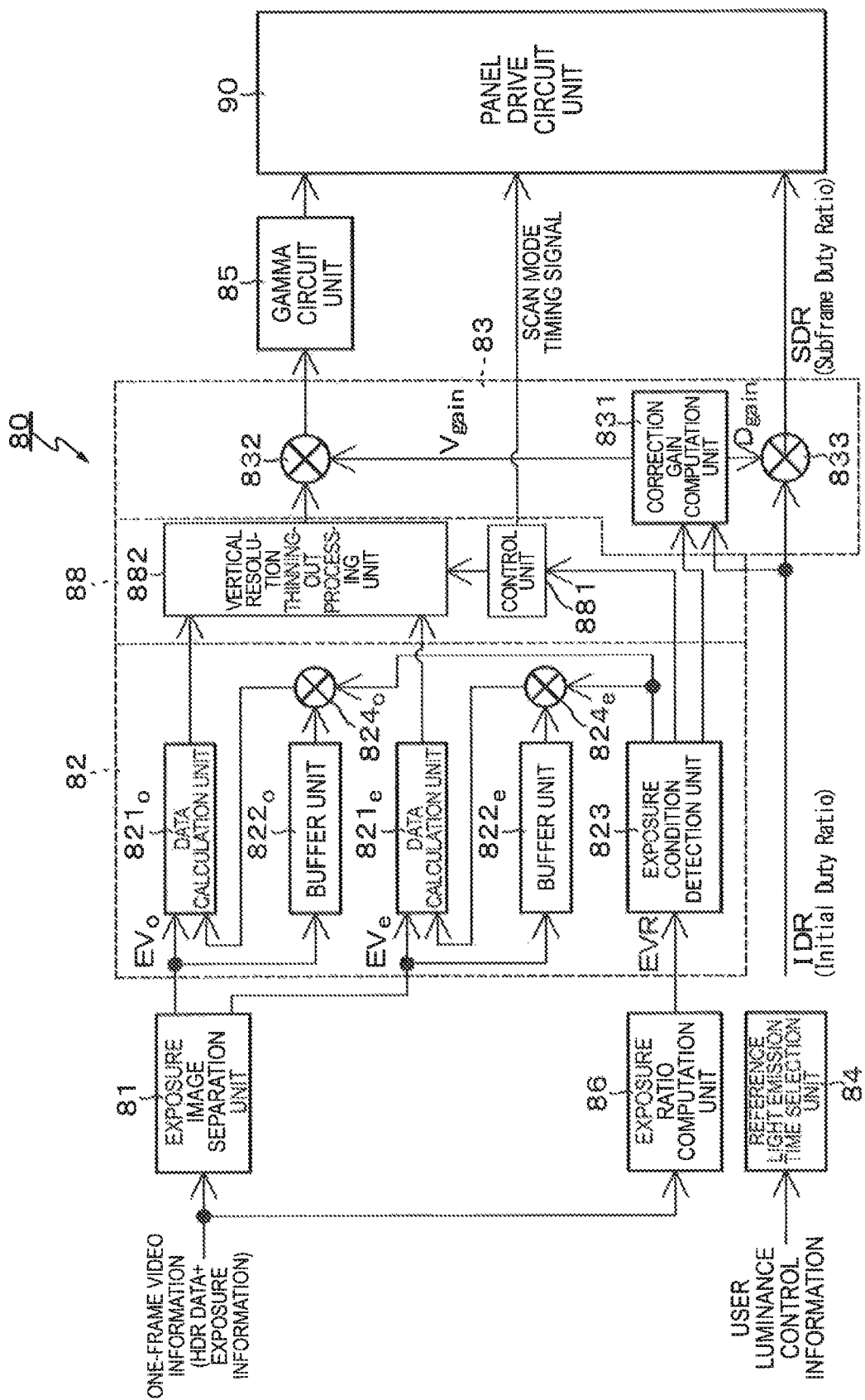
FIG. 14 is a block diagram showing a configuration of an image processing circuit according to Example 4.
Figure 15A:
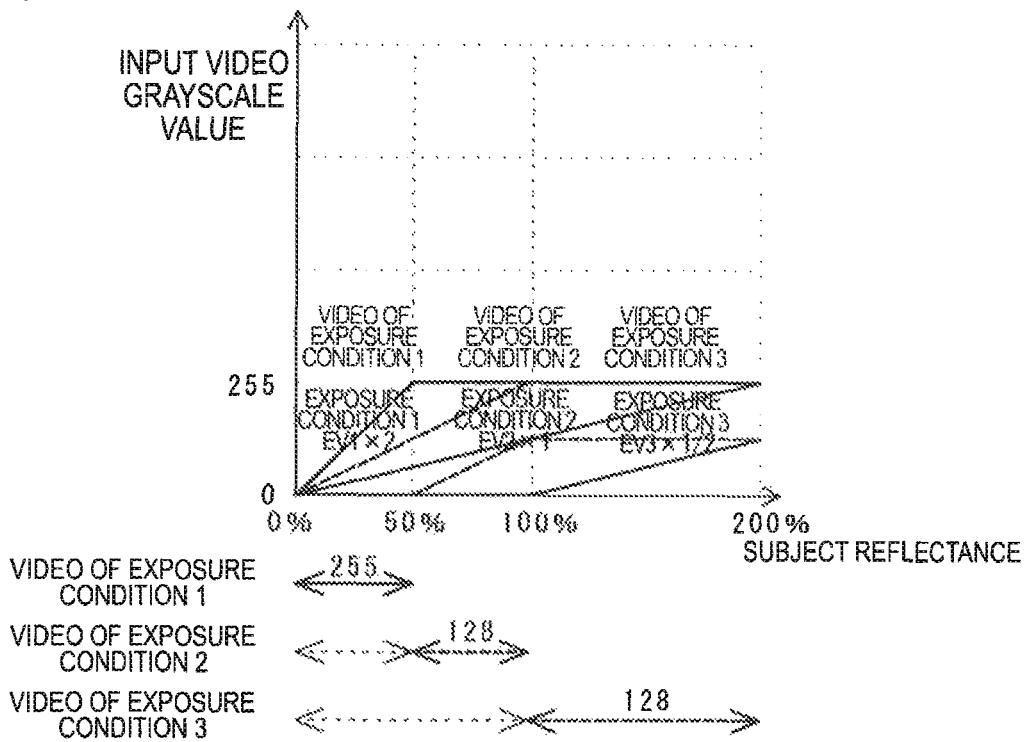
FIG. 15A shows a characteristic of a subject reflectance-input video grayscale value and FIG. 15B shows a characteristic of a subject reflectance-output video grayscale value.
Figure 15B:
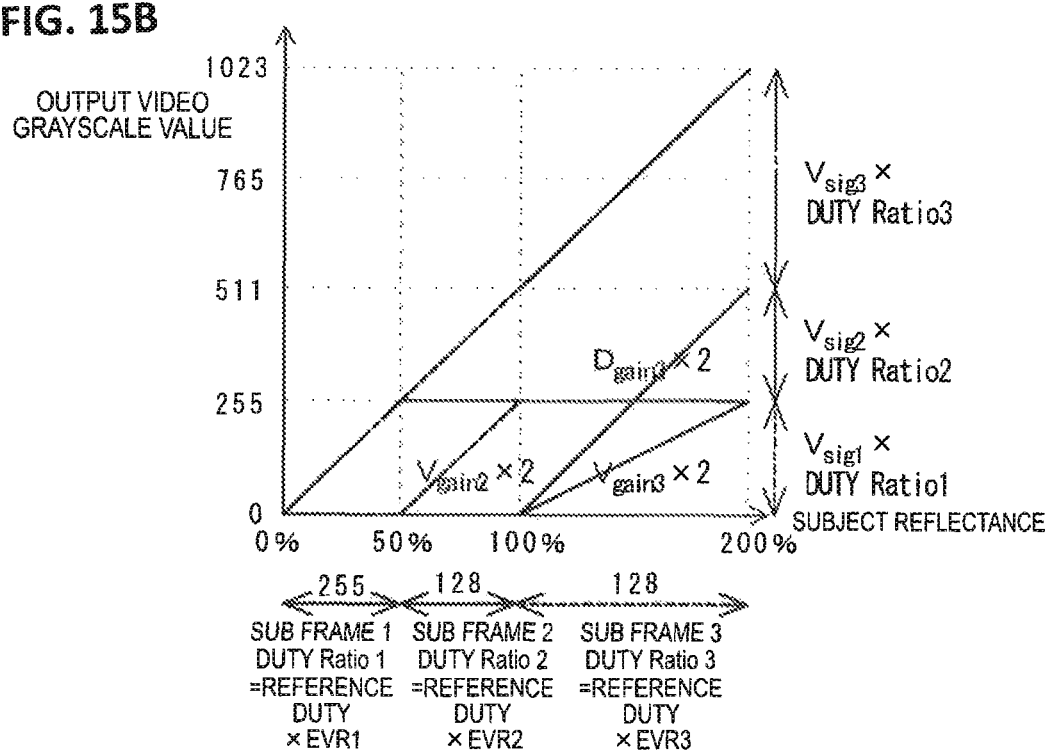

FIG. 14 is a block diagram showing a configuration of the image processing circuit according to Example 4, i.e., a configuration of the image processing circuit that performs driving in which a sub frame frequency is variable while fixing the horizontal sync frequency $f_h$ to a basic condition. In addition, FIG. 15 shows an overview of a sub frame generation process when image processing according to Example 4 is performed. FIG. 15A shows a diagram of a characteristic of a subject reflectance-input video grayscale value and FIG. 15B shows a diagram of a characteristic of a subject reflectance-output video grayscale value.

As shown in FIG. 14, the sub frame signal generation unit 82 has two systems, each of which is provided with the grayscale reproduction differential data calculation unit 821, the sub frame buffer unit 822, and a multiplier 824 for each of odd lines and even lines. In other words, the grayscale reproduction differential data calculation unit 821 is constituted by an odd line data calculation unit $821_o$ and an even line data calculation unit $821_e$, the sub frame buffer unit 822 is constituted by an odd line buffer unit $822_o$ and an even line buffer unit $822_e$, and the multiplier 824 is constituted by an odd line multiplier $824_o$ and an even line multiplier $824_e$.

In addition, the image processing circuit 80 according to the present example is configured to have a vertical resolution thinning-out processing unit 88 between the sub frame signal generation unit 82 and the sub frame correction unit 83. The vertical resolution thinning-out processing unit 88 is constituted by a drive mode and reading control unit 881 and a thinning-out processing unit 882. The drive mode and reading control unit 881 controls a drive mode and reading of sub frame data with respect to the thinning-out processing unit 882 based on the exposure ratios EVR given from the exposure ratio computation unit 86 via the exposure condition detection unit 823. The drive mode and reading control unit 881 further outputs a scan mode timing signal for driving the display panel, specifically, a scan mode timing signal for switching a drive scan mode in synchronization with sub frames to the panel drive circuit unit 90. The thinning-out processing unit 882 performs a process of thinning out the vertical resolution on sub frame data under control of the drive mode and reading control unit 881.

In the image processing circuit 80 according to Example 4 having the above-described configuration, the exposure image separation unit 81 and the exposure ratio computation unit 86 receive input of a one-frame video in which three consecutive exposure images and an exposure condition group are integrated. The exposure image separation unit 81 separates the one-frame video into the three consecutive exposure images EV, separates (divides) the exposure images EV into odd lines and even lines, and then outputs them in a parallel or time series manner. The exposure ratio computation unit 86 computes exposure ratios EVR from one-frame video information, i.e., a packed image information group.

A sub frame generation process (sub frame control) by the sub frame signal generation unit 82 and sub frame correction by the sub frame correction unit 83 are basically the same processes as those in other examples. In the present example, however, the vertical resolution thinning-out processing unit 88 is provided between the sub frame signal generation unit 82 and the sub frame correction unit 83. The vertical resolution thinning-out processing unit 88 performs a process of thinning out the vertical resolution corresponding to the sub frame frequency $f_{sub}$ and controls reading of sub frame data. In addition, based on the scan mode timing signal given from the drive mode and reading control unit 881 to the panel drive circuit unit 90, driving of the display panel, specifically, driving of switching the drive scan mode, is performed in synchronization with the sub frames.

Figure 16:
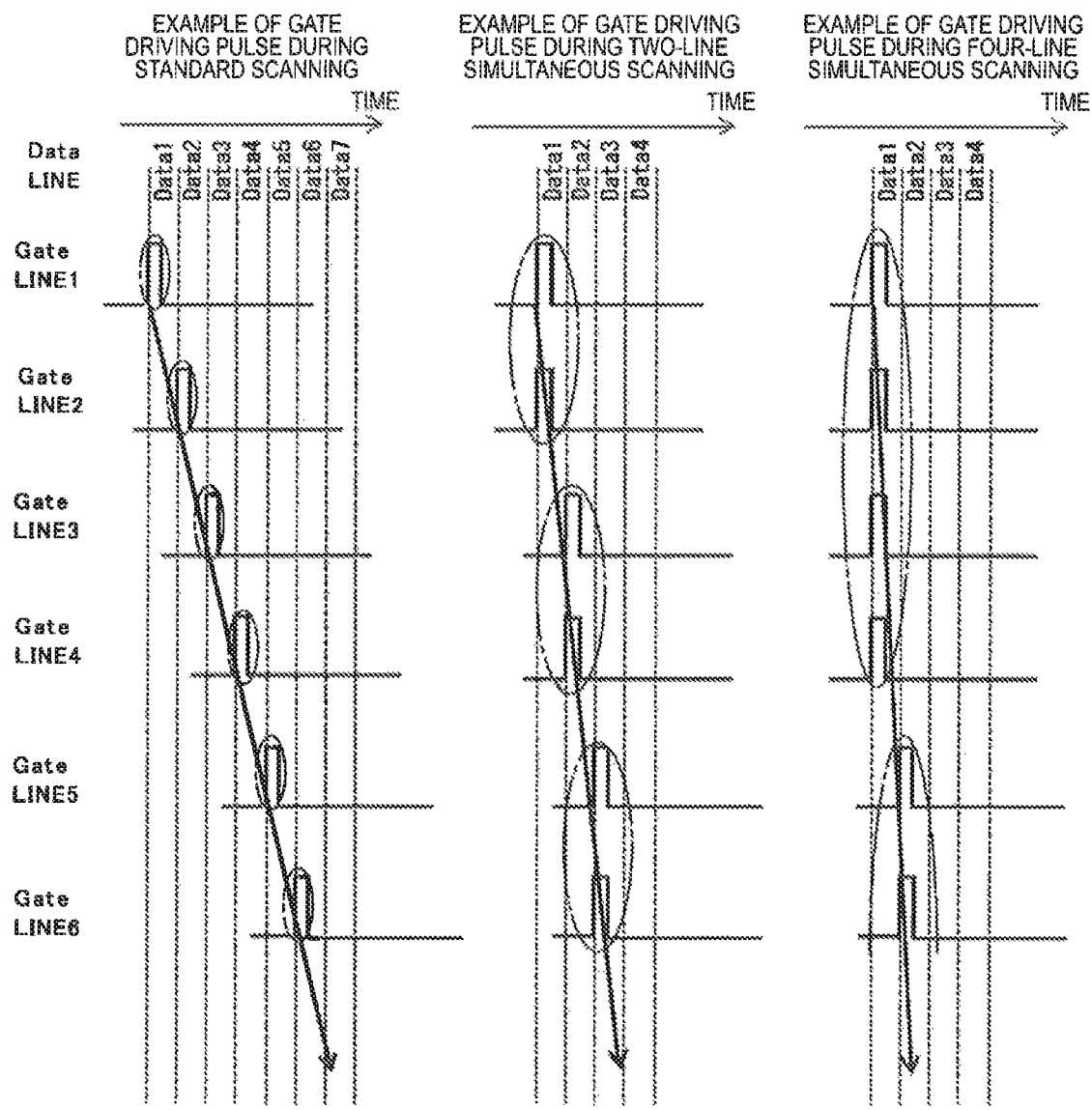
FIG. 16 is a diagram showing realization examples of driving of a display panel according to Example 4.

FIG. 16 shows realization examples of driving of the display panel. FIG. 16 shows timings of gate driving pulses at the time of standard scanning, two-line simultaneous scanning, and four-line simultaneous scanning. As a display panel, for example, the display panel shown in FIG. 1 can be exemplified. In this case, a gate driving pulse is a write scanning signal WS applied to the gate electrode of the sampling transistor 23 of FIG. 2. By controlling write data and write timing according to a drive mode as shown in the realization example of FIG. 16, the vertical resolution can be driven to be thinned out. According to the driving of the realization example, it is possible to perform driving at a high speed while maintaining the horizontal sync frequency $f_h$ that affects a correction operation of the sub frames and a write operation of the sub frame data.

Example 5

The present example has a characteristic in that it has a function of reflecting an image-quality improvement adjustment parameter in setting of sub frame data i generated for each sub frame and a sub frame light emission time SDR so that a user can realize arbitrary adjustment of image quality of sub frames.

Figure 17:
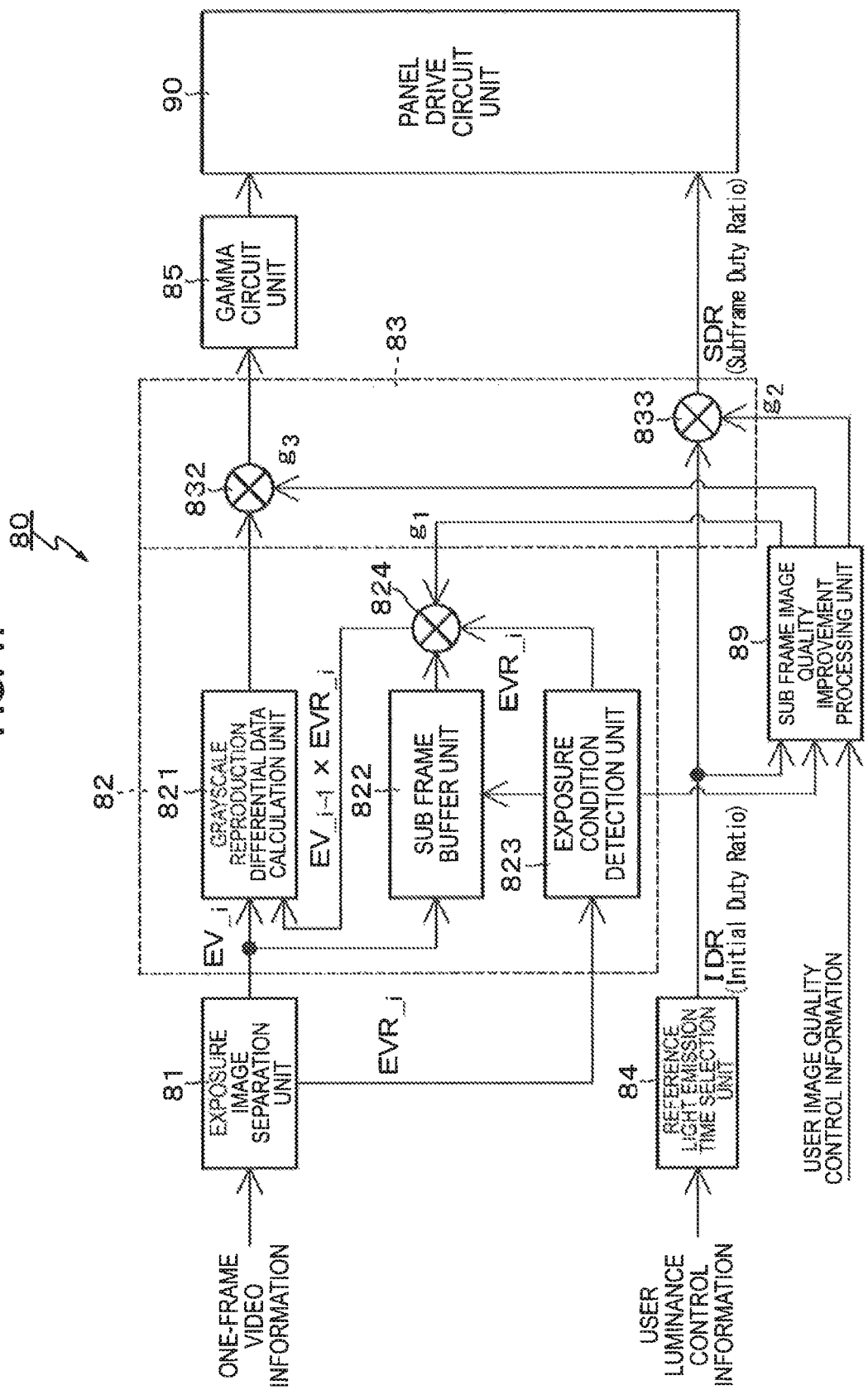
FIG. 17 is a block diagram showing a configuration of an image processing circuit according to Example 5.

FIG. 17 is a block diagram showing a configuration of the image processing circuit according to Example 5, i.e., the image processing circuit that enables a user to arbitrarily adjust image quality. As shown in FIG. 17, the image processing circuit 80 according to the present example is different from the image processing circuit 80 according to other examples in that the former has a sub frame image quality improvement processing unit 89 instead of the correction gain computation unit 831 of the sub frame correction unit 83. The sub frame image quality improvement processing unit 89 can arbitrarily control a generation condition of sub frame data i and the sub frame light emission time SDR under a user's control, in addition to performing substantially the same process as the sub frame correction unit 83.

The sub frame image quality improvement processing unit 89 receives inputs of each of the initial light emission time IDR from the reference light emission time selection unit 84, the exposure ratios EVR from the exposure condition detection unit 823, and user image quality control information set by the user. The sub frame image quality improvement processing unit 89 controls control variables $g_1$ to $g_3$ with respect to each element of a sub frame image quality improvement process. The control variable $g_1$ is supplied to the multiplier 824, the control variable $g_2$ is supplied to the multiplier 832, and the control variable $g_3$ is supplied to the multiplier 833. Under control of the sub frame image quality improvement processing unit 89 using the control variables $g_1$ to $g_3$, the generation condition of the sub frame data i and the sub frame light emission time SDR are controlled, and thereby image quality can be improved.

Figure 18:
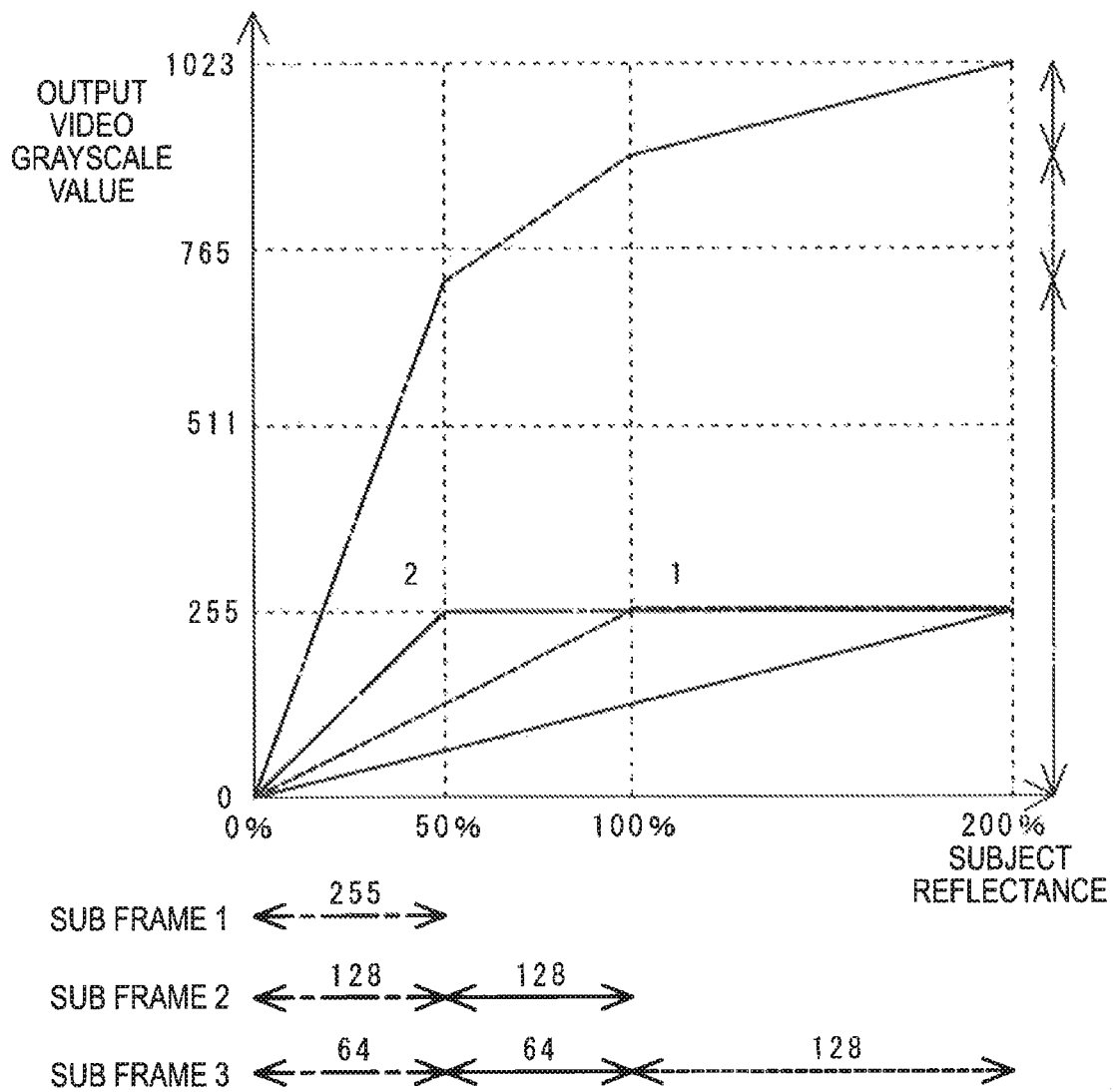
FIG. 18 is a diagram showing a characteristic of a subject reflectance-output video grayscale value when reproduction of low grayscales is improved in Example 5.
Figure 19:
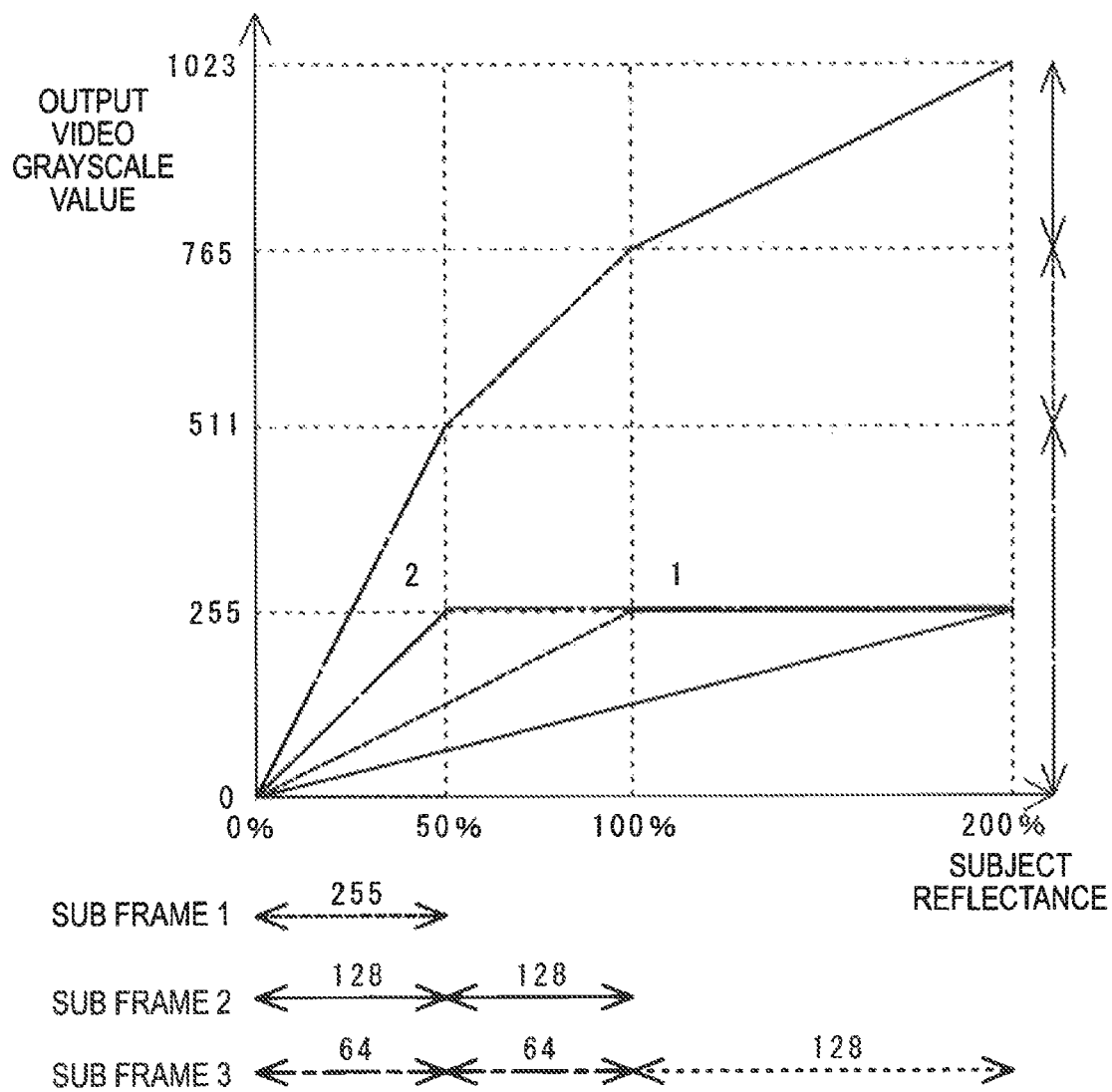
FIG. 19 is a diagram showing a characteristic of a subject reflectance-output video grayscale value when reproduction of low-to-moderate grayscales is improved in Example 5.

An overview of an image quality improvement process is shown in FIGS. 18 and 19. FIG. 18 is a diagram showing a characteristic of a subject reflectance-output video grayscale value when reproduction of low grayscales is improved, and FIG. 19 is a diagram showing a characteristic of a subject reflectance-output video grayscale value when reproduction of low-to-moderate grayscales is improved. A difference between the characteristics at the time of low grayscale reproduction improvement of FIG. 18 and the time of low-to-moderate grayscale reproduction improvement of FIG. 19 is a difference in setting of the control variable $g_2$. In setting at the time of low grayscale reproduction improvement, it is possible to further highlight expression of a low grayscale portion (image quality adjustment). In setting at the time of low-to-moderate grayscale reproduction improvement, it is possible to highlight expression of portions from a low grayscale to a moderate grayscale (image quality adjustment).

Example 6

The driving of Example 4 described above is variable sub frame frequency driving in which the sub frame frequency is variable while the horizontal sync frequency is fixed to the basic condition. In the case of the variable sub frame frequency driving as in Example 4, light emission periods of sub frames having different frequencies overlap with each other if a scanning speed for threshold value correction and signal write is the same as a scanning speed for driving the light emission element (organic EL element 21) to emit light in the sub frames having the different frequencies. Thus, there is concern that a luminance control range is limited due to the light emission times. In addition, since the relation between a non-light-emission period and a light emission period of sub frames is different depending on a position in the screen vertical direction, there is also concern that luminance of the screen and a response to dynamic images are not uniform. Example 6 is attained taking these problems into consideration.

Figure 20:
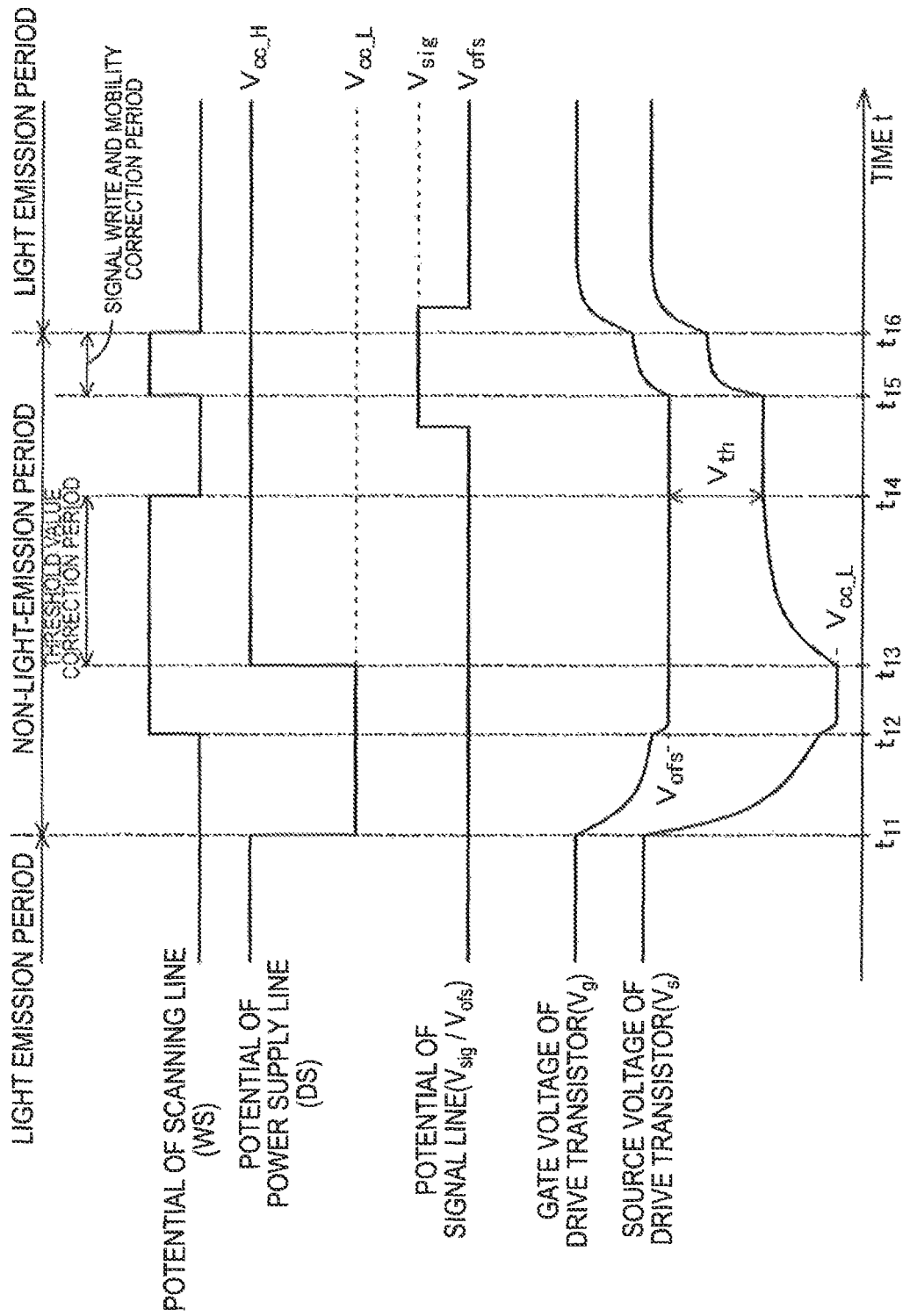
FIG. 20 is a timing waveform diagram for describing a basic circuit operation of an active-matrix organic EL display device.

Prior to describing Example 6, the above problems will be described in more detail. In the active-matrix display device (organic EL display device) of which the pixel 20 described above is formed using two transistors, i.e., the drive transistor 22 and the sampling transistor 23, the pixel 20 is driven at the timings shown in FIG. 20. FIG. 20 shows the timing relation between a voltage (write scanning signal) WS of the scanning line 31, the voltages DS ($V_{cc\_H}$ and $V_{cc\_L}$) of the power supply line 32, and the voltages ($V_{sig}$ and $V_{ofs}$) of the signal line 33. FIG. 20 also further shows changes of the gate voltage $V_g$ and the source voltage $V_s$ of the drive transistor 22.

In FIG. 20, a light emission period of a previous sub frame is indicated up to the time $t_{11}$, a non-light-emission period of a current sub frame is indicated at times $t_{11}$ to $t_{16}$, and a light emission period of the current sub frame is indicated at the time $t_{16}$ and thereafter. The voltage WS of the scanning line 31 is in an active state (a high voltage state in the present example) in the periods of times $t_{12}$ to $t_{14}$, and times $t_{15}$ to $t_{16}$. In addition, the voltages (power supply voltages) DS of the power supply line 32 become the second power supply voltage $V_{cc\_L}$ in the period of times $t_{11}$ to $t_{13}$ and the first power supply voltage $V_{cc\_H}$ in other periods. Then, the period of times $t_{13}$ to $t_{14}$ is a threshold value correction period and the period of times $t_{15}$ to $t_{16}$ is a signal write and mobility correction period. Hereinafter, a threshold value correction period and a signal write and mobility correction period are collectively referred to as a signal write period for the sake of convenience.

Under driving using the voltage WS of the scanning line 31 and the voltages DS of the power supply line 32, a threshold value correction operation, a signal write and mobility correction operation, and driving of a light emission operation are performed for each sub frame. In other words, in each sub frame, a scanning speed for the threshold value correction operation and the signal write and mobility correction operation has the same timing as a scanning speed for driving the organic EL element 21 to emit light. Note that, for the sake of convenience, scanning for the threshold value correction operation and the signal write and mobility correction operation is referred to as write scanning and a speed thereof is referred to as a write scanning speed. In addition, scanning for light emission driving is referred to as light emission scanning and a speed thereof is referred to as a light emission scanning speed.

Figure 21:
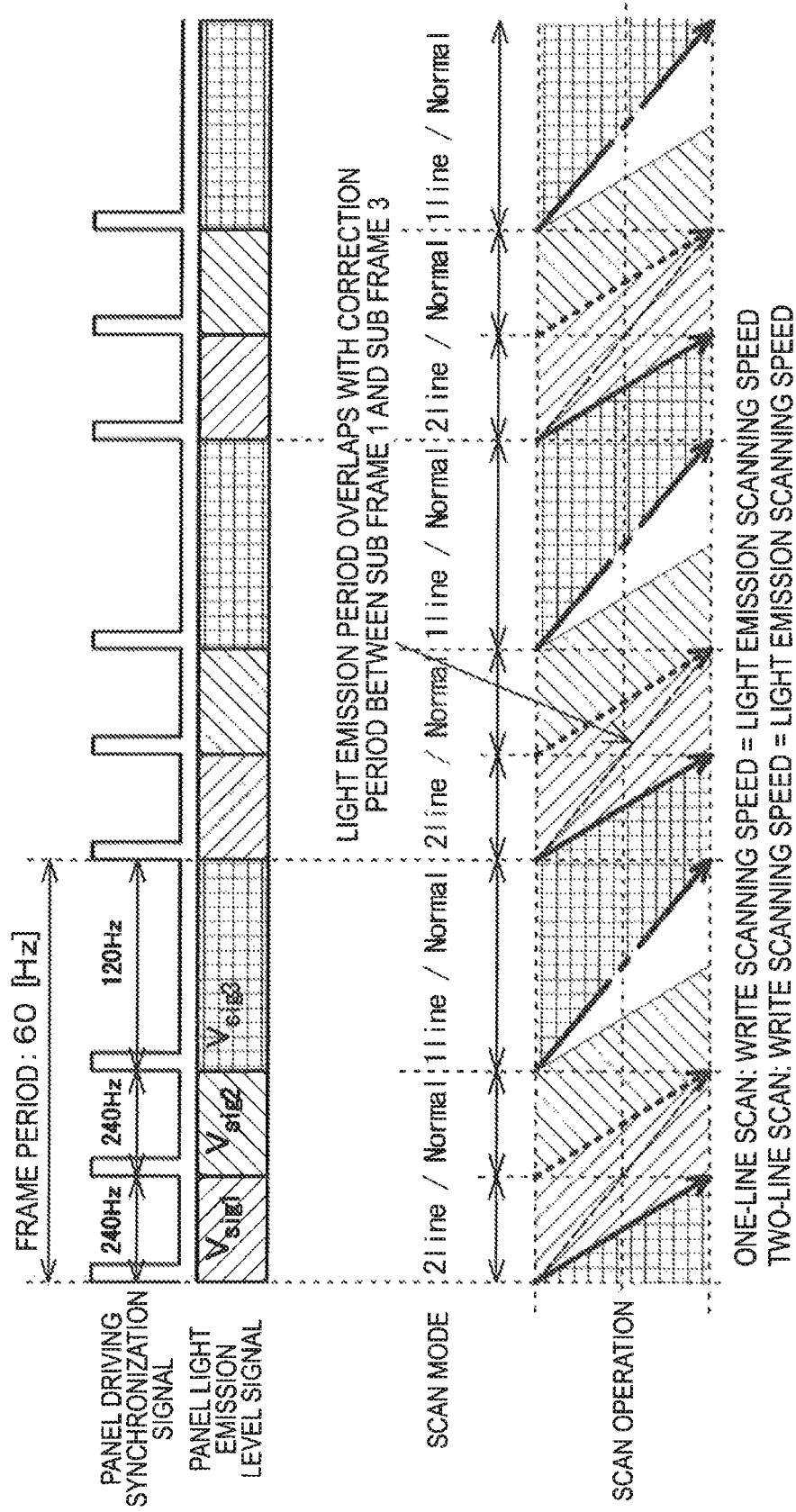
FIG. 21 is an illustrative diagram of a scanning operation for describing a problem occurring when three sub frames are driven.

In addition, in the variable sub frame frequency driving, if a write scanning speed has the same timing as a light emission scanning speed, a period in which a light emission period overlaps with a signal write period occurs between sub frames as shown in FIG. 21. In addition, a state in which light emission positions are also different depending on a screen occurs. In addition, a light emission time of the sub frame 1 is restricted due to these causes, and thus it is not possible to obtain desired luminance.

FIG. 21 is an illustrative diagram of a scanning operation corresponding to the drive timings of FIG. 11 for describing a problem occurring when three sub frames are driven. At the drive timings of FIG. 11, the sub frames 1 and 2 are driven at 240 Hz and the sub frame 3 is driven at 120 Hz. With regard to the drive timings for driving the three sub frames, a period in which a light emission period overlaps with a signal write period occurs between the sub frame 1 and the sub frame 3. In addition, there is a difference between light emission periods of the sub frame 1 and the sub frame 3 in the upper and lower parts of the screen, and thus a luminance difference is generated.

Next, a display device according to Example 6 attained to solve the concern described above occurring in the variable sub frame frequency driving, specifically in three-sub frame driving, will be described.

Figure 22:
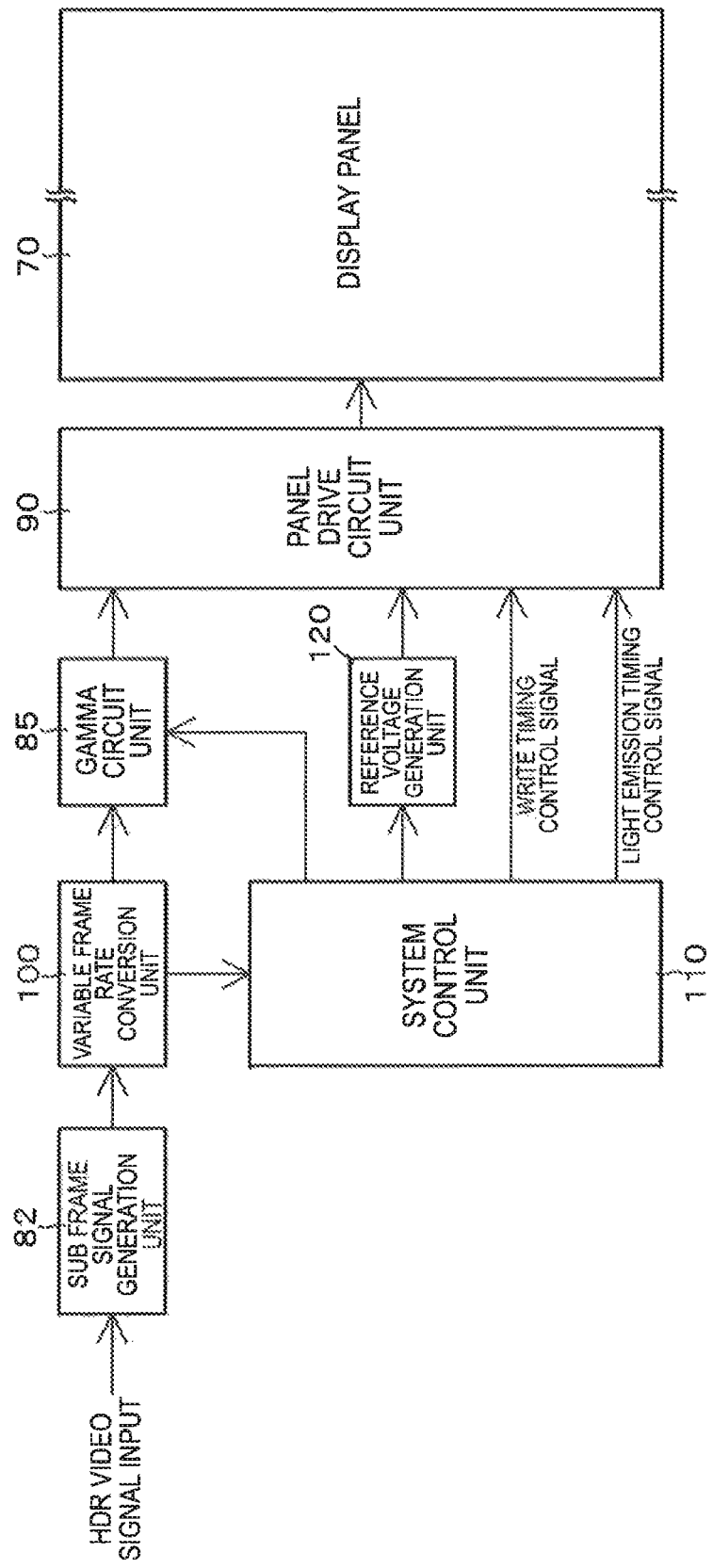
FIG. 22 is a block diagram showing an example of a configuration of a display device according to Example 6.

FIG. 22 is a block diagram showing an example of a configuration of the display device according to Example 6.

As shown in FIG. 22, a display device according to Example 6 is configured to have a variable frame rate conversion unit 100, a system control unit 110, and a reference voltage generation unit 120 in addition to the sub frame signal generation unit 82, the gamma circuit unit 85, the panel drive circuit unit 90, and the display panel 70.

The gamma circuit unit 85 has a correction table (correction coefficient group) for making a characteristic of light emission luminance (a gamma characteristic of light emission) linear with respect to an input signal, and is configured to control (replace) the correction table. The panel drive circuit unit 90 has functions of, for example, the write scanning unit 40, the drive scanning unit 50, and the signal output unit 60, and the like of FIG. 1.

The variable frame rate conversion unit 100 generates a sub frame signal for normal driving and a sub frame signal for simultaneously driving a plurality of lines as well as a drive mode selection signal to realize a variable frame rate based on a sub frame signal input from the sub frame signal generation unit 82. The drive mode selection signal is given from the variable frame rate conversion unit 100 to the system control unit 110.

The system control unit 110 controls a whole system including control of the gamma circuit unit 85 and the reference voltage generation unit 120 as well as timing control of the display panel 70 through the panel drive circuit unit 90 based on the drive mode selection signal given from the variable frame rate conversion unit 100. The reference voltage generation unit 120 generates a reference voltage $V_{ref}$ of a light emission signal (signal level of a video signal) $V_{sig}$. As the reference voltage $V_{ref}$, for example, a top voltage $V_{top}$ with which a top level of a light emission signal is decided in a D-A converter which converts a digital light emission signal to an analog light emission signal is used. The reference voltage, however, is not limited to the top voltage $V_{top}$.

The display device according to Example 6 employs the configuration in which a write scanning speed at which the light emission signal $V_{sig}$ is written in the pixel 20 and a light emission scanning speed at which the light emission element emits light are controlled in units of sub frames under control of the system control unit 110. The system control unit 110 controls the write scanning speed and the light emission scanning speed in units of sub frames through control using a write timing control signal and a light emission timing control signal which are given to the panel drive circuit unit 90. The write timing control signal controls the write scanning speed by controlling a scanning timing of the write scanning unit 40 of FIG. 1. The light emission timing control signal controls the light emission scanning speed by controlling a scanning timing of the drive scanning unit 50 of FIG. 1.

Note that in the timing waveform diagram of FIG. 20 that is used in describing a basic circuit operation of the display device, a light emission period transitions at the timing at which signal write ends (the time $t_{16}$), however, in order to control the light emission scanning speed, it is necessary to control the power supply voltages DS ($V_{cc\_H}$ and $V_{cc\_L}$) applied from the drive scanning unit 50 to the power supply lines 32 in FIG. 1. Specifically, when the signal write ends, the power supply voltage DS is switched from the first power supply voltage $V_{cc\_H}$ to the second power supply voltage $V_{cc\_L}$ and a light-out state (non-light-emission state) is first set. Then, the power supply voltage DS is switched from the second power supply voltage $V_{cc\_L}$ to the first power supply voltage $V_{cc\_H}$ at a desired timing (at which light emission is desired) and then a light emission state is set. Accordingly, the light emission scanning speed can be controlled.

When controlling the write scanning speed and the light emission scanning speed in units of sub frames, the system control unit 110 controls such that different write scanning speeds are set for sub frames having different frequencies, and the same light emission scanning speed is set for the sub frames having the different frequencies.

Figure 23:
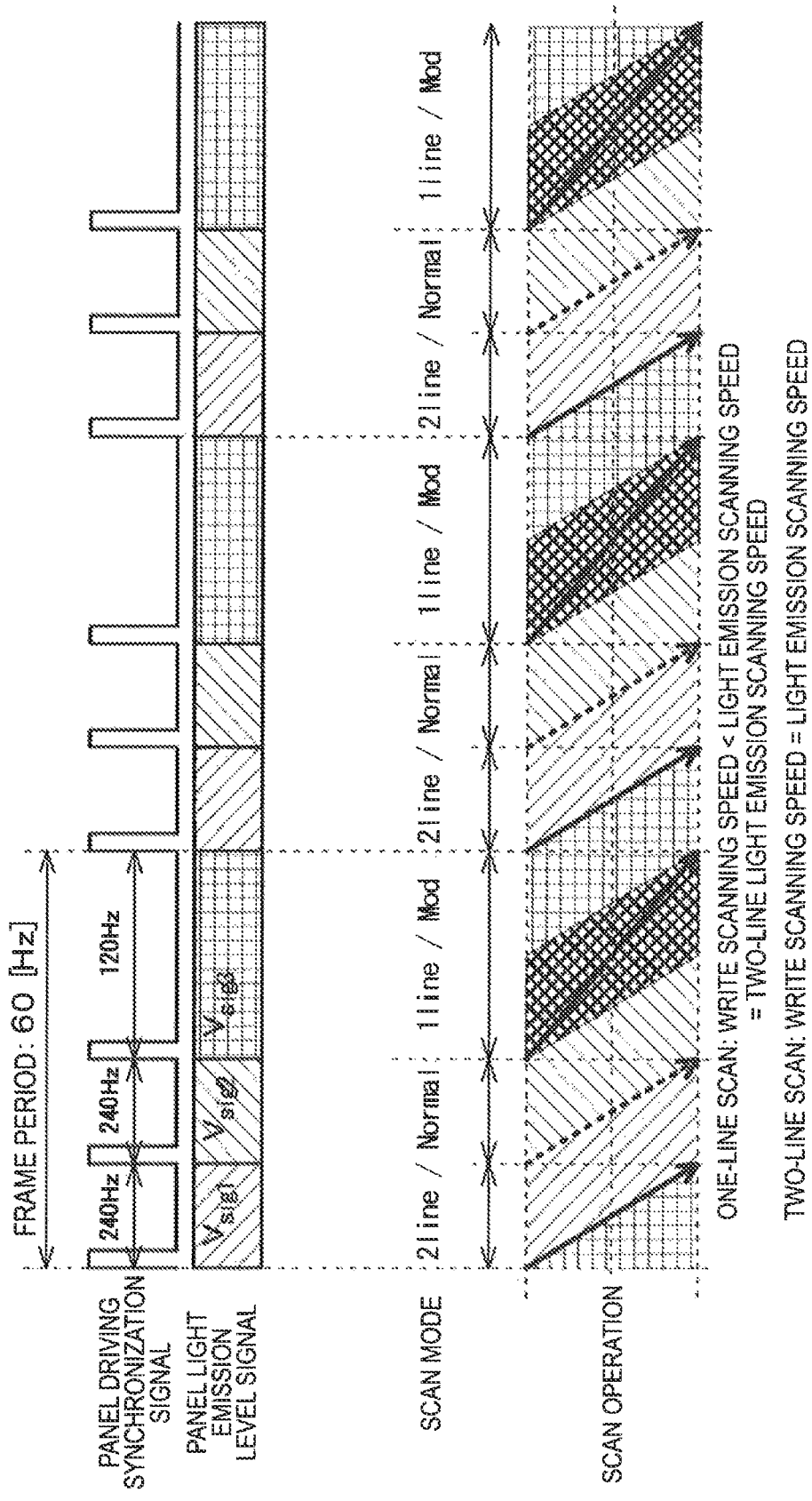
FIG. 23 is an illustrative diagram of an overview of a scan operation of the display device according to Example 6 with respect to driving of three sub frames.

FIG. 23 shows an overview of a scan operation of the display device according to Example 6. The scan operation of FIG. 23 corresponds to the drive timings in the case of the driving of the three sub frames shown in FIG. 11. Herein, the sub frames 1 and 2 are set to be driven at 240 Hz and the sub frame 3 to be driven at 120 Hz.

In the driving of the three sub frames according to Example 6, control is performed with respect to write scanning timings such that a frequency of 240 Hz is set for the sub frames 1 and 2 driven at 240 Hz and a frequency of 120 Hz is set for the sub frame 3 driven at 120 Hz. With regard to light emission scanning timing, control is performed such that frequencies are set to be uniform for the sub frames 1, 2, and 3. In other words, in the sub frames 1 and 2 driven at 240 Hz, control of the drive timings of FIG. 20 is performed, and in the sub frame 3 driven at 120 Hz, the light emission scanning speed is controlled by switching the power supply voltages DS described above.

As described above, by controlling the light emission scanning timings such that the light emission scanning speed is the same between sub frames having different frequencies while the write scanning speeds are different between the sub frames having the different frequencies, overlap of a light emission period and a signal write period between the sub frames can be resolved. Accordingly, restriction on a luminance control range due to a light emission time or the different relation between a non-light-emission period and a light emission period of the sub frames depending on a position in the screen vertical direction are prevented, and thus it is possible to maintain the same light emission state within the screen of the sub frames.

Therefore, if the write scanning speeds of the sub frames having the different frequencies are set to be different and the light emission scanning speed of the sub frames having the different frequencies is set to be the same, a period in which the light emission element does not emit light, in other words, a black display period (a period indicated with hatching of thick lines in FIG. 23), occurs. Then, luminance is lowered due to the occurrence of the black display period. For example, when the sub frames 1 and 2 are driven at 240 Hz and the sub frame 3 is driven at 120 Hz, luminance of the sub frame 3 is lowered to about a half thereof.

Here, luminances $s_1$, $s_2$, and $s_3$ of the sub frames 1, 2, and 3 in the case of a scan operation in which the sub frames having different frequencies have the same write scanning speed and light emission scanning speed and in the case of a scan operation in which the sub frames having different frequencies have different write scanning speeds and the same light emission scanning speed will be described.

Figure 24A:
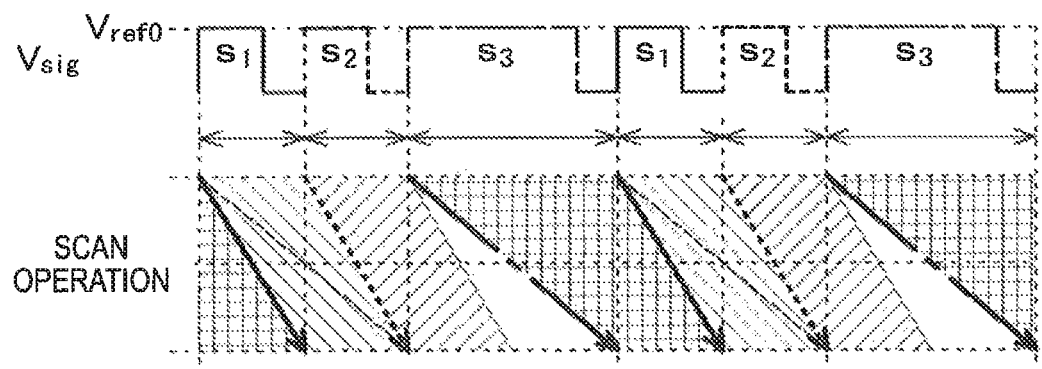
FIG. 24A is a diagram showing a scan operation in which the sub frames having different frequencies have the same write scanning speed and light emission scanning speed.
Figure 24B:
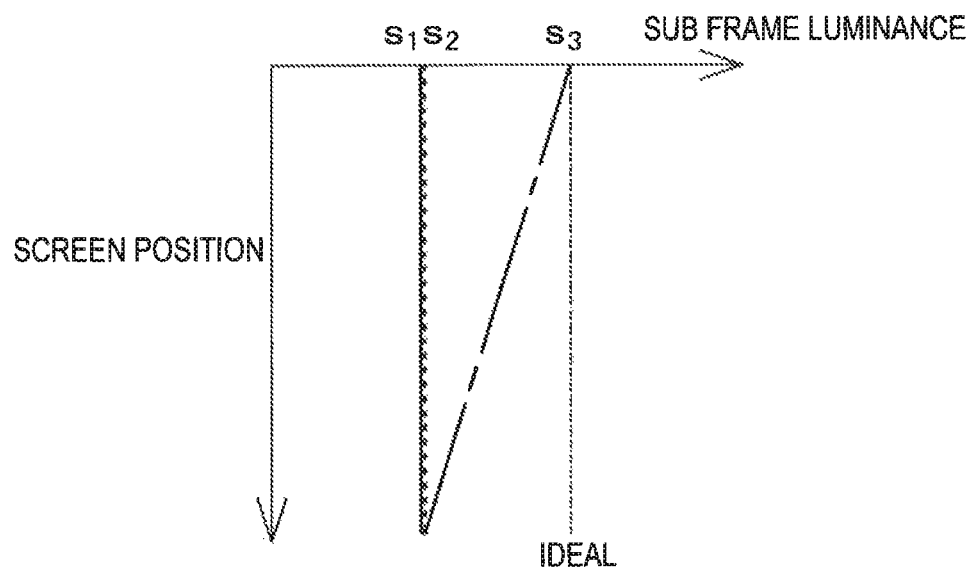
FIG. 24B is a diagram showing the relation between a screen position and luminance in the scan operation.

FIG. 24A is the scan operation in which the sub frames having different frequencies have the same write scanning speed and light emission scanning speed, and FIG. 24B shows the relation between a screen position (position in the screen vertical direction) and luminance in the scan operation. If the sub frames having different frequencies have the same write scanning speed and light emission scanning speed, overlap of light emission periods occurs between the sub frames having different frequencies as previously described, and thus the luminance $s_3$ of the sub frame 3 is lowered as the position on the screen is lowered as indicated by the dot-dashed line in FIG. 24B. In FIG. 24B, the dashed line indicates ideal luminance of the sub frame 3 when no overlap occurs.

Figure 25A:
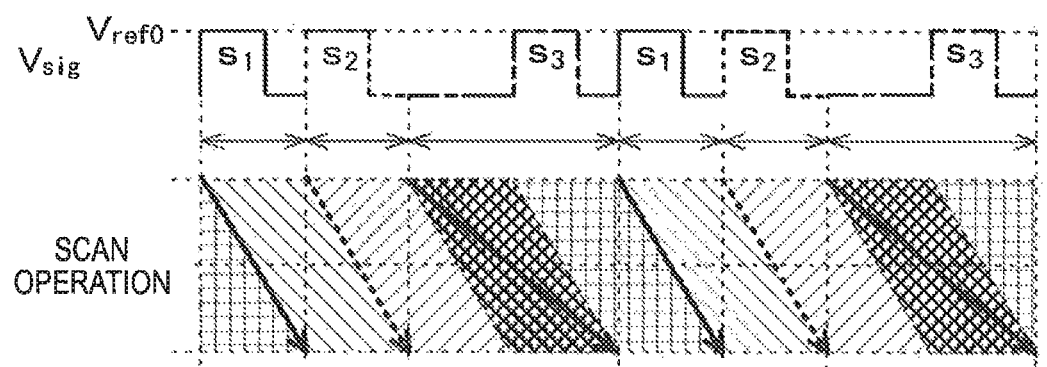
FIG. 25A is a diagram showing a scan operation in which the sub frames having different frequencies have different write scanning speeds and the same light emission scanning speed.
Figure 25B:
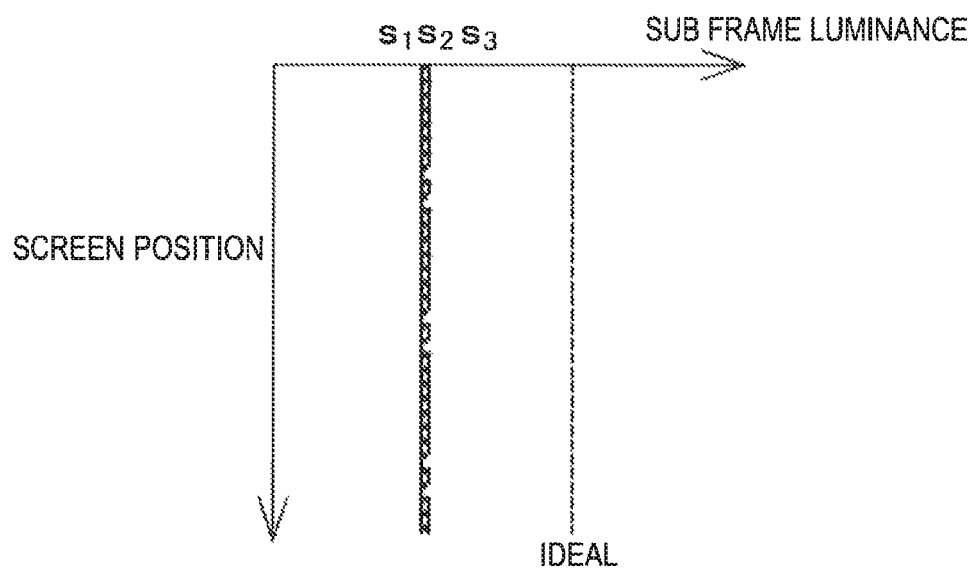
FIG. 25B is a diagram showing the relation between the screen position and luminance in the scan operation.

FIG. 25A shows the scan operation in which the sub frames having different frequencies have different write scanning speeds and the same light emission scanning speed, and FIG. 25B shows the relation between the screen position and luminance in the scan operation. As indicated with hatching of the thick lines in FIG. 25A, a period in which the light emission element does not emit light, in other words, a black display period occurs. Accordingly, as shown in FIG. 25B, the luminance $s_3$ of the sub frame 3 is lowered approximately to the same level of luminances $s_1$ and $s_2$ of the sub frames 1 and 2, that is, a half of the ideal luminance indicated with the dashed line of FIG. 25B.

Thus, the display device according to Example 6 employs the configuration in which the reference voltage of the light emission signal $V_{sig}$ is controlled in accordance with control of the write scanning speed and the light emission scanning speed in units of sub frames in order to compensate for the reduction of luminance caused by a change in the scanning timings described above and resultant restriction on a light emission time of each sub frame. Control of the reference voltage of the light emission signal $V_{sig}$ is realized by controlling the reference voltage $V_{ref}$ generated by the reference voltage generation unit 120, for example, the top voltage $V_{top}$ of the D-A converter described above for each sub frame under control of the system control unit 110.

Figure 26A:
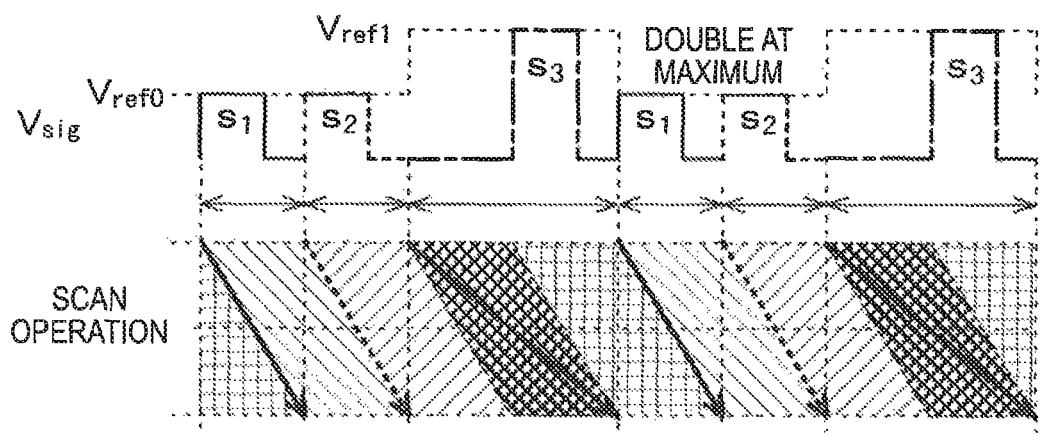
FIG. 26A is a diagram showing a scan operation in which the sub frames having different frequencies have different write scanning speeds and the same light emission scanning speed.
Figure 26B:
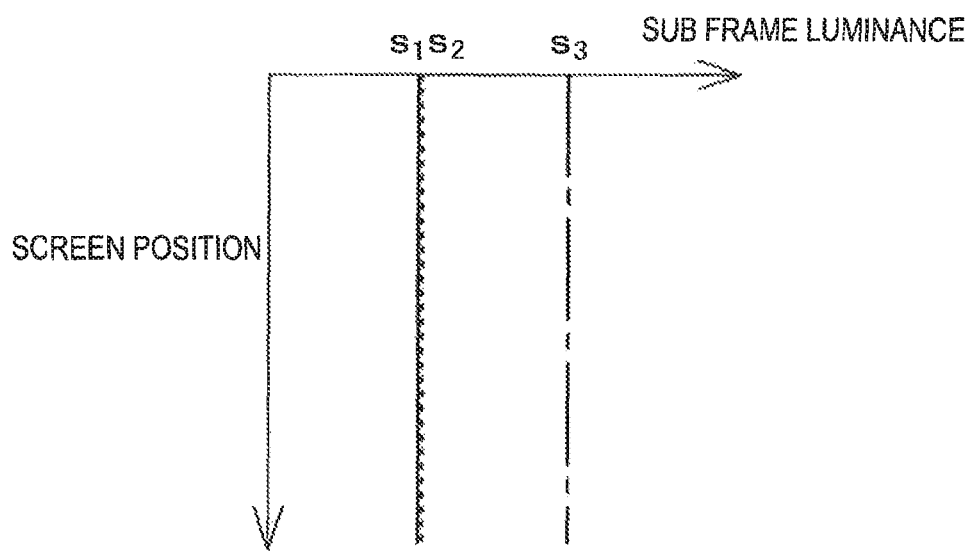
FIG. 26B is a diagram showing the relation between the screen position and luminance when a reference voltage is controlled in the scan operation.

FIG. 26A shows the scan operation in which the sub frames having different frequencies have different write scanning speeds and the same light emission scanning speed, and FIG. 26B shows the relation between the screen position and luminance when the reference voltage is controlled in the scan operation. By controlling the reference voltage $V_{ref}$ of the light emission signal $V_{sig}$ in addition to controlling the write scanning speeds and the light emission scanning speed in units of sub frames, it is possible to suppress reduction of the luminance $s_3$ of the sub frame 3 as is obvious from FIG. 26B even when the black display period occurs as indicated by the hatching of the thick lines in FIG. 26A.

In addition, it is preferable for the correction table (correction coefficient group) of the gamma circuit unit 85 to be replaced at the same timing as control of the reference voltage $V_{ref}$ under control of the system control unit 110. As such, by controlling a gamma characteristic of light emission of the display panel 70 at the same timing as control of the reference voltage $V_{ref}$, it is possible to compensate for formation of light beams during light emission of the display panel 70.

In the scan operation shown in FIG. 23, a scan operation (normal scan operation) based on the drive timings of FIG. 20 is performed in the sub frames 1 and 2 driven at 240 Hz, and a scan operation in which the light emission scanning speed is controlled (modified scan operation) is performed in the sub frame 3 driven at 120 Hz.

Figure 27:
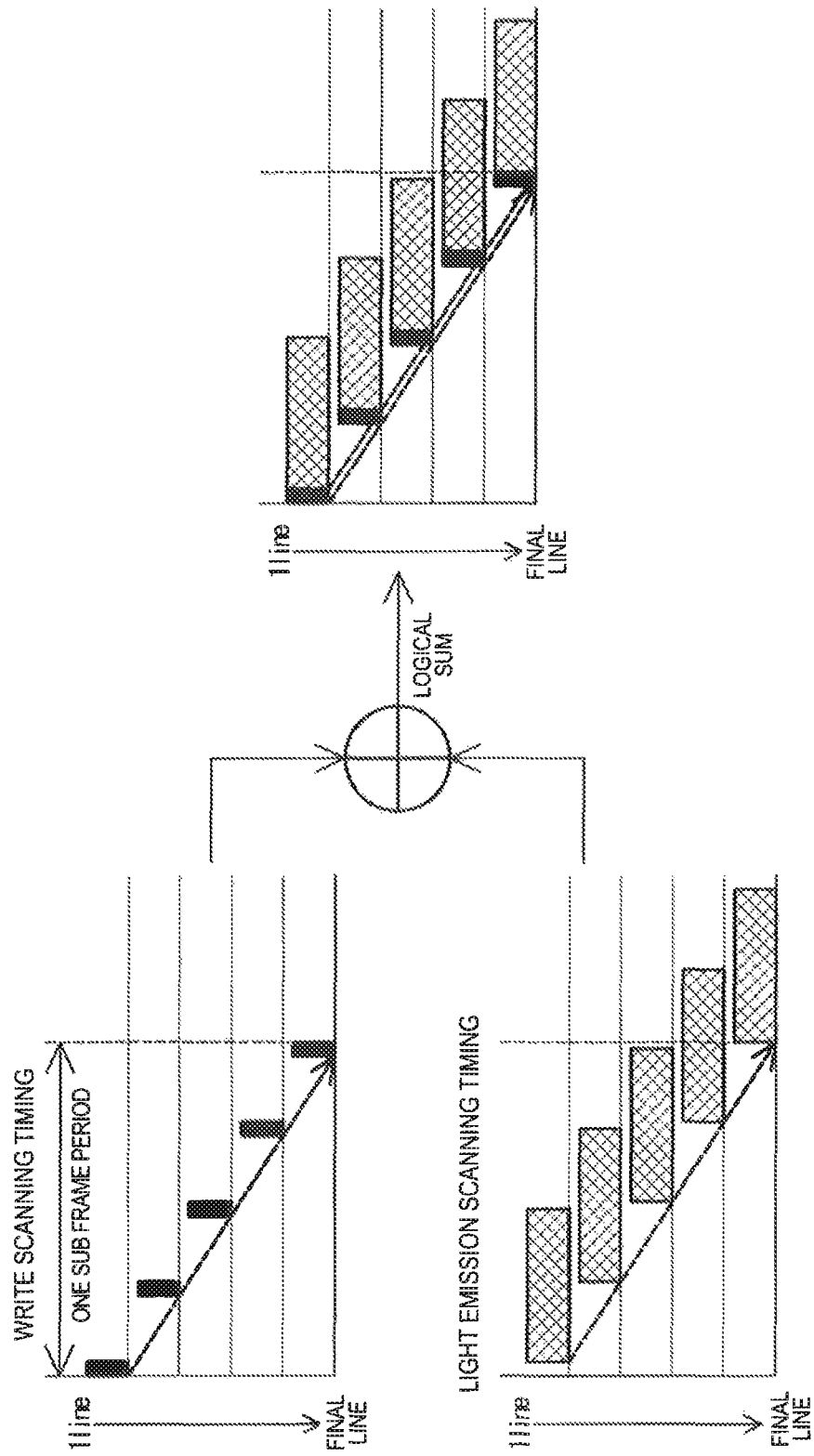
FIG. 27 is a timing chart showing the timing relation in a normal scan operation.
Figure 28:
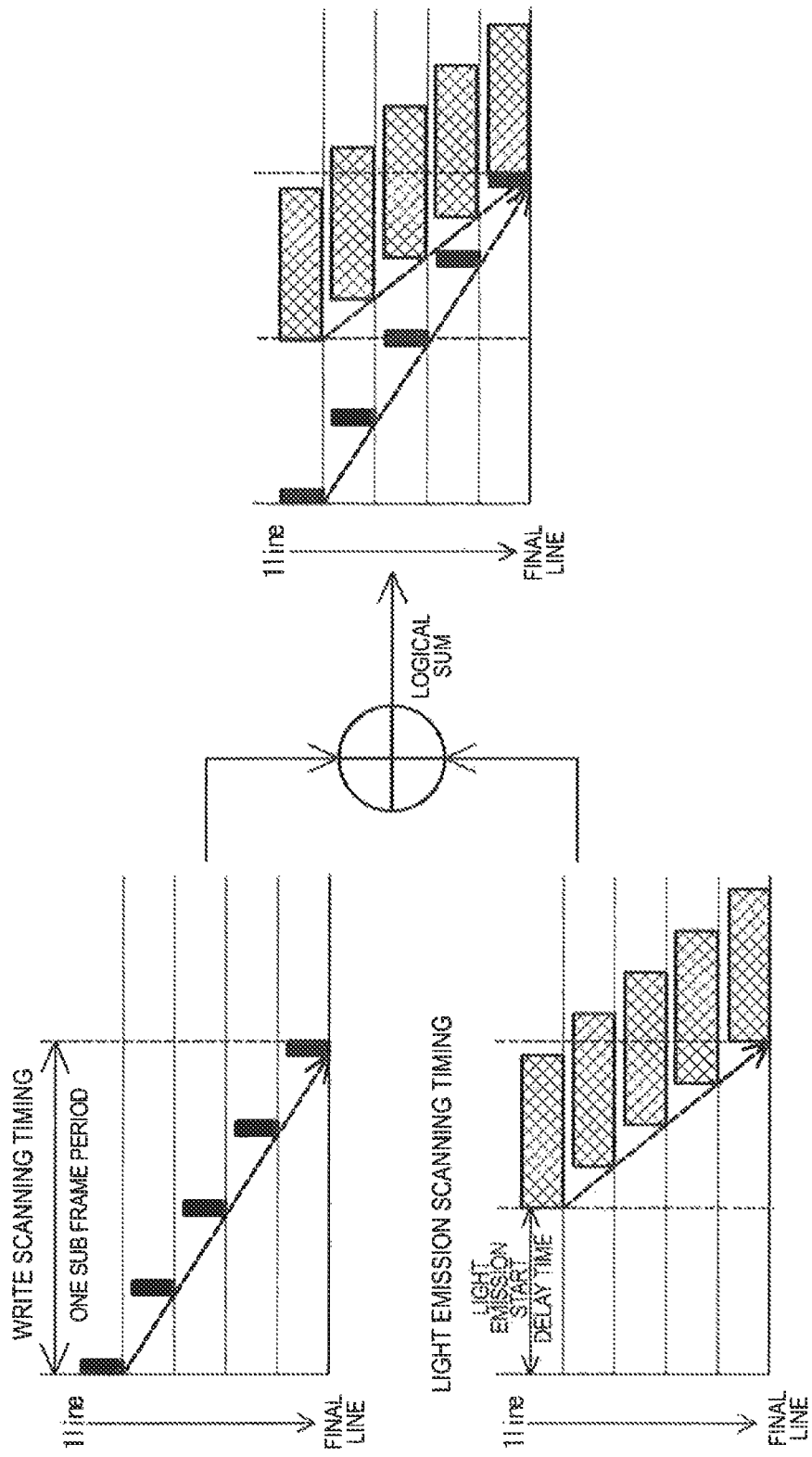
FIG. 28 is a timing chart showing the timing relation in a modified scan operation in which a light emission scanning speed is controlled.

FIG. 27 shows the timing relation in the normal scan operation, and FIG. 28 shows the timing relation in the modified scan operation. FIGS. 27 and 28 show write scanning (correction and write scanning) timings and light emission scanning timings. In addition, actual drive timings are the logical sum of the write scanning timings and the light emission scanning timings.

In driving at the timings of the scan operation, the normal scan operation is performed in the sub frames 1 and 2 and the modified scan operation in which the light emission scanning speed is controlled is performed in the sub frame 3, and accordingly, the same light emission scanning timings can be applied to variable sub frame frequency driving. Accordingly, light emission states are uniform regardless of a screen position, in other words, in any screen position, luminance of the screen and a response to dynamic images can be uniform, and thereby image quality of display screens can improve.

Example 7

While Example 6 is an example of driving three sub frames, Example 7 is an example of driving four sub frames. If sub frames having different frequencies have the same write scanning speed and light emission scanning speed even in driving of four sub frames, overlap of light emission periods of the sub frames having different frequencies occurs. Accordingly, there is concern that a luminance control range is restricted due to a light emission time. In addition, since the relation between a non-light-emission period and a light emission period of sub frames is different depending on a position in the screen vertical direction, there is also concern that luminance of the screen and a response to dynamic images are not uniform.

Figure 29:
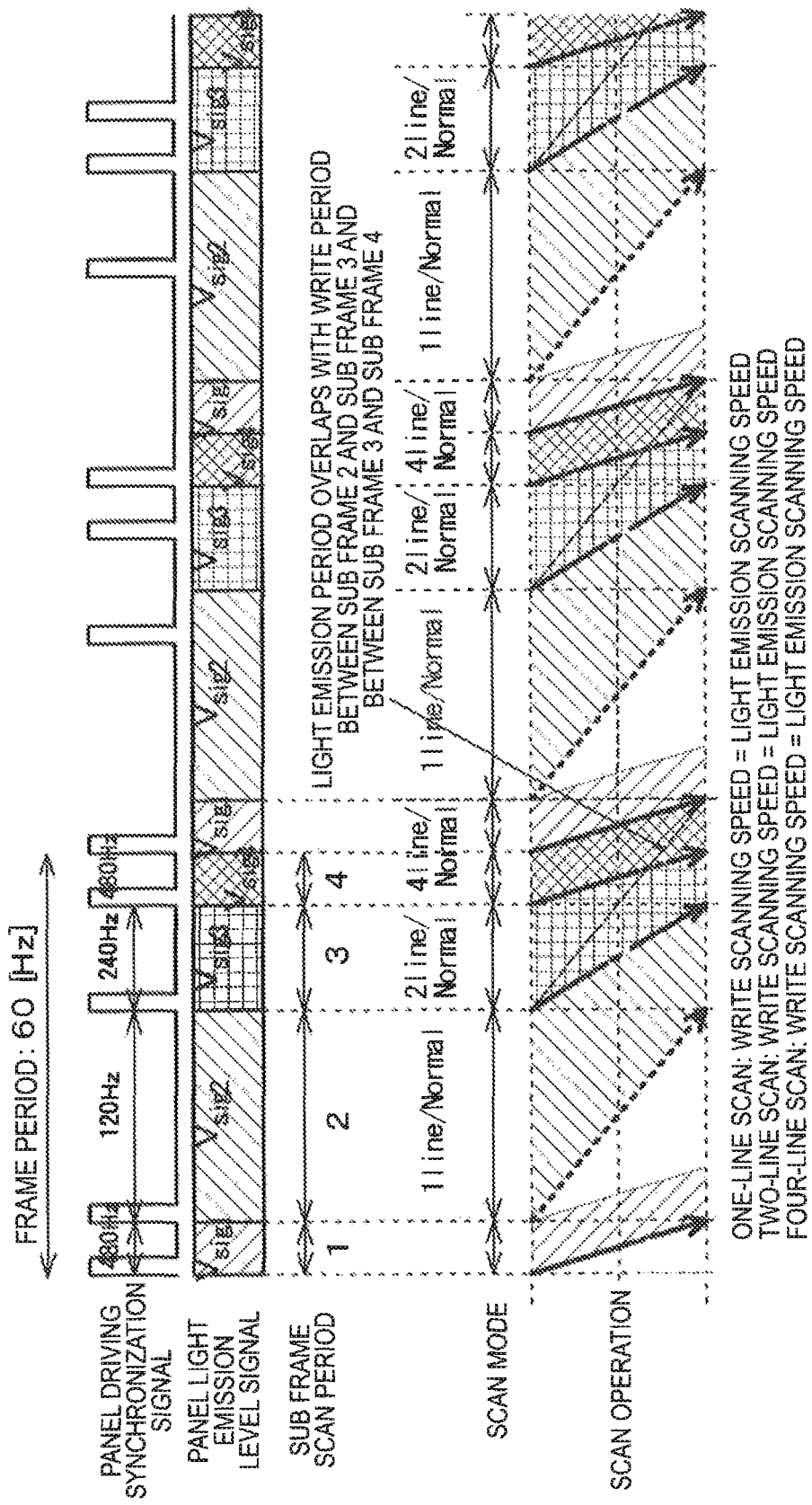
FIG. 29 is an illustrative diagram of a scan operation for describing a problem occurring when four sub frames are driven.

FIG. 29 is an illustrative diagram of a scan operation corresponding to the drive timings of FIG. 13 for describing a problem occurring when four sub frames are driven. As shown in the drive timings of FIG. 13, for driving the four sub frames, for example, the sub frames 1 and 4 are driven at 480 Hz, the sub frame 2 is driven at 120 Hz, and the sub frame 3 is driven at 240 Hz. In the case of the drive timings for driving the four sub frames, periods in which a light emission time overlaps with a signal write period occur between the sub frames 2 and 3 and the sub frames 3 and 4. In addition, there is a difference between light emission periods of the sub frames 2 and 3 and the sub frames 3 and 4 in the upper and lower parts of the screen, and thus a luminance difference is generated.

The configuration of the display device according to Example 7 is basically the same as the display device according to Example 6 shown in FIG. 22. In addition, the display device according to Example 7 also employs the configuration in which a write scanning speed at which the light emission signal $V_{sig}$ is written in the pixel 20 and a light emission scanning speed at which the light emission element emits light are controlled under control of the system control unit 110 in units of sub frames. In addition, when the write scanning speed and the light emission scanning speed are controlled in units of sub frames, the system control unit 110 controls such that different write scanning speeds are set for sub frames having different frequencies, and the same light emission scanning speed is set for the sub frames having the different frequencies.

Figure 30:
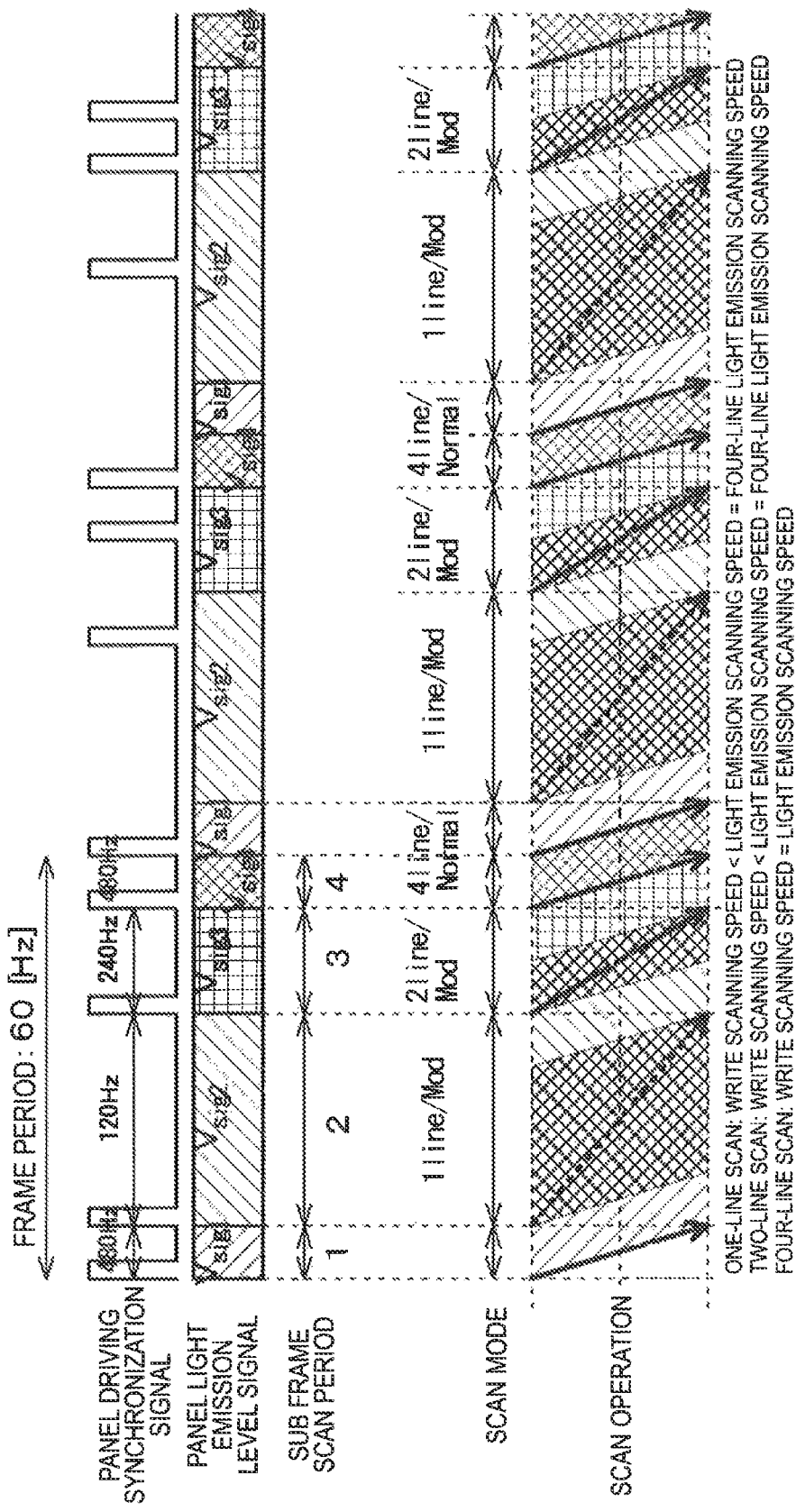
FIG. 30 is an illustrative diagram of an overview of a scan operation performed by a display device according to Example 7 with respect to driving of four sub frames.

FIG. 30 shows an overview of a scan operation performed in the display device according to Example 7. The scan operation of FIG. 30 corresponds to the drive timings in driving of the four sub frames shown in FIG. 13. Herein, the sub frames 1 and 4 are set to be driven at 480 Hz, the sub frame 2 to be driven at 120 Hz, and the sub frame 3 to be driven at 240 Hz.

In the driving of the four sub frames according to Example 7, with regard to the write scanning timings, a frequency of 480 Hz is set for the sub frames 1 and 4 driven at 480 Hz, a frequency of 120 Hz is set for the sub frame 2 driven at 120 Hz, and a frequency of 240 Hz is set for the sub frame 3 driven at 240 Hz. With regard to light emission scanning timings, control is performed such that frequencies are set to be uniform for the sub frames 1, 2, 3, and 4. In other words, in the sub frames 1 and 4 driven at 480 Hz, the scan operation (normal scan operation) based on the drive timings of FIG. 20 is performed, and in the sub frame 2 driven at 120 Hz and the sub frame 3 driven at 240 Hz, the scan operation (modified scan operation) in which the light emission scanning speed is controlled is performed.

As such, by controlling the write scanning speed and the light emission scanning speed in units of sub frames in driving of the four sub frames, it is possible to resolve overlap of a light emission period and a signal write period of the sub frames. Accordingly, restriction on a luminance control range due to a light emission time or the different relation between a non-light-emission period and a light emission period of the sub frames depending on a position in the screen vertical direction are prevented, and thus it is possible to maintain the same light emission state within the screen of the sub frames.

Note that, as indicated with hatching of the thick lines in FIG. 30, a period in which the light emission element does not emit light, i.e., a black display period, occurs even in driving of the four sub frames, and resultantly, luminance is lowered. Thus, it is preferable in driving of the four sub frames according to Example 7 to control the reference voltage $V_{ref}$ of the light emission signal $V_{sig}$ and control a gamma characteristic of light emission of the display panel 70. In other words, in accordance with control of the write scanning speed and light emission scanning speed in units of sub frames, the reference voltage $V_{ref}$ of the light emission signal $V_{sig}$ is controlled and the gamma characteristic of light emission of the display panel 70 is controlled at the same timing as control of the reference voltage $V_{ref}$.

As such, by controlling the reference voltage $V_{ref}$ of the light emission signal $V_{sig}$ in accordance with control of the write scanning speed and light emission scanning speed in units of sub frames, it is possible to compensate for the reduction of luminance that is caused by a change in the scanning timings and resultant restriction on a light emission time of each sub frame. Furthermore, by controlling the gamma characteristic of light emission of the display panel 70 at the same timing as control of the reference voltage $V_{ref}$, it is possible to compensate for formation of light beams during light emission of the display panel 70.

[Regarding One-Frame Video Information]

Herein, an example of the one-frame video information obtained by packing a group of a plurality of pieces of image information as one scene, which has been used in Examples 1 to 5 described above, will be briefly described. As a signal format in which the plurality of pieces of image information are integrated in one frame, a three-dimensional (3D) video-applicable format as shown in FIG. 31 can be exemplified. With respect to the 3D video-applicable format, a frame packing format is shown in FIG. 31A, a side-by-side half format is shown in FIG. 31B, and a top-and-bottom format is shown in FIG. 31C.

As the one-frame video information of Examples 1 to 7, formats defined as 3D formats of dynamic images can be extended and used. For example, left and right parts of a 3D signal can be considered to be replaced with images of two kinds having different exposure conditions, and an existing video transfer system can be used. Specifically, for example, the left and the right parts of a 3D signal can be allocated respectively to a low dynamic range and a high dynamic range, and switching of a light emission time or the like can be performed according to an L-R switching signal. When, with regard to images having different exposure conditions, substantially the same design and different luminance reproduction ranges are focused on, by performing compression of information such as reducing resolution on some images among three or more images, such a 3D signal system extension format can also be applied.

In addition, multiple formats of still images, a format in which panorama photographing that has become a widespread function of general digital cameras is recorded, and the like can also be applied to the one-frame video information used in Examples 1 to 7. As in the examples, without constructing or introducing a new ecosystem for realizing the technology of the present disclosure, a system that causes videos having a high dynamic range (HDR) to be displayed can be constructed.

Additionally, the present technology may also be configured as below.

(1) An image processing circuit including:

a sub frame signal generation unit configured to receive n pieces of image information of n images which are obtained by photographing the same scene under n (n is a natural number equal to or greater than 2) exposure conditions and the n exposure conditions at the time of the photographing as input;

wherein, when a display video of one scene is constituted by a maximum of n sub frames, the sub frame signal generation unit generates video signals of the maximum of n sub frames by controlling a light emission time of light emission elements for each sub frame according to the n exposure conditions.

(2) The image processing circuit according to (1), wherein the sub frame signal generation unit controls light emission luminance of the light emission elements per unit time for each sub frame according to the n pieces of image information.

(3) The image processing circuit according to (2), wherein the sub frame signal generation unit controls the light emission luminance per unit time according to calculated image information computed through predetermined calculation based on the n pieces of image information.

(4) The image processing circuit according to (3), wherein images with at least two different exposure conditions are compared to each other and, from information of the image of each exposure condition and each exposure condition or a pixel value ratio, the calculated image information is generated as image data to be displayed in each sub frame.

(5) The image processing circuit according to any one of (1) to (4), wherein one of the n images which are photographed under the n exposure conditions is set as a reference exposure image and then an exposure condition is computed from a relative exposure ratio obtained by comparing the pixel values of the same pixel group of the reference exposure image and the images with the other exposure conditions.

(6) The image processing circuit according to any one of (1) to (4), wherein an exposure condition is computed from a pixel value ratio at the same pixel position in the images with the respective exposure conditions.

(7) The image processing circuit according to any one of (1) to (6), wherein the sub frame signal generation unit controls duty of the light emission elements for each sub frame according to the exposure conditions.

(8) The image processing circuit according to (7), wherein the sub frame signal generation unit performs the control of the duty of the light emission elements using the value that is multiplied by the reciprocal of an exposure time ratio of the images with the respective exposure conditions.

(9) The image processing circuit according to any one of (1) to (8), wherein driving of the sub frames is performed at the speed of n times the frequency of one frame at maximum.

(10) The image processing circuit according to any one of (1) to (9), wherein a driving frequency of the sub frames is set to a combination of two or more different frequencies for each sub frame.

(11) The image processing circuit according to (10), wherein a total period of the n sub frames of which the driving frequency is set to the combination of two or more different frequencies is equal to a frame period.

(12) The image processing circuit according to (10) or (11),
wherein a driving frequency of at least one sub frame is a standard frequency, and
wherein a driving frequency of other sub frames is an integral multiple of the standard frequency.

(13) The image processing circuit according to (12), wherein, when the driving frequency of the sub frames is x times (x is a natural number equal to or greater than 2) the standard frequency, write scanning of a video signal is simultaneously performed on x lines.

(14) The image processing circuit according to (12), wherein data of an image displayed at the driving frequency of the integral multiple of the standard frequency is the average value of odd lines and even lines.

(15) The image processing circuit according to (12), wherein data of an image displayed at the driving frequency of the integral multiple of the standard frequency is data of which a video spatial frequency band of a vertical direction has undergone a band limiting process.

(16) The image processing circuit according to (12), wherein the individual images with the n exposure conditions are analyzed and a driving frequency of a sub frame to be assigned to each image is decided.

(17) The image processing circuit according to (16), wherein a standard driving frequency that will not lower vertical resolution is assigned to an image having a large amount of high frequency components of a video vertical spatial frequency.

(18) The image processing circuit according to (16), wherein a driving frequency at which vertical resolution is an integral fraction is assigned to images other than the image that has the largest number of high frequency components of the video vertical spatial frequency.

(19) An image processing method in the event of processing an image based on image information of n images which are obtained by photographing the same scene under n (n is a natural number equal to or greater than 2) exposure conditions and the n exposure conditions of that time, the method including:
when a display video of one scene is constituted by a maximum of n sub frames, controlling light emission luminance of light emission elements per unit time for each sub frame according to the image information of the n images, controlling a light emission time of the light emission elements for each sub frame according to the n exposure conditions, and thereby generating video signals of the maximum of n sub frames.

(20) A display device having an image processing circuit,
wherein image information of n images which are obtained by photographing the same scene under n (n is a natural number equal to or greater than 2) exposure conditions and the n exposure conditions of that time are received as input;
wherein a sub frame signal generation unit configured to receive n pieces of image information of n images which are obtained by photographing the same scene under n (n is a natural number equal to or greater than 2) exposure conditions and the n exposure conditions at the time of the photographing as input is included, and
wherein, when a display video of one scene is constituted by a maximum of n sub frames, the sub frame signal generation unit generates video signals of the maximum of n sub frames by controlling a light emission time of light emission elements for each sub frame according to the n exposure conditions.

(21) The display device according to (20), wherein a driving frequency of the sub frames is set to a combination of two or more different frequencies for each sub frame.

(22) The display device according to (21), including:
a control unit configured to be capable of controlling a write scanning speed at which a light emission signal is written into a pixel and a light emission scanning speed at which the light emission elements emit light in units of sub frames.

(23) The display device according to (22), wherein the control unit controls such that the sub frames having different frequencies are set to have different write scanning speeds.

(24) The display device according to (22) or (23), wherein the control unit controls such that the sub frames having different frequencies are set to have the same light emission scanning speed.

(25) The display device according to any one of (22) to (24), wherein the control unit controls a reference voltage of a light emission signal in accordance with control of the write scanning speed and the light emission scanning speed in units of sub frames.

(26) The display device according to (25), including:
a correction table for linearizing a gamma characteristic of light emission, wherein the control unit replaces the correction table when the reference voltage of the light emission signal is controlled.

What is claimed is:

1. An image processing circuit comprising:
a sub frame signal generation unit configured to receive n pieces of image information of n images which are obtained by photographing the same scene under n (n is a natural number equal to or greater than 2) exposure conditions and the n exposure conditions at the time of the photographing as input;
wherein, when a display video of one scene is constituted by a maximum of n sub frames, the sub frame signal generation unit generates video signals of the maximum of n sub frames by controlling a light emission time of light emission elements for each sub frame according to the n exposure conditions.

2. The image processing circuit according to claim 1, wherein the sub frame signal generation unit controls light emission luminance of the light emission elements per unit time for each sub frame according to the n pieces of image information.

3. The image processing circuit according to claim 2, wherein the sub frame signal generation unit controls the light emission luminance per unit time according to calculated image information computed through predetermined calculation based on the n pieces of image information.

4. The image processing circuit according to claim 3, wherein images with at least two different exposure conditions are compared to each other and, from information of the image of each exposure condition and each exposure condition or a pixel value ratio, the calculated image information is generated as image data to be displayed in each sub frame.

5. The image processing circuit according to claim 1, wherein one of the n images which are photographed under the n exposure conditions is set as a reference exposure image and then an exposure condition is computed from a relative exposure ratio obtained by comparing the pixel values of the same pixel group of the reference exposure image and the images with the other exposure conditions.

6. The image processing circuit according to claim 1, wherein an exposure condition is computed from a pixel value ratio at the same pixel position in the images with the respective exposure conditions.

7. The image processing circuit according to claim 1, wherein the sub frame signal generation unit controls duty of the light emission elements for each sub frame according to the exposure conditions.

8. The image processing circuit according to claim 7, wherein the sub frame signal generation unit performs the control of the duty of the light emission elements using the value that is multiplied by the reciprocal of an exposure time ratio of the images with the respective exposure conditions.

9. The image processing circuit according to claim 1, wherein driving of the sub frames is performed at the speed of n times the frequency of one frame at maximum.

10. The image processing circuit according to claim 1, wherein a driving frequency of the sub frames is set to a combination of two or more different frequencies for each sub frame.

11. The image processing circuit according to claim 10, wherein a total period of the n sub frames of which the driving frequency is set to the combination of two or more different frequencies is equal to a frame period.

12. The image processing circuit according to claim 10, wherein a driving frequency of at least one sub frame is a standard frequency, and
wherein a driving frequency of other sub frames is an integral multiple of the standard frequency.

13. The image processing circuit according to claim 12, wherein, when the driving frequency of the sub frames is x times (x is a natural number equal to or greater than 2) the standard frequency, write scanning of a video signal is simultaneously performed on x lines.

14. The image processing circuit according to claim 12, wherein data of an image displayed at the driving frequency of the integral multiple of the standard frequency is the average value of odd lines and even lines.

15. The image processing circuit according to claim 12, wherein data of an image displayed at the driving frequency of the integral multiple of the standard frequency is data of which a video spatial frequency band of a vertical direction has undergone a band limiting process.

16. The image processing circuit according to claim 12, wherein the individual images with the n exposure conditions are analyzed and a driving frequency of a sub frame to be assigned to each image is decided.

17. The image processing circuit according to claim 16, wherein a standard driving frequency that will not lower vertical resolution is assigned to an image having a large amount of high frequency components of a video vertical spatial frequency.

18. The image processing circuit according to claim 16, wherein a driving frequency at which vertical resolution is an integral fraction is assigned to images other than the image that has the largest number of high frequency components of the video vertical spatial frequency.

19. An image processing method in the event of processing an image based on image information of n images which are obtained by photographing the same scene under n (n is a natural number equal to or greater than 2) exposure conditions and the n exposure conditions of that time, the method comprising:
when a display video of one scene is constituted by a maximum of n sub frames, controlling light emission luminance of light emission elements per unit time for each sub frame according to the image information of the n images, controlling a light emission time of the light emission elements for each sub frame according to the n exposure conditions, and thereby generating video signals of the maximum of n sub frames.

20. A display device having an image processing circuit, wherein image information of n images which are obtained by photographing the same scene under n (n is a natural number equal to or greater than 2) exposure conditions and the n exposure conditions of that time are received as input;
wherein a sub frame signal generation unit configured to receive n pieces of image information of n images which are obtained by photographing the same scene under n (n is a natural number equal to or greater than 2) exposure conditions and the n exposure conditions at the time of the photographing as input is included, and
wherein, when a display video of one scene is constituted by a maximum of n sub frames, the sub frame signal generation unit generates video signals of the maximum of n sub frames by controlling a light emission time of light emission elements for each sub frame according to the n exposure conditions.

21. The display device according to claim 20, wherein a driving frequency of the sub frames is set to a combination of two or more different frequencies for each sub frame.

22. The display device according to claim 21, comprising:
a control unit configured to be capable of controlling a write scanning speed at which a light emission signal is written into a pixel and a light emission scanning speed at which the light emission elements emit light in units of sub frames.

23. The display device according to claim 22, wherein the control unit controls such that the sub frames having different frequencies are set to have different write scanning speeds.

24. The display device according to claim 22, wherein the control unit controls such that the sub frames having different frequencies are set to have the same light emission scanning speed.

25. The display device according to claim 22, wherein the control unit controls a reference voltage of a light emission signal in accordance with control of the write scanning speed and the light emission scanning speed in units of sub frames.

26. The display device according to claim 25, comprising:
a correction table for linearizing a gamma characteristic of light emission, wherein the control unit replaces the correction table when the reference voltage of the light emission signal is controlled.

* * * * *